United States Patent
Swale et al.

(10) Patent No.: US 12,295,368 B2
(45) Date of Patent: *May 13, 2025

(54) METHOD FOR CONTROLLING HEMATOPHAGOUS OR SAP-FEEDING ARTHROPODS

(71) Applicant: Board of Supervisors of Louisiana State University and Agricultural and Mechanical College, Baton Rouge, LA (US)

(72) Inventors: Daniel R. Swale, High Springs, FL (US); Lane D. Foil, Baton Rouge, LA (US)

(73) Assignee: Board of Supervisors of Louisiana State Universtiy and Agricultural and Mechanical College, Baton Rouge, LA (US)

( * ) Notice: Subject to any disclaimer, the term of this patent is extended or adjusted under 35 U.S.C. 154(b) by 95 days.

This patent is subject to a terminal disclaimer.

(21) Appl. No.: 18/136,974

(22) Filed: Apr. 20, 2023

(65) Prior Publication Data

US 2023/0276802 A1 Sep. 7, 2023

Related U.S. Application Data

(63) Continuation of application No. 16/348,236, filed as application No. PCT/US2017/061247 on Nov. 13, 2017, now Pat. No. 11,632,953.

(60) Provisional application No. 62/422,382, filed on Nov. 15, 2016, provisional application No. 62/421,621, filed on Nov. 14, 2016.

(51) Int. Cl.
*A01N 25/00* (2006.01)
*A01N 43/38* (2006.01)
*A01N 43/40* (2006.01)
*A01N 43/56* (2006.01)
*A01N 43/90* (2006.01)

(52) U.S. Cl.
CPC ............ *A01N 43/40* (2013.01); *A01N 43/38* (2013.01); *A01N 43/56* (2013.01); *A01N 43/90* (2013.01)

(58) Field of Classification Search
None
See application file for complete search history.

(56) References Cited

U.S. PATENT DOCUMENTS

| | | | |
|---|---|---|---|
| 2009/0047235 A1 | 2/2009 | Husseneder | 424/84 |
| 2015/0111733 A1 | 4/2015 | Walsh et al. | A01N 47/20 |

FOREIGN PATENT DOCUMENTS

CN 107523570 A 12/2017

OTHER PUBLICATIONS

R. Raphemot et al., "Discovery and Characterization of a Potent and Selective Inhibitor of *Aedes aegypti* Inward Rectifier Potassium Channels," PLoS One, vol. 9, Issue 11, pp. 1-11 e110772 (2014).
R. Raphemot et al., "Eliciting Renal Failure in Mosquitoes with a Small-Molecule Inhibitor of Inward-Rectifying Potassium Channels," PLoS One, vol. 8, pp. 1-7, e64905 (2013).
R. Raphemot et al., "Direct Activation of β-Cell $K_{ATP}$ Channels with a Novel Xanthine Derivative," Molecular Pharmacology, vol. 85, (2014), pp. 858-865.
D.R. Swale, et al., "An Insecticide Resistance-Breaking Mosquitocide Targeting Inward Rectifier Potassium Channels in Vectors of Zika Virus and Malaria," Scientific Reports, vol. 6, Art. No. 36954, 16 (2016), pp. 1-11.
D. Kim et al., "Multiple Functions of Na/K-ATPase in Dopamine-Induced Salivation of the Blacklegged Tick, *Ixodes Scapularis,*" Scientific Reports, vol. 6, pp. 1-13, report No. 21047 (2016).
Z. Luan et al., Inwardly Rectifying Potassium Channels in *Drosophila*. Sheng li xue bao : [Acta physiologica Sinica] vol. 64, pp. 515-519 (2012); published online EpubOct. 25.
V. R. Chintapalli et al., Using FlyAtlas to Identify Better *Drosophila melanogaster* Models of Human Disease. Nature Genetics vol. 39, pp. 715-720 (2007); published online EpubJun. (10.1038/ng2049).
M.F. Rouhier et al., Identification of life-stage Splice Variants of an Inward Rectifying Potassium (Kir) Channel in the Yellow Fever Mosquito *Aedes aegypti*. Insect Biochemistry and Molecular Biology vol. 48, pp. 91-99 (2014).
R. Raphemot et al., "Discovery, Characterization, and Structure-Activity Relationships of an Inhibitor of Inward Rectifier Potassium (Kir) Channels with Preference for Kir2.3, Kir3.X, and Kir7.1," Frontiers in Pharmacology, vol. 2, pp. 1-18, Art. 75 (2011).
L. Lewis et al., "High-Throughput Screening Reveals a Small-Molecule Inhibitor on the Renal Outer Medullary Potassium Channel and Kir7.1." Molecular Pharmacology, vol. 76, pp. 1094-1103 (2009).
D. Swale et al., Role of Inward Rectifier Potassium Channels in Salivary Gland Function and Sugar Feeding of the Fruit Fly, *Drosophila melanogaster, Pesticide Biochemistry and Physiology*, vol. 141, pp. 41-49 (2017; epub 2016).
K. Beyenbach et al., "Targeting renal epithelial channels for the control of insect vectors," Tissue Barriers, vol. 3, Issue 4, pp. 1-14 e1081861 (2015).
S. O'Neal et al., "ATP-sensitive inwardly rectifying potassium channel modulators alter cardiac function in honey bees," Journal of Insect Physiology, vol. 99, pp. 95-100 (2017).

(Continued)

*Primary Examiner* — Susan T Tran
(74) *Attorney, Agent, or Firm* — John H. Runnels

(57) ABSTRACT

Modulation of inward potassium ion conductance with structurally diverse small-molecules in the arthropod salivary gland induces arthropod salivary gland failure that results in a reduction or elimination in the ability of the arthropod to feed. Administering Kir channel inhibitors reduces food intake, increases feeding time, reduces salivary gland secretion, induces mortality, and reduces transmission of vector-borne pathogens. Kir channel inhibitors induce these adverse effects in ticks, mosquitoes, horn flies, and aphids.

8 Claims, 24 Drawing Sheets

(56) References Cited

OTHER PUBLICATIONS

J. Eleftherianos et al., "ATP-sensitive potassium channel ($K_{ATP}$)-dependent regulation of cardiotropic viral infections," PNAS, vol. 108, No. 29, (2011), pp. 12024-12029.

M. Slocinska, et al., "Evidences for an ATP-sensitive potassium channel ($K_{ATP}$) in muscle and fat body mitochondria of insect," Journal of Insect Physiology, vol. 59, (2013), pp. 1125-1132.

M. Slocinska, et al., "Activation of Mitochondrial Uncoupling Protein 4 and ATP-Sensitive Potassium Channel Cumulatively Decreases Superoxide Production in Insect Mitochondria," Protein & Peptide Letters, vol. 23 (2016) pp. 63-68.

VU041

VU937

2.1 μM 1.6 μM 3.2 μM 11.1 μM 2.1 μM 7.6 μM 13.3 μM 8.9 μM 0.6 μM

VU0071063

VU625

Inactive analog of VU063

METHOD FOR CONTROLLING HEMATOPHAGOUS OR SAP-FEEDING ARTHROPODS

This application is a continuation of U.S. patent application Ser. No. 16/348,236, U.S. national stage filed May 8, 2019, now U.S. Pat. No. 11,632,953; which is the U.S. national stage of international patent application PCT/US17/61247, international filing date Nov. 13, 2017; which claimed the benefit under 35 U.S.C. § 119(e) of both the Nov. 14, 2016 filing date of U.S. provisional patent application Ser. No. 62/421,621, and of the Nov. 15, 2016 filing date of U.S. provisional patent application Ser. No. 62/422,382.

This invention was made with United States Government support under grant number 58-3094-5-016 awarded by the Department of Agriculture, Agricultural Research Service; a grant from the Foundation for the National Institutes of Health through the Vector-Based Transmission of Control: Discovery Research (VCTR) program of the Grand Challenges in Global Health initiative; and grant no. 1R01DK082884 from the National Institute of Diabetes and Digestive and Kidney Diseases. The United States Government has certain rights in this invention.

TECHNICAL FIELD

This invention pertains to a method for controlling hematophagous or sap-feeding arthropods.

BACKGROUND ART

Mosquitoes are vectors of devastating human pathogens such as Zika virus, malaria parasites, and dengue fever virus. Insecticides have been the primary tools for controlling the spread of mosquito-borne diseases, but the emergence of insecticide-resistant populations of mosquitoes is threatening the effectiveness of these control agents across the world. Mosquitoes are vectors for pathogens that impose enormous health and socioeconomic burdens, particularly in the developing world. The malaria vector *An. gambiae* and the dengue/yellow fever vector *Ae. aegypti* are collectively responsible for hundreds of millions of cases of malaria and dengue fever annually, leading to over 500,000 deaths per year. Moreover, *Ae. aegypti* is suspected as the primary vector in the recent outbreak of Zika virus in Latin America and the Caribbean; Zika virus has been linked to dramatic increases in the number of cases of microcephaly and Guillain-Barré syndrome. The two major classes of insecticides that have been used in vector control programs are pyrethroids and anticholinergics (carbamates/organophosphates). These agents work by, respectively, blocking inactivation of voltage-gated sodium channels or inhibiting acetylcholinesterase enzymes expressed in the nervous system. Moreover, they act on all developmental stages and sexes, creating intense selective pressure for target site resistance (e.g., knockdown resistance, kdr) and/or metabolic resistance (e.g., elevated expression of cytochrome P450 monoxygenases). The development of resistance and the lack of novel, validated target sites that can be exploited for mosquito control complicate efforts to mitigate the spread of emerging mosquito-borne pathogens around the globe, including Zika and chikungunya viruses. There is an unfilled need for new classes of insecticides, acting on new molecular targets, to bolster integrated vector control programs and limit the spread of mosquito-borne diseases.

Tick-borne pathogens are ubiquitously present throughout the world, presenting significant concerns to global health and agricultural productivity. Ticks are second only to mosquitoes as disease vectors. Ticks transmit a variety of infectious bacteria, viruses, protozoa, fungi, and helminths. In addition to transmitting pathogens, some species of ticks produce a toxin that causes paralysis, termed "tick paralysis." The host immune response to tick attachment can cause skin damage and pain. From a veterinary perspective, ticks are responsible for significant economic losses stemming from tick-caused anemia, reducing growth rate, reducing milk production, and increasing mortality from pathogen infection. For humans, the number of cases of Lyme borreliosis reported to the Centers for Disease Control and Prevention (CDC) has nearly tripled over the past 20 years, with more than 28,000 confirmed cases for the year 2015, despite extensive research efforts aimed at controlling this disease. Rickettsial disease cases are steadily increasing in the United States. Some strains of *Rickettsia rickettsii*, the causative agent of Rocky Mountain Spotted Fever, can cause significant mortality in humans. The primary arthropod vectors of *R. rickettsii* are *Dermacentor andersoni* and *D. variabilis*, which rarely feed on humans. However, recent studies have shown that the most predominant human biting tick, *Amblyomma americanum*, is capable of acquiring, maintaining, and transmitting *R. rickettsii* as well. Tick control has been primarily based on neurotoxic acaricides, but extensive use has resulted in resistant tick populations. The continuing increase in tick populations and their associated pathogens underlines the failure of current control measures.

Classical synthetic insecticides to control flies, ticks, mosquitoes, aphids, and other unwanted insects or arachnids have targeted such things as sodium channels or acetylcholinesterases. Classical insecticides suffer from disadvantages such as the development of high levels of insecticide resistance in target species, and effects on non-target species such as honeybees.

The molecular architecture of arthropod salivary glands has been examined in some organisms including fruit flies, mosquitoes, ticks, fleas, and black flies. It is known that saliva constituents are required for blood feeding through regulating vasodilation, regulating blood clotting, acting as anesthetics, and providing anti-immune factors. Despite this work, the understanding of the molecular machinery and physiological systems of arthropod salivary glands remains limited.

Tick salivary glands have perhaps been the most commonly studied. Dopamine receptors have been reported in the salivary glands of the blacklegged tick (*Ixodes scapularis*), receptors that control inward fluid transport and release of fluid to coordinate salivary secretion. Pharmacological evidence suggests the dopaminergic system is a major physiological pathway in arthropod salivation. However, information regarding the ion transport pathways of arthropod salivary glands, including ticks, is extremely limited.

$K^+$ ion transport in mammalian salivary glands is critical for generating saliva. Inwardly rectifying potassium (Kir) channels have been shown to be essential to mammalian salivary gland function. These channels function as "biological diodes" by favoring the flow of potassium ions inwardly rather than outwardly. Known Kir channels share a similar molecular structure: They are tetramers assembled around a membrane-spanning pore, and are gated by polyvalent cations that occlude the pore at cell potentials more positive than the $K^+$ equilibrium potential ($E_k$). The number of genes encoding Kir channel components varies by species, with humans having 16 Kir channel-encoding genes, *Aedes aegypti* mosquito having 5, and *D. melanogaster* having 3. The *Drosophila* Kir genes are termed Ir, Irk2, and Irk3, and encode Kir1, Kir2, and Kir3, respectively. Tissue expression patterns of *Drosophila* Kir channels are highly variable. There are three sub-families of Kir channels: classical, ATP-sensitive ($K_{ATP}$), and GPCR-gated. Classical Kir channels are constitutively active, and depend on membrane potential to induce inward rectification. ATP-sensitive Kir channels are gated by the presence or absence of nucleotides (ATP, ADP), and are closed in the presence of ATP. These channels are heteromeric, comprising 4 Kir channel subunits and 4 sulphonylurea receptors that are responsible for binding the ATP or small molecule activators/inhibitors. GPCR-gated Kir channels are diverse, and little is known about their function or biophysics in arthropods.

Kir channels play important physiological roles in the exocrine systems of dipteran insects. In *D. melanogaster*, embryonic depletion of Kir1 and Kir2 mRNA in Malpighian tubules significantly reduces transepithelial secretion of fluid and $K^+$ transport. In *Aedes aegypti* (*Ae* or *Ae. aegypti*) and *Anopheles gambiae* (*An* or *An. gambiae*) mosquitoes, pharmacological inhibition of AeKir1 or AnKir1 with structurally distinct small molecules (viz., VU573, VU590, VU041) disrupts the secretion of fluid and $K^+$ in isolated Malpighian tubules, it impairs diuretic capacity in adult females, and it impairs $K^+$ homeostasis in adult females. See R. Raphemot, M. F. Rouhier, C. R. Hopkins, R. D. Gogliotti, K. M. Lovell, R. M. Hine, D. Ghosalkar, A. Longo, K. W. Beyenbach, J. S. Denton, P. M. Piermarini, Eliciting renal failure in mosquitoes with a small-molecule inhibitor of inward-rectifying potassium channels. PloS one 8, e64905 (2013)10.1371/journal.pone.0064905; R. Raphemot, M. F. Rouhier, D. R. Swale, E. Days, C. D. Weaver, K. M. Lovell, L. C. Konkel, D. W. Engers, S. F. Bollinger, C. Hopkins, P. M. Piermarini, J. S. Denton, Discovery and characterization of a potent and selective inhibitor of *Aedes aegypti* inward rectifier potassium channels. PloS one 9, e110772 (2014) 10.1371/journal.pone.0110772); M. F. Rouhier, P. M. Piermarini, Identification of life-stage and tissue-specific splice variants of an inward rectifying potassium (Kir) channel in the yellow fever mosquito *Aedes aegypti*. Insect biochemistry and molecular biology 48, 91-99 (2014); published online Epub May (10.1016/j.ibmb.2014.03.003); D. R. Swale et al., An insecticide resistance-breaking mosquitocide targeting inward rectifier potassium channels in vectors of Zika virus and Malaria. Scientific Reports vol. 6, article no. 36954 (published online 16 Nov. 2016).

In *Drosophila* Kir1 expression is increased by 37-fold in the salivary glands of both larvae and adults. See Z. Luan, H. S. Li, Inwardly rectifying potassium channels in *Drosophila*. Sheng li xue bao: [Acta physiologica *Sinica*] 64, 515-519 (2012); published online EpubOct 25; V. R. Chintapalli, J. Wang, J. A. Dow, Using FlyAtlas to identify better *Drosophila melanogaster* models of human disease. Nature genetics 39, 715-720 (2007); published online EpubJun (10.1038/ng2049).

D. Kim et al., "Multiple functions of Na/K-ATPase in dopamine-induced salivation of the blacklegged tick, *Ixodes scapularis*," Scientific Reports, vol. 6, report no. 21047 (2016) disclose data suggesting that Na/K-ATPase is involved in dopamine-mediated salivary secretion in ticks.

See also: R. Raphemot et al., "Discovery and characterization of a potent and selective inhibitor of *Aedes aegypti* inward rectifier potassium channels," PLOS ONE 9(11), e110772 (2014); R. Raphemot et al., "Discovery, characterization, and structure-activity relationships of an inhibitor of inward rectifier potassium (Kir) channels with preference for Kir2.3, Kir3.X, and Kir7.1," Frontiers in Pharmacology, vol. 2, article 75 (2011); and L. Lewis et al., "High-throughput screening reveals a small-molecule inhibitor of the renal outer medullary potassium channel and Kir7.1," Molecular Pharmacology," vol. 76, pp. 1094-1103 (2009).

D. Swale et al., "Role of inward rectifier potassium channels in salivary gland function and sugar feeding of the fruit fly, *Drosophila melanogaster*," Pesticide Biochemistry and Physiology, vol. 141, pp. 41-49 (2017; epub 15 Nov. 2016) reports on related work, published by the present inventors and their colleagues.

DISCLOSURE OF THE INVENTION

The arthropod salivary gland is critical in feeding processes, but the salivary gland has not received much attention in prior methods of controlling arthropod pests. The salivary gland provides constituents needed for blood feeding and sap feeding (e.g. anticoagulants, other enzymes). The salivary gland is the site of osmoregulation, and it is the site of pathogen transmission.

We have discovered the critical role potassium ion transport pathways serve in arthropod feeding and in ultimate pathogen transmission. We have discovered a novel target site to inhibit arthropod feeding, to inhibit arthropod salivation, or both. We have confirmed these effects with several inhibitors of the target site. Novel small-molecule modulators inhibit or activate Kir channels in salivary glands, inhibiting or ending the arthropod's ability to salivate or feed. Genetic knockdown experiments have helped rule out the possibility that the observations might have resulted from off-target effects of the compounds.

In arthropod salivary glands and gustatory organs, potassium ion conductance pathways transmit potassium ions both inwardly (e.g. inward rectifier potassium (Kir) channels), and outwardly (two-pore domain potassium (K2P) channels; calcium activated potassium channel). We have used small molecules, such as VU041 and pinacidil, to demonstrate the physiological role of these channels in arthropod salivary gland function and feeding. Our observations showed that these potassium ion conductance pathways are essential for proper salivary gland function and gustatory processes during feeding in *Drosophila* flies, two species of ticks, *Aedes aegypti* mosquitoes, *Haematobia irritans irritans* (horn fly), and the cotton aphid, *Aphis gossypii*. We expect these findings to extrapolate to other species of blood-feeding and sap-feeding insects and arachnids as well, including other species of mosquitoes, flies, aphids, and ticks.

We have discovered that modulation of inward K+ ion conductance in the arthropod salivary gland will induce arthropod salivary gland failure, and will reduce arthropod feeding capabilities; and we have identified compounds that will accomplish this goal. Our data show that administering Kir channel inhibitors (or genetic depletion of Kir channels specifically in the salivary gland) reduces food intake and increases feeding time in *Drosophila melanogaster*. Our data show that pharmacological modulation of Kir channels ($K_{ATP}$) eliminates salivary gland secretion and reduces or prevents blood ingestion by the tick *Amblyomma americanum*. Our data show that topical exposure or ingestion of Kir channel modulators while blood feeding prevents blood ingestion by *Aedes aegypti* mosquitoes in 97.9% of mosquitoes. and reduces intake by 99.9% in the remaining 2.1%.

Our data show that Kir modulation with diverse scaffolds eliminates the ability of horn flies to ingest blood. Our data show that topical exposure of Kir channel modulators by treated cotton leaves eliminates all feeding phases (ingestion, egestion, salivation) in the cotton aphid. Our data show that modulation of inward $K^+$ ion conductance in the arthropod salivary gland will induce mortality through an inability to osmoregulate. Our data show that that modulation of inward K+ ion conductance in the arthropod salivary gland reduces transmission of vector-borne pathogens.

We have discovered that VU041 and other classical Kir channel modulators block feeding and prevent salivation in non-blood feeding arthropods. We have discovered that pinacidil, VU063, and other modulators of ATP-sensitive Kir channels block feeding and prevent salivation in blood feeding arthropods.

BRIEF DESCRIPTION OF THE DRAWINGS

FIGS. 1(A) and 1(B) depict the structures of VU041 and VU937, respectively.

FIG. 2(A) depicts cumulative consumption of sucrose solution by *Drosophila* 1, 2, 3, and 4 days post-emergence. Controls are designated by solid circles, dopamine treatment by open squares, and fluphenazine treatment by open circles. FIG. 2(B) depicts cumulative consumption of sucrose solution by *Drosophila* 1, 2, 3, and 4 days post-emergence. Controls are designated by solid circles, VU041 treatment by open squares, and VU937 treatment by open circles. FIG. 2(C) depicts a concentration-response curve comparing total consumption values collected on day 4 for VU041 (closed circles) and VU937 (open square). FIG. 2(D) depicts the effects of added extracellular potassium to VU041-mediated reduction of consumption. Control (upper solid line) and VU041 (200 μM; lower solid line) traces are duplicated from FIG. 2(A) for comparison to consumption with 300 μM potassium alone (trace with open circles) and 500 μM potassium+300 μM VU041 (trace with open square) traces.

FIG. 3 displays the average fold-change in *Drosophila* mRNA levels relative to that in wild type Oregon-R control salivary glands. The left bar is wild type; the middle bar is GFP-KD (control); and the right bar is irk1-KD.

FIG. 4(A) depicts cumulative consumption of sucrose solution by *Drosophila* 1, 2, 3, and 4 days post-emergence. Controls are the middle, solid circles. GFP knockdown are the open squares, and irk1 knockdown are the lower, solid circles. FIG. 4(B) depicts cumulative feeding time for sucrose solution by *Drosophila* 1, 2, and 3 days post-emergence. Controls are the left bar on each day; GFP knockdown are the middle bar on each day, and irk1 knockdown are the right bar on each day. Asterisks indicate results whose difference from control is statistically significant ($P<0.05$).

FIG. 5 depicts the structures of compounds VU041, VU937, and VU 730.

FIGS. 6(A) and 6(B) depict the dose-mortality relationship for VU041 against different strains of mosquitoes, as indicated in the respective legends. FIG. 6(C) depicts abdominal diameters of mosquitoes treated with vehicle, control, or VU041 as a function of time elapsed following blood feeding. FIG. 6(D) depicts diuresis of mosquitoes treated with vehicle, control, or VU041.

FIGS. 7(A) and 7(B) depict the number of eggs laid per female for the mosquito species *Anopheles gambiae* and *Aedes aegypti*, respectively, following treatment with vehicle, control, and VU041.

FIGS. 8(A) and 8(B) depict the mortality of control versus VU041, and of control versus bifenthrin, respectively, on adult honeybees.

FIG. 9 depicts a synthesis of the compound VU041.

FIGS. 10(A)-(D) depict the influence of Kir channel blockage on fluid- and ion-secretion in the isolated tick salivary gland. FIG. 10(A) depicts a fluid secretion assay using a whole salivary gland with dopamine (DA) and the Kir channel blocker barium chloride. FIGS. 10 (B), (C), and (D) depict ion secretion rates for sodium, chloride, and potassium, respectively, following dopamine exposure (control) or Kir channel blockage ($BaCl_2$).

FIGS. 11(A)-(C) depict fluid secretion rates in isolated tick salivary glands after pharmacological modulations (as indicated) of $K_{ATP}$ channels, K2P channels, and the KCC transporter, respectively.

FIG. 12 depicts the percentage of mosquitoes able to take a blood meal in an artificial host system after exposure to various $K_{ATP}$ modulators, as assayed by abdominal fluorescence.

FIG. 13 depicts the ability of mosquitoes to consume blood following application of vehicle or pinacidil to the body or to the leg. Not shown are micrographs revealing that, following application of pinacidil, what little blood was consumed was diverted to the mosquito crop rather than the usual location in the midgut, thereby presumably limiting the ability of the mosquito to transmit viral pathogens.

FIGS. 14(A) and (B) depict measurements of aphid (*Aphis gossypi*) feeding on cotton leaves, as measured through the electrophenegraph technique; on control leaves and on leaves treated with the Kir inhibitor barium, respectively. A total of 8 replicates were studied for control, for barium-treated leaves, and for VU041-treated leaves. All animals in each group showed a nearly identical response. The animals on the control and VU937 (inactive analog of VU041) leaves fed normally, showing distinct egestion, salivation, and ingestion stages. The animals on the leaves treated with Kir modulators showed no discernable egestion, salivation, or ingestion.

FIGS. 15(A), (B), and (C) depict molecules found to inhibit insect Kir channels in a thallium flux fluorescent assay, as well as in patch clamp electrophysiology studies.

FIG. 16(A) depicts the molecular structure of pinacidil, (±)-N-Cyano-N'-4-pyridinyl-N"-(1,2,2-trimethylpropyl) guanidine, a cyanoguanidine drug that opens ATP-sensitive potassium channels.

FIG. 16(B) depicts total saliva secretion measured in a modified Ramsay assay in the tick *Amblyomma americanum*, in the presence of dopamine or pinacidil. These data and the data in FIGS. 16(C) and (D) show that ATP-gated Kir channels are critical for proper salivation in the tick.

FIG. 16(C) shows the effect of extrinsic ATP on inhibition of salivation by pinacidil. Secreted salivary volume at 20 minutes is shown in the presence of dopamine, ATP, pinacidil, or pinacidil+ATP. Different letters indicate statistically significant difference ($p<0.05$).

FIG. 16(D) depicts the concentration dependence of pinacidil-medicated inhibition after 10 minutes, 20 minutes, and 30 minutes.

FIG. 17(A) depicts the effect of different treatments (no blood meal, blood-fed control, pinacidil, VU041) on the average mass of the mosquito *Aedes aegypti* following a blood meal. Different letters indicate statistically significant difference ($p<0.05$).

FIG. 17(B) depicts the effect of different treatments (control, pinacidil, inactive analog) on the volume of cumulative blood ingestion as a function of time in the tick *Amblyomma americanum*.

MODES FOR PRACTICING THE INVENTION

Figure 1A:
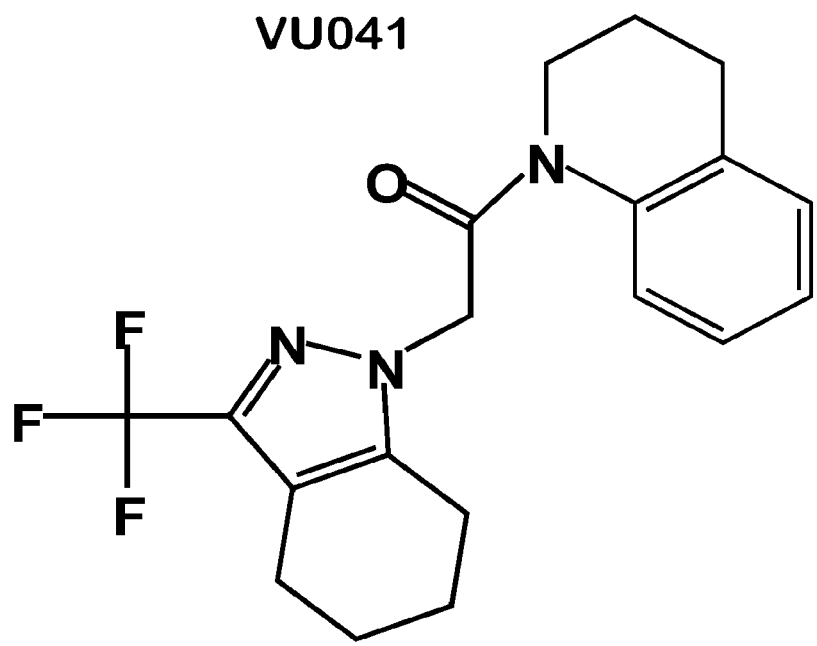
Figure 1B:
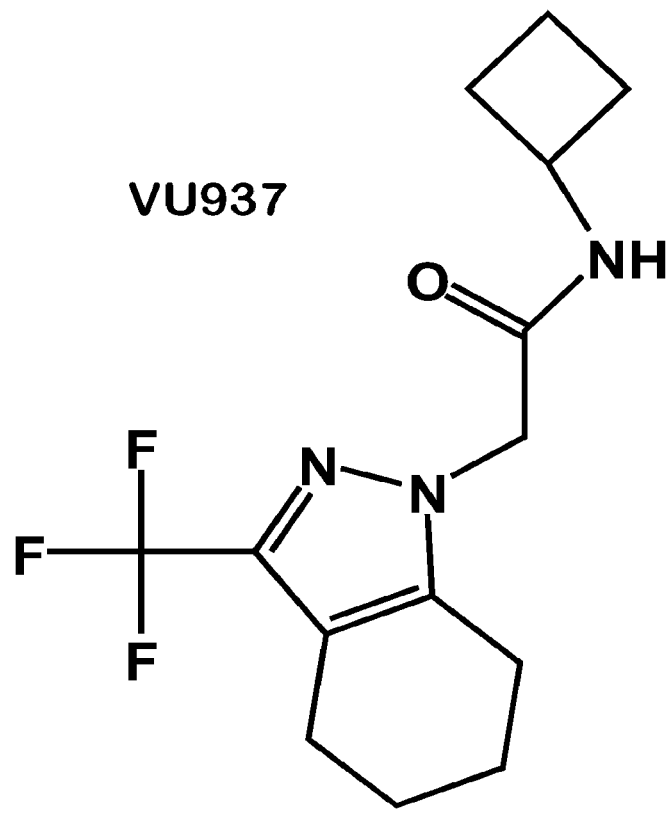

Ticks. We used different, structurally distinct, small-molecule modulators to demonstrate the effect of Kir and K2P channels on fluid secretion (salivation) and ion secretion (osmoregulation) in the tick salivary gland. Either barium chloride or VU041, both of which are Kir channel blockers, reduced salivary output by approximately 60%. Both significantly reduced $K^+$ and $Na^+$ ion secretion rates in salivary droplets. We also found that the subfamily of Kir channels known as ATP-gated potassium (Katp) channels play a critical role in salivation. Pinacidil, an activator of Katp channels, reduced saliva secretion in *Amblyomma americanum* by 97% as compared to control. Pinacidil's inhibition of salivation was concentration-dependent, with $IC_{50}$ values of 320 µM, 250 µM, and 120 µM at 10-, 20-, and 30-min of salivation, respectively. We used two tests to verify that pinacidil reduced salivation through $K_{ATP}$ channel modulation and not by off-target effects. First, since $K_{ATP}$ channels are blocked by ATP, and pinacidil is an activator of $K_{ATP}$ channels, we should be able to negate the pinacidil-induced inhibition of salivation by irreversibly blocking the channel with pre-exposure to ATP. Exposing the salivary glands to 600 µM pinacidil reduced total salivation volume from a control of 150 nL/5 min to 40 nL/5 min. However, pre-exposure to ATP negated this effect, with a total salivation volume of 142 nL/5 min, not statistically significant from control.

A second structurally diverse activator, VU063, eliminated salivation in the isolated salivary gland. Concentration-response curves with VU063 showed that VU063 inhibited salivation in isolated tick salivary glands with an $IC_{50}$ value of 772 nM, 560 nM, and 410 nM at 10-, 20-, and 30-min of salivation, respectively. Pre-exposure of the gland to ATP negated the inhibitory effect of VU063, and the use of an inactive molecule (an analog known to be inactive in mammalian $K_{ATP}$ channels) did not influence salivation. Our data showed that the K2P channels, which provide a small outward and/or inward current in excretory cells, play a critical role. In isolated salivary glands fluoxetine, an inhibitor of K2P channels, reduced salivation by 98%. These data show the critical importance of potassium conductance pathways for proper salivary gland function, salivation, and osmoregulation, in ticks and other arthropods. Targeting these pathways allows one to control salivation and feeding behavior. Preventing tick feeding by inhibiting the salivary gland will reduce vector disease transmission, because ticks have a prolonged period of feeding, and ticks typically do not begin transmitting pathogens to the host for 18-35 hours.

Modulation of tick $Kir/K_{ATP}$ channels dramatically reduced the volume of blood ingested, and dramatically altered blood feeding biology. We studied the effects of including pinacidil or VU063 in the blood meal on the per-tick volume of blood ingested. All ticks were observed attempting to feed by including rhodamine B, a fluorescent tracer, in the blood meal. Exposure to 400 µM pinacidil reduced the volume of blood ingested by up to 15-fold throughout the course of feeding. For instance, at day 6 of feeding, control ticks ingested a volume of 16±4 µL per day, while pinacidil-exposed ticks ingested 1.2±0.3 µL per day. Similarly, inclusion of VU063 at a concentration of 100 µM reduced the volume of ingested blood below the limits of detection; and these ticks' body weights were not statistically different from that of unfed ticks. The inactive analogs to these molecules resulted in ingested blood volume similar to that of controls.

Kir channel modulation also altered the tick behavior during blood feeding, in a manner that should reduce pathogen transmission. During blood feeding, ticks cement themselves onto the host and are capable of blood feeding for an extended period of time. Once a tick has attached it will generally not detach on its own accord until a blood meal is completed. Control ticks in our system mimicked this behavior. However, including pinacidil or VU063 in the blood meal dramatically altered tick feeding biology and behavior, as these ticks had a higher rate of detachment during blood feeding. Control ticks were found to detach an average of 0.11 times per feeding, while pinacidil- and VU063-treated ticks detached an average of 2.1 and 3.6 times per feeding, respectively. This behavior was likely due to failed salivary glands, inadequate feeding, and relocating in an attempt to find a more amenable site for acquiring blood.

The agent responsible for Lyme disease, the bacterium *Borrelia burgdorferi*, infects white-footed mice; the vector responsible for Lyme disease, the tick *Ixodes scapularis*, maintains the reservoir cycle in the rodents and also transmits the pathogen to humans, dogs, and other mammals. Wide-area campaigns are thought to offer the best prospects for interrupting the transmission of zoonotic pathogens. Two approaches have been tried for controlling Lyme disease transmission control, by targeting ticks on rodents. One approach uses topical treatments such as fipronil or permethrin administered in bait boxes (e.g., SELECT TCS™ Tick Control System) or treated tubes (e.g., Damminix Tick Tubes™). The other approach uses an oral bait to immunize mice against *B. burgdorferi*. Our research offers a new approach for interrupting the transmission of zoonotic pathogens such as *B. burgdorferi*. Small-molecule modulators that inhibit ion transport in the tick salivary gland can be used to prevent feeding and to mitigate disease transmission. Tick-selective compounds can be incorporated into clothing (e.g. military uniforms, outdoor clothing, etc.) to induce salivary gland failure. This method of fabric impregnation is similar to that currently used to kill biting flies with pyrethroids (e.g., Buzz Off™ clothing).

We employed the isolated tick salivary gland to determine the influence of slight structural variations of pinacidil, a cyanoguanidine-containing molecule, on salivary gland function and saliva secretion. Molecules containing a thiourea, cyanoguanidine, or nitroethene diamines significantly reduced tick salivation, by 80% or more, at a concentration of 500 µM. Urea-containing molecules had no influence on salivation, consistent with previous findings that they have no activity on the mammalian $K_{ATP}$ channel. Our findings strongly suggest that: (1) inhibition of salivation is due to pharmacological modulation of $K_{ATP}$ channels in the tick salivary gland, and (2) other $K_{ATP}$ channel modulators, besides pinacidil, can also inhibit salivation.

Tick Osmoregulation: Ticks employ their salivary glands as the tissue responsible for osmoregulation and therefore, inducing salivary gland failure would prevent the excretion of salts obtained from the host blood meal. Saliva collections from the isolated tick salivary gland after exposure to pinacidil, VU063, or nicorandil showed a significant reduction of cations (K+ and Na+) concentrations excreted from the salivary glands. These data show that inducing salivary gland failure through $K_{ATP}$ channel inhibition results in altered ion secretion rates and failure to osmoregulate.

Tick Toxicity: A failure to osmoregulate during blood feeding would result in a buildup of ions at toxic concentrations into the hemocoel. Indeed, incorporation of pinacidil into the blood meal induced a mortality rate of 65%, 72%, 88%, 94%, and 99% at days 1-, 2-, 3-, 4-, and 5. Importantly, injection of pinacidil into a non-blood fed tick was nontoxic and injection of K+ ions was lethal. These data highlight the notion that 1) KATP channels are a novel insecticide target site, and 2) inducing salivary gland failure is a novel mechanism of toxicity.

Mosquitoes. We identified the proteins Kir2A and Kir3 in the salivary glands of *Aedes aegypti* mosquitoes. Without wishing to be bound by this hypothesis, and informed by our data from *Drosophila*, we expect that the Kir2A protein is likely an obligate heteromer for the Katp channel in mosquitoes. We investigated the influence of Katp modulators on mosquito salivation and blood feeding. We employed an established assay to collect the saliva from a live mosquito. Injection of pinacidil or VU063 reduced the secreted saliva volume from 1.4 μL in control animals to 0.3 μL or 0.1 μL, respectively. These data suggest that Kir channels are critical for salivary gland function of mosquitoes.

To determine the role of salivary gland Kir channels in mosquito feeding, we exposed mosquitoes to pinacidil, VU063, or tolbutamide by adding the respective compounds to blood. Pinacidil, diazoxide, and VU063 are activators of ATP-gated Kir channels. Tolbutamide and glybenclamide are inhibitors of ATP-gated Kir channels. Exposure to these molecules reduced the total volume of blood consumed by 99%. The observed reduction in blood feeding was presumably due to 1) a failing salivary gland, or 2) inhibition of gustatory processes, or 3) a combination of both. Interestingly, the small amount of blood that was consumed was not directed to the mosquito midgut, as is usual during blood feeding, but instead was diverted to the crop, which is typically used for sugar storage after feeding on plant sap. In subsequent experiments we found that a Katp modulator (pinacidil) inhibited infection of mosquitoes by the Chickungunya virus after feeding on a blood meal, presumably as the result of diversion of the blood to the crop. Mosquitoes exposed to a Katp modulator did not become infected with the virus, and were not able to disseminate the virus to the salivary glands. Such mosquitoes would presumably not act as a disease vector capable of transmitting the pathogen. Without wishing to be bound by this hypothesis, this diversion of the blood meal is likely due to Katp-mediated depolarization of the sugar cell in the mouthparts, and is thus a gustatory response. This hypothesis is currently being tested through single-cell recordings on the sensilla of mosquito mouthparts. Thus far, electrophysiological recordings of the maxilla gustatory sensilla show that exposure to pinacidil elicits a spike in the sugar and bitter cells.

There are multiple modes the present invention can be used against mosquitoes. Using Katp channels to activate sugar cells to direct the final destination of a blood meal (crop versus midgut) is one approach. Katp modulators can be added to repellent sprays, including currently-marketed mosquito repellent sprays. The population of DEET-tolerant mosquitoes is increasing worldwide. By activating sugar cells on mosquito tarsi and mouthparts after a mosquito alights on a host, the mosquito's ability to blood-feed is reduced, and pathogen development within the mosquito is inhibited.

Aphids. In aphids, a specific Kir channel blocker (barium chloride at 300 micromolar) was coated onto leaf tissue, and the feeding behavior of the adult aphid was analyzed through the classical electrophenegraph technique. The data clearly showed a significant difference in phloem and xylem feeding ability as compared to control animals, highlighted by the inability of treated aphids to salivate into the plant to initiate feeding. These data support our finding that functional Kir channels are required for proper feeding in aphids. From observations on the three phases of feeding (salivation, egestion, and ingestion), we concluded that saliva secretion was altered, and that the salivary gland failed after exposure to Kir channel blockers.

Our data showed that Kir channels represent a critical conductance pathway in the salivary glands of aphids, a pathway that is required for feeding. No salivation was observed when the aphids were exposed to the Kir channel blocker VU041. Our observations were consistent with salivary gland failure. Exposure to the inactive analog VU937 did not affect feeding, and all phases of feeding were identical to control animals. Kir channel modulators, for example VU041, may be used to control aphid populations in an agricultural setting. Our data showed that VU041 essentially completely inhibited egestion, salivation, and ingestion in the cotton aphid, *Aphis gossypii*. The active compounds could be applied as a foliar spray, or as a composition taken up by a plant systemically. A water-soluble compound potent for the aphid Kir channel could be taken up by xylem and phloem, so that an aphid could be intoxicated immediately upon probing into the plant tissue. This mode of administration shares some similarities with the commonly-used aphid insecticide imidacloprid. Imidacloprid and other existing agents are commonly sprayed onto the soil, and then transported by the plant to leaf tissue, to ultimately poison aphids upon feeding.

Characterizing inward-rectifying potassium channels in the salivary glands of arthropod disease vectors. Inward-rectifying potassium (Kir) channels are a novel target site for controlling arthropod disease vectors. Kir channels constitute a critical conductance pathway that drives the function of the Malpighian tubules. Many arthropods use Malpighian tubules for osmoregulation. In ticks, however; the salivary gland is responsible for both osmoregulation and pathogen transmission. Surprisingly, we have found that Kir channels play similar physiological roles in the salivary gland and in Malpighian tubules. These discoveries allow us to target Kir channels in arthropod salivary glands for vector control.

We used a combination of genetic, pharmacological, physiological, and toxicological methods to characterize Kir channels in both fly and tick salivary glands. mRNA expression of Kir channel components is highly upregulated in arthropod salivary glands, suggesting that Kir channels constitute a critical conductance pathway in the salivary glands.

Identification and physiological characterization of inward rectifying potassium channels in the arthropod salivary gland. The tick salivary gland (SG) is responsible for blood meal acquisition, pathogen dissemination, and osmoregulation. The machinery underlying SG function in arthropods is not well-understood. We performed preliminary feeding studies in *Drosophila melanogaster* to assess the effect of Kir channel inhibition on sucrose consumption. Preliminary data suggested that pharmacological inhibition of Kir channels significantly (P<0.0001) reduced the total volume of sucrose solution ingested by individual flies from 1.4 µL/fly to 0.3 µL/fly.

Genetic knockdown of SG-specific Kir channels increased the time required to obtain a complete meal by approximately threefold, presumably due to impaired SG function in adult *Drosophila*. The open reading frames of SG-specific Kir channel constructs for two tick species, *Ixodes scapularis* and *Dermacentor variabilis*, are being cloned.

Preliminary studies on the isolated tick salivary gland showed that exposure to barium, a specific Kir channel blocker, significantly (P<0.01) decreased transepithelial fluid secretion from 270 nL/5 min to 141 nL/5 min, suggesting that Kir channels constitute a critical $K^+$ conductance pathway for proper salivary gland function in ticks.

Role of inward-rectifying potassium channels on salivary gland function and on sugar feeding of the fruit fly *Drosophila melanogaster*. The arthropod salivary gland plays a critical role in transmitting pathogens. The published literature lacks a detailed understanding of the ion conductance pathways responsible for saliva production and excretion. A superfamily of potassium ion channels known as inward-rectifying potassium (Kir) channels is overexpressed in the *Drosophila* salivary gland by 32-fold as compared to the whole-body mRNA transcripts. Our data support the hypothesis that pharmacological or genetic depletion of salivary gland-specific Kir channels would alter the efficiency of the salivary gland, and would reduce feeding capabilities. We used the fruit fly *Drosophila melanogaster* as a model organism for predicting effects in arthropod disease vectors. Exposing *D. melanogaster* to VU041, a selective Kir channel blocker, reduced the volume of sucrose consumption by up to 3.2-fold in a concentration-dependent manner, with an $EC_{50}$ of 68 µM. An inactive analog of VU041, VU937, did not influence feeding, suggesting that the reduced feeding seen with VU041 was indeed due to Kir channel inhibition.

We specifically knocked down Kir1 in the *D. melanogaster* salivary gland to assess the role of these channels in the salivary gland. The genetically-depleted fruit flies reduced total volume of sucrose solution ingested, and increased the time spent feeding, both observations consistent with reduced salivary gland function. We observed what appeared to be a compensatory mechanism at day 1 of RNAi-treated fruit flies—likely the $Na^+$—$K^+$-$2Cl^-$ cotransporter, or a $Na^+$—$K^+$-ATPase pump, either of which could help supplement the inward flow of $K^+$ ions, highlighting the functional redundancy in ion flux control in the salivary glands. This redundancy should not present any issues for deploying the invention against arthropod pests, because pharmacological exposure should induce acute poisoning before genetic upregulation of any compensatory mechanisms would have time to take effect. This general phenomenon is seen in the fast toxicity that follows poisoning with many commercial insecticides. Our findings showed that Kir channels are a principal conductance pathway in the *Drosophila* salivary gland, and constitute a pathway required for sucrose feeding.

The *Drosophila* salivary gland mainly comprises secretory cells that synthesize and secrete proteins required for feeding. The high expression of Kir1 in the salivary gland supports our finding that Kir channels play an important role in promoting salivary secretion.

We have discovered that Kir channels are essential to proper salivary gland function in *D. melanogaster*, and that the Kir channels are critical in the highly intricate physiological processes of feeding. We hypothesize that the same is true in blood-feeding and sap-feeding insects and arachnids as well. In a set of preliminary experiments, we used pharmacological inhibition and salivary gland-specific genetic depletion of Kir channels in the model organism *D. melanogaster* to demonstrate the physiological importance of Kir channels in fly salivary gland function, as measured by sucrose feeding efficiency.

*Drosophila* stocks and rearing conditions. Four strains of *D. melanogaster* were used: The wild type Oregon-R (OR) strain was provided by Dr. Jeffrey Bloomquist of the University of Florida, originally donated by Doug Knipple, Cornell University, Ithaca NY, USA. Different strains of GAL4-UAS flies were purchased from Bloomington *Drosophila* Stock Center (Bloomington, IN, USA). The GAL4-UAS strain 6870 has a promoter that causes constitutive expression in larval and adult salivary glands of dsRNA for RNAi against Kir1 (Ir) under upstream activating sequence (UAS) control in $F_1$ hybrids. The strain 41554 expresses hairpin RNA (hpRNA) under the control of UAS for RNAi of GFP, and was used as a negative knockdown control. The genotypes of each strain are as follows: 6870, w[1118]; P{w[+mC]=Sgs3-GAL4.PD}TP1; 42644, y[1] sc[*] v[1]; P{y[+t7.7] v[+t1.8]=TRiP.HMS02480}attP2; 41554, y[1] sc[*] v[1]; P{y[+t7.7] v[+t1.8]=VALIUM20-EGFP.shRNA.2}attP2.

All fly strains were maintained in culture at Louisiana State University. All fly strains were reared on standard medium in *Drosophila* tubes at 25° C., 12 hour-12 hour photoperiods, and 55% relative humidity. For dissection, flies were anaesthetized by chilling on ice, and were decapitated before dissecting out salivary glands in Schneider's medium (Invitrogen, Paisley, Scotland, UK).

Reagents. The Kir channel inhibitor VU041 and the inactive analog VU937 were synthesized by Dr. Corey Hopkins at the Vanderbilt Center for Neuroscience Drug Discovery using methods described in); D. R. Swale et al., An insecticide resistance-breaking mosquitocide targeting inward rectifier potassium channels in vectors of Zika virus and Malaria. *Scientific Reports* vol. 6, article no. 36954 (published online 16 Nov. 2016). Dopamine and the $D_1/D_2$ antagonist fluphenazine dihydrochloride were purchased from Sigma-Aldrich. FIGS. 1(a) and (b) depict the structures of VU041 and VU937, respectively.

Feeding assay. A capillary feeding assay (CAFE) was used to quantify the volume of sucrose solution consumed over a period of time; it was performed essentially as described in W. W. Ja, G. B. Carvalho, E. M. Mak, N. N. de la Rosa, A. Y. Fang, J. C. Liong, T. Brummel, S. Benzer, Prandiology of *Drosophila* and the CAFE assay. Proceedings of the National Academy of Sciences of the United States of America 104, 8253-8256 (2007); published online EpubMay 15 (10.1073/pnas.0702726104). Both sexes were used in this assay; nothing in the literature suggested there would be any differential expression between sexes. One adult fly was placed into a 2 mL glass vial with a screw lid that was pierced with a glass microcapillary tube having a truncated 200-µl pipette tip. The microcapillary tubes contained 5% (wt/vol) sucrose solution with a 5 µl mineral oil overlay to minimize evaporation. Each experiment included an identical CAFE chamber without flies to determine evaporative losses (typically 5-10% of the volume), which were subtracted from experimental readings. Concentrations of 100 µM dopamine and 100 µM fluphenazine were used to determine the influence of those agents on fly feeding. See FIG. 2A. Concentrations of 200 µM VU041 and 700 µM VU937 (solubility limits) were tested. See FIG. 2B. Exposure to VU041 yielded approximately 30% mortality, while less than 10% mortality was observed in control and VU937-treated animals. All dead flies were excluded from all time points of the study regardless of the time of death. Mean (n>25) values are shown in all figure panels, depicting total consumption.

Figure 2A:
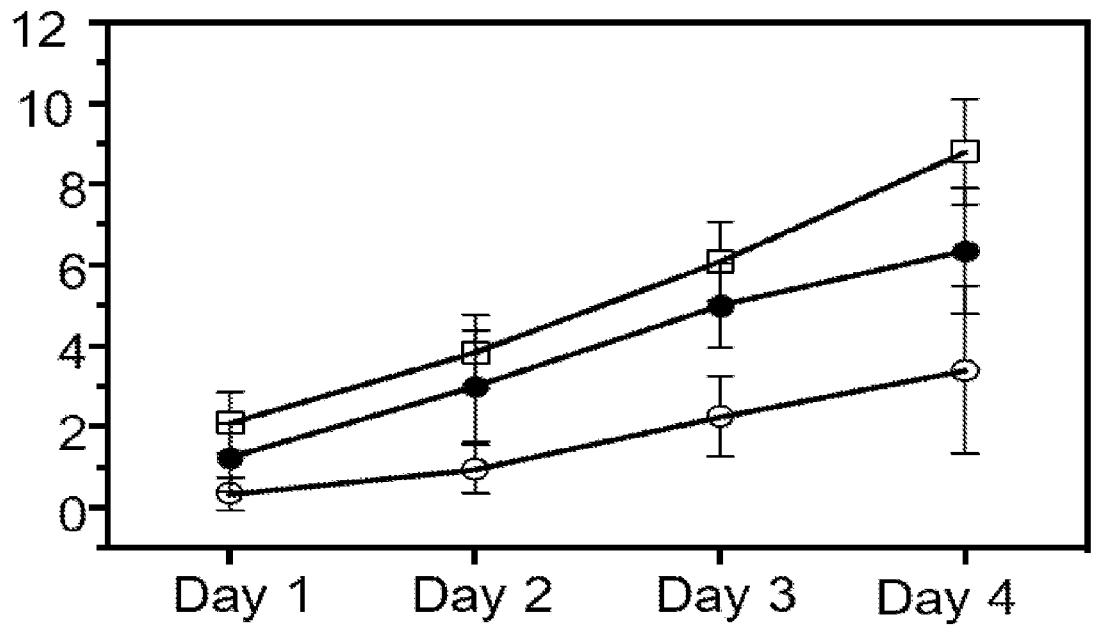
Figure 2B:
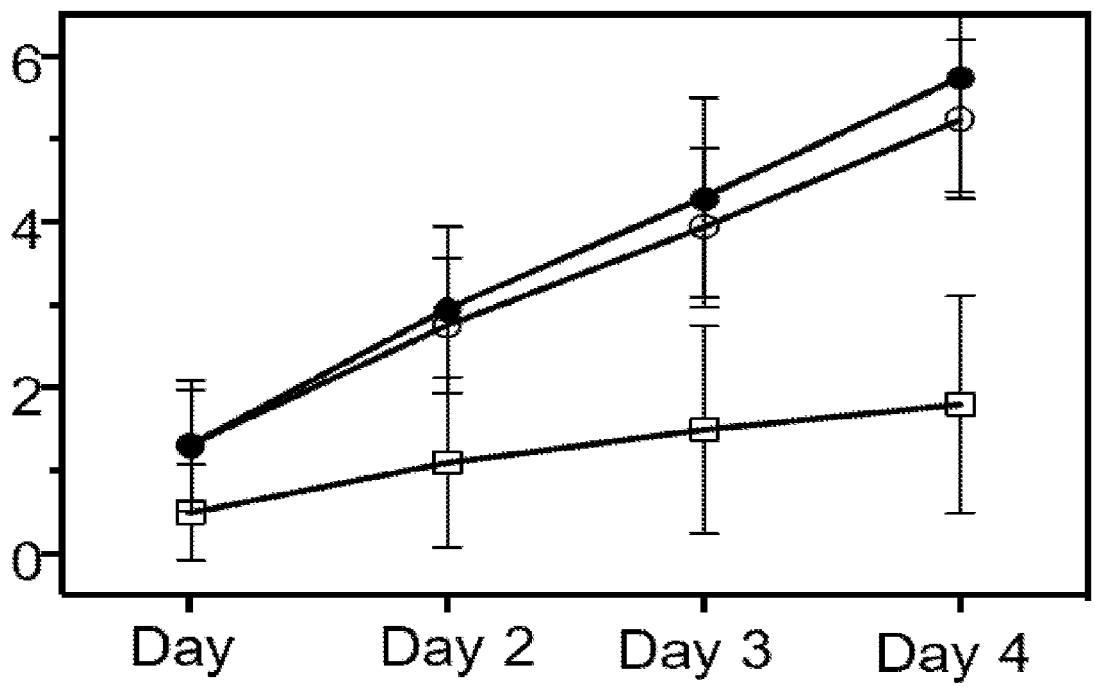
Figure 2C:
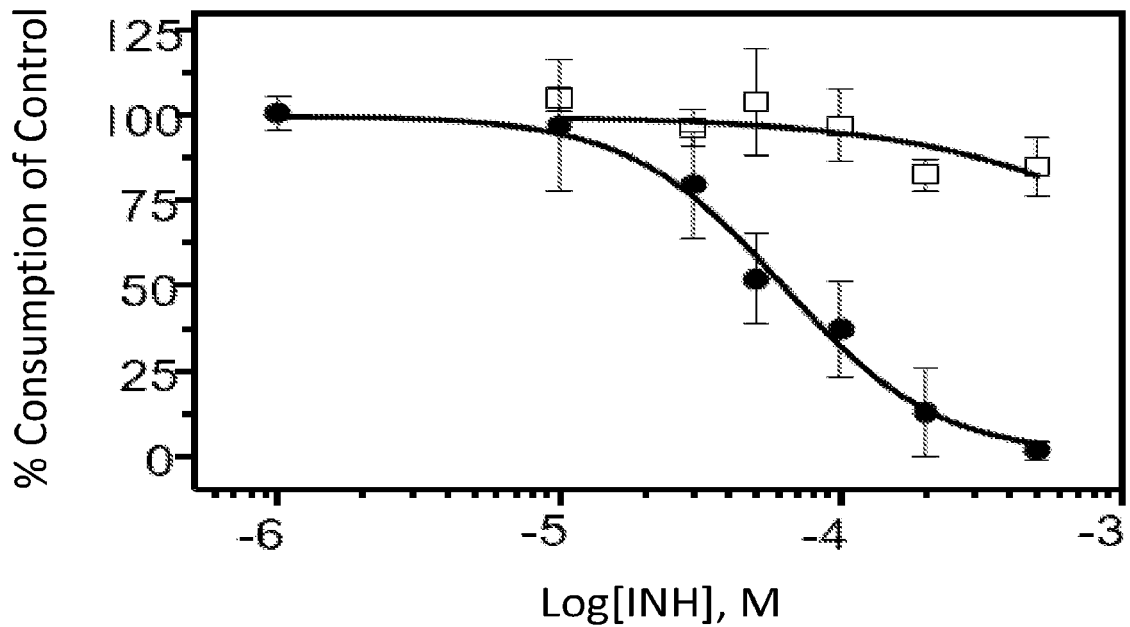
Figure 2D:
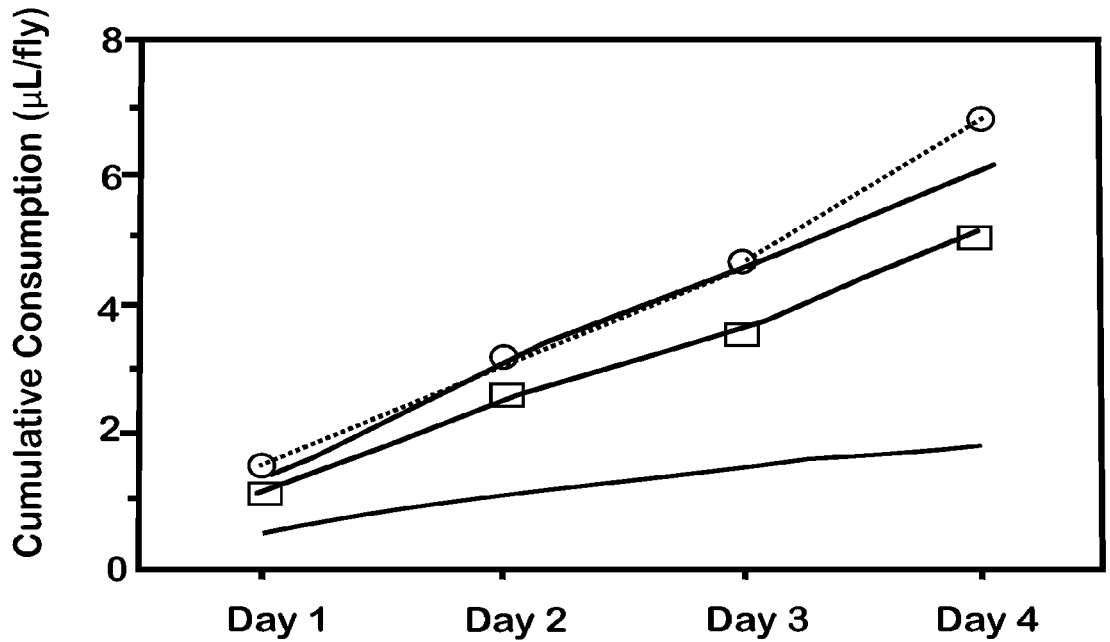

To determine the effect of potassium on the VU041-mediated reduction in sugar consumption, 500 µM potassium chloride was added to the 5% sucrose solution, and ingested volume was determined as described above. Treatments included a negative control of 5% sucrose solution, a treatment control of 5% sucrose solution+500 µM potassium chloride, the treatment of 5% sucrose solution+500 µM potassium chloride+200 µM VU041, and 5% sucrose solution+200 µM VU041 (FIG. 2D).

A feeding time assay was used to determine how long individual flies spent on the open end of the capillary tube, presumably feeding on the sugar solution. Flies with genetically-depleted, salivary gland-specific Kir channels were used in this experiment, and were monitored 1-, 2-, and 3-days post emergence. A GoPro HERO 3 video camera was mounted in front of the CAFE assay to record the flies over a 24-hour period. Videos were uploaded to a computer. The time spent feeding was measured and recorded as a mean (n>10) value.

Fluorescence microscopy. Individual adult flies were fed 5% sucrose solution plus 500 ppm rhodamine B with the CAFE feeding (described above). Individual specimens were placed in the well of a glass concave slide, and covered with a glass coverslip to prevent air currents in the laboratory from moving specimens during observation. The slides were placed on the stage of a fluorescence stereomicroscope (SteREO Lumar.V12, Carl Zeiss, Gottingen, Germany) and observed using incandescent illumination. Digital images were captured with AxioVision version 4.6 (Carl Zeiss) with an 800-ms exposure time. The specimens then were observed under fluorescence microscopy using a rhodamine filter cube (excitation wavelength, 540 nm; emission wavelength, 625 nm). Fluorescence images were captured at an exposure time of 300 ms. Minimal to no auto-fluorescence of the negative control negated the need to optimize the fluorescence exposure time.

Genetic knockdown of salivary gland specific Kir1. Advances in *Drosophila* genetics have enabled tissue-specific knockdown of specific genes through the GAL4-UAS system. This technology is based on the properties of the yeast transcriptional activator Gal4, which activates transcription of target genes by binding to an upstream activating sequence (UAS). The GAL4-UAS construct binds near the gene of interest, which in this case was hairpin RNA (hpRNA) for Kir1, to genetically enhance or decrease mRNA expression. See D. Busson, A. M. Pret, GAL4/UAS targeted gene expression for studying *Drosophila* Hedgehog signaling. Methods in molecular biology 397, 161-201 (2007)10.1007/978-1-59745-516-9_13); J. A. Fischer, E. Giniger, T. Maniatis, M. Ptashne, GAL4 activates transcription in *Drosophila*. Nature 332, 853-856 (1988); published online EpubApr 28 (10.1038/332853a0); J. B. Duffy, GAL4 system in *Drosophila*: a fly geneticist's Swiss army knife. Genesis 34, 1-15 (2002); published online EpubSep-Oct (10.1002/gene.10150). The two components GAL4 and UAS were carried in separate *Drosophila* stocks to allow for hundreds of combinatorial possibilities after a simple parental cross. This study used a strain of fly that expressed the GAL4-UAS promoter at all life stages, but only in the salivary glands, which enabled salivary gland-specific knockdown of Kir1.

Salivary gland-specific knockdown of Kir1 was achieved by crossing virgin females from a Kir1 RNAi strain (Bloomington stock 42644) with males from the salivary gland-expressing GAL4-UAS strain (Bloomington stock 6870). The flies were given 96 hours to mate and oviposit prior to removal from the *Drosophila* tube. $F_1$ offspring were allowed to emerge, and adults were used in the study immediately upon emergence. The genotype of the Kir1 RNAi (Bloomington stock 42644) was located on the X-chromosome, and therefore male GAL4-UAS flies (6870) were crossed with virgin females from strain 42644 or 41554.

Statistical analyses. Concentration response curves and $IC_{50}$ values using VU041 and VU937 were generated by fitting the Hill equation using variable-slope, unconstrained, nonlinear regression analyses performed with GraphPad Prism (GraphPad Software, San Diego, CA). Mean cumulative consumption values for VU937 and VU041 were compared to daily control consumption values by a one-way ANOVA with a Dunns multiple comparisons post-test. Times spent feeding in Kir1 and GFP genetic knockdown studies were compared to control values for each day using one-way ANOVA with a Dunns multiple comparisons post-test. Statistical significance for all studies was P<0.05.

Figure 3:
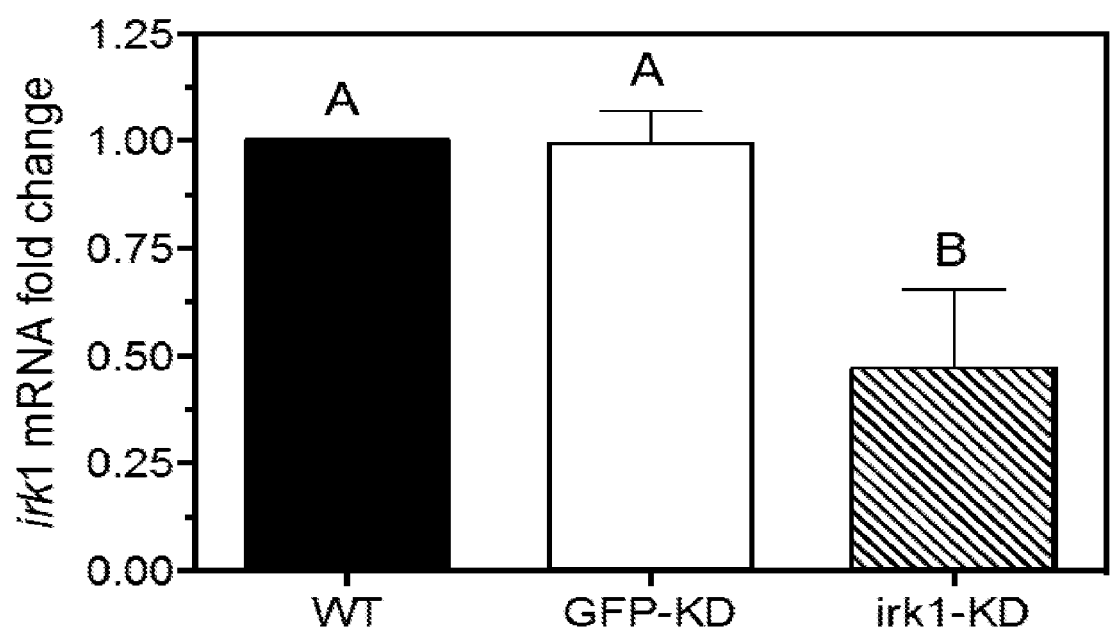

RNA isolation, cDNA synthesis, and quantitative PCR. Total RNA was isolated and extracted from 30 pairs of *Drosophila* salivary glands using TRIzol® Reagent (Life Technologies, Carlsbad, CA) and purified using the RNeasy kit (Qiagen, Valencia, CA). First-strand cDNA was synthesized from poly(A) RNA using the SuperScript® III First-Strand Synthesis System for real-time quantitative PCR (qRT-PCR) (Life Technologies) according to manufacturer instructions. qRT-PCR was then performed on an Qiagen Rotor Gene Q 2Plex Real-Time PCR System using the manufacturer instructions. Relative quantification was carried out using the $2^{-DDCT}$ method, with beta-actin used as the reference gene. Appropriate controls, such as DNase and removal of reverse transcriptase, were performed to ensure the sample was not contaminated with genomic DNA. All primers were purchased from Life Technologies: primer reference numbers for the irk1 and actin genes were Dm02143600_s1 and Dm02361909_s1, respectively. Five biological replicates were conducted, and each was analyzed in triplicate. FIG. 3 displays the average fold-change in mRNA levels relative to that in wild type Oregon-R control salivary glands. The left bar is wild type; the middle bar is GFP-KD (control); and the right bar is irk1-KD. (KD="knockdown")

Effect of pharmacological inhibition of Kir channels on sugar feeding. Dopamine is known to stimulate salivation in arthropods, so dopamine was used as a positive control to determine the utility of the CAFE assay for measuring alterations in feeding efficacy after exposure to small molecules that target salivation pathways. Mean (n>10) daily consumption volumes of sucrose for control flies were 1.25 µL 1 day post emergence (PE), 1.75 µL 2 days PE, 2 µL 3 days PE, and 1.35 µL 4 days PE (FIG. 2A). Dopamine was found to statistically increase the total volume of sucrose consumed as compared to control animals. There was a 1.7-fold increase in consumption at 1 day PE (P<0.05), 1.3-fold at 2 days PE (P<0.05), 1.2-fold at 3 days PE (P<0.05), and 1.4-fold at 4 days PE (P<0.05) (FIG. 2A). The dopamine receptor inhibitor fluphenazine significantly reduced total volume of sucrose solution ingested by 3.6-fold at 1 day PE (P<0.01), 3.1-fold at 2 days PE (P<0.001), 2.4-fold at 3 days PE (P<0.001), and 2.2-fold at 4 days PE (P<0.001) (FIG. 2A). The ability to measure feeding differences using pharmacological probes of the dopamine receptor enabled exploration of the role of Kir channels in *Drosophila* sucrose feeding through small molecules developed against the mosquito Kir1 channel. Mean (n>25) daily consumption of sucrose for control flies during this experiment was 1.3 µL 1 day PE, 1.65 µL 2 days PE, 1.35 µL 3 days PE, and 1.45 µL 4 days PE, nearly identical to the values observed during the dopamine studies. These data are shown in FIG. 2B, and are expressed as cumulative consumption. Pharmacological inhibition of Kir channels by the Kir channel inhibitor VU041 significantly reduced the total volume of sucrose solution ingested by flies by 2.6-fold at 1 day PE (P: 0.01), 2.7-fold at 2 days PE (P<0.001), 2.9-fold at 3 days PE (P<0.001), and 3.2-fold at 4 days PE (P<0.001) (FIG. 2B). The volume of sucrose solution ingested by flies exposed to the VU937 inactive analog of VU041 was not significantly different from that of control-treatment flies (FIG. 2B). The influence of VU041 on feeding was concentration-dependent, with an $EC_{50}$ of 68 µM (95% CI: 54 µM-79 µM). No difference in consumption was observed with the inactive analog VU937 at concentrations ranging up to 500 µM (FIG. 2C).

To visualize the volume of ingestion of sucrose solution, the fluorophore Rhodamine B was added to the sucrose solution, with or without VU041. Micrographs clearly illustrated that exposure to VU041 yielded a reduced intensity of fluorescence when compared to control treated flies, indicative of a reduced volume of sucrose solution ingested, consistent with the data in FIG. 2B.

Effect of increased potassium ions on total consumption of sucrose. We also hypothesized that Kir channels in *Drosophila* salivary glands are responsible for maintaining the high intracellular $K^+$ concentration that provides the $K^+$ ion gradient and enables the outward flow of potassium ions, presumably through $Ca^{2+}$-activated $K^+$-channels. To test this hypothesis, the potassium ion concentration in the sucrose solution was augmented to increase the potassium equilibrium constant of the channel ($E_k$; from the Nernst equation), which indirectly reduces the efficacy of intracellular $K^+$ channel inhibitors, such as VU041.

Supplementing the sucrose solution with 500 µM $K^+$ did not significantly alter the total volume of sucrose consumed when compared to the control animals (FIG. 2D; open circles, and line immediately underneath the open circles, respectively). However, increased potassium ion concentration significantly reduced the efficacy of VU041 for all days studied. The mean consumption of flies that were exposed to 500 µM $K^+$ and VU041 was 1.1 µL, 1.4 µL, 1 µL, and 1.45 µL at days 1-, 2-, 3-, and 4-PE, respectively, which did not differ significantly (P=0.7) from control flies. Conversely, high significance (P<0.001) was observed when daily consumption of sucrose for flies exposed only to VU041 was compared to that for those exposed to VU041+K. FIG. 2D shows a 2-, 2.3-, 2.3-, and 2.75-fold increase in total consumption for days 1-, 2-, 3-, and 4 days-PE, respectively.

Knockdown efficiency of irk1 in salivary glands. These data show that Kir channels play a critical role in feeding by adult *Drosophila*. But the possibility that small-molecule inhibitors might bind to additional proteins raised the question whether effects in a combination of tissues might be responsible for reducing feeding efficacy. To address this question, Kir1 mRNA levels were knocked down specifically in the salivary gland by RNA interference, using the GAL4-UAS system. Data showed the salivary glands of the $F_1$ progeny of irk1 knockdown cross expressed 53% less irk1 mRNA relative to the wild type (OR) and GFP dsRNA knockdown controls (FIG. 3).

Figure 4A:
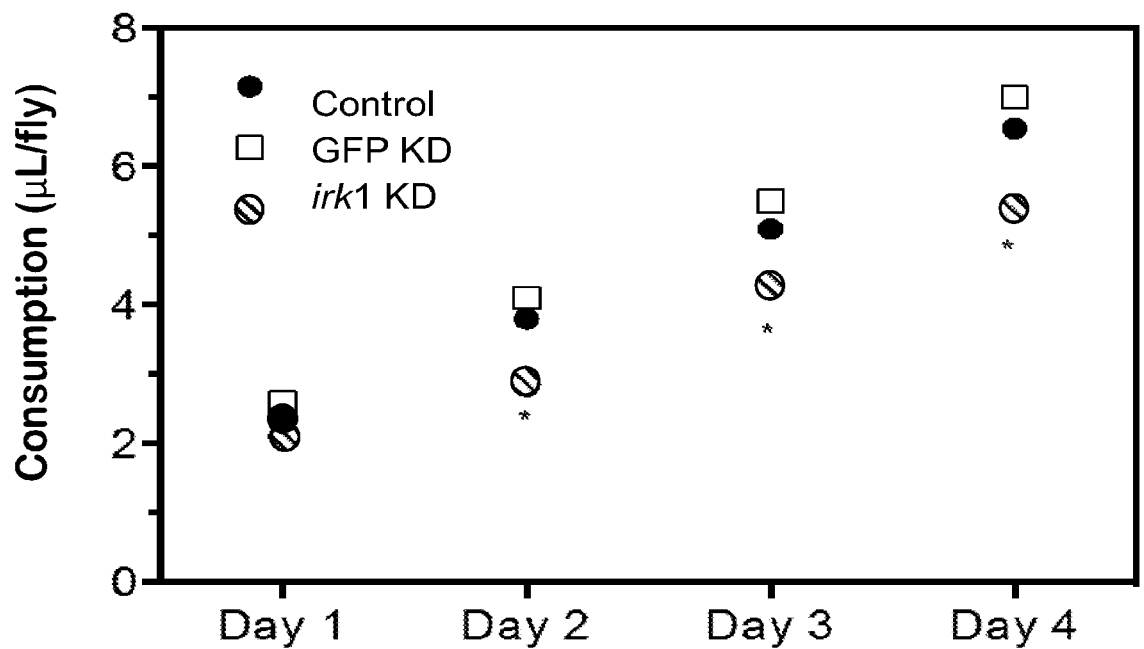
Figure 4B:
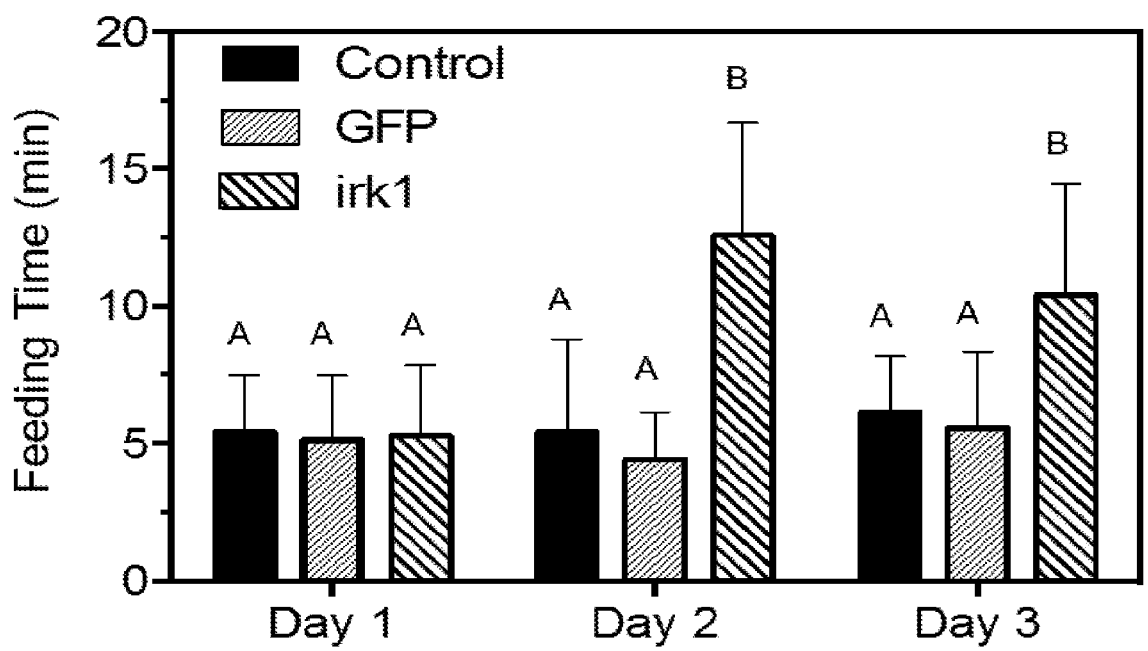

Influence of Kin knockdown on feeding efficiency. Pharmacological or genetic depletion of Kir channels inhibits Malpighian tubule function in flies and mosquitoes, which may negatively influence feeding through an inability to osmoregulate at the level of the Malpighian tubules. Genetic knockdown of salivary gland-specific Kir1 channels was employed to confirm that the reduced ingestion of sugar water shown in FIGS. 2A-D was indeed due to salivary gland failure, and not reduced osmoregulatory capabilities stemming from tubule failure. The data in FIG. 4A showed a significant reduction in total volume ingested for the Kir1 knockdown flies at post-emergence day 2 (P: 0.03), day 3 (P: 0.02), and day 4 (P: 0.005) when compared to control, but not at day 1 (P>0.05). The volume of sucrose ingested by the GFP knockdown flies did not differ from control. Although statistical significance was observed, a smaller than expected volume difference (c.a. 1 µL) between control and Kir1 knockdown flies was observed, perhaps due to the absence of external stimuli to inhibit continuous feeding within the CAFE assay. The time each individual fly rested on the bottom of the capillary tube was also assessed—presumably a time when the fly was feeding—at post emergence days 1, 2, and 3. Similar to the total consumption values, no significant difference in time spent feeding was observed for day 1, but a significant increase (P<0.001) in time spent feeding was observed for the Kir1 knockdown flies over control flies for days 2 and 3, with a 2.3- and 1.9-fold increase, respectively (FIG. 4B).

Discussion Despite the critical role the arthropod salivary gland serves in horizontal transmission of pathogens, an understanding of the machinery required for proper gland function is limited. Pharmacological studies against the isolated tick salivary gland have implicated several components involved in salivary secretion: dopaminergic pathway, $Na^+$—$K^+$-ATPase, GABA, and the muscarinic acetylcholine receptor. The present results provide compelling data that a superfamily of potassium ion channels, known as inward rectifier potassium channels, is also an essential conductance pathway in the salivary gland that mediates proper feeding in the model organism *Drosophila melanogaster*. We expect these channels to play a similar role in feeding by other arthropods, including mosquitoes, ticks, and aphids.

Insect Kir channels serve a critical role in Malpighian tubule function and fluid secretion. The Malpighian tubules and salivary glands are physiologically related tissues: Both are polarized epithelial tissues, both play primary roles in transporting water and ions, and both are considered, at least in part, to be exocrine tissues. Furthermore, the Kir1 channel has been shown to constitute the primary inward $K^+$ conductance channel in the mosquito Malpighian tubule; the homologous gene that encodes Kir1 in *Drosophila* is highly upregulated in the salivary glands of larval and adult flies. We hypothesized that Kir channels serve a critical role in salivary gland function. We elucidated the role of these channels through pharmacological and genetic manipulations of the Kir1 channel, measured through feeding efficiency.

We used the recently discovered insect Kir channel modulator (VU041) and an inactive analog (VU937) to characterize the influence of these molecules in the feeding cascade. Exposure to VU041 during feeding significantly reduced the volume of sucrose ingested, whereas VU937 had no influence on feeding efficiency, suggesting the observed phenotype acts through Kir inhibition. However, due to the possibility that small molecules might inhibit unintended target sites, and the fact that Kir channels are highly expressed in the Malpighian tubules, these observations alone did not necessarily mean that the observed effect on feeding was directly due to salivary gland failure. To confirm that hypothesis we also studied salivary gland-specific RNAi-mediated knockdown of the Kir1 encoding gene. Results from this genetic depletion of Kir1 showed a significantly less efficient salivary gland; and, when combined with the VU041-mediated reduction in sucrose consumption, strongly supported our hypothesis that the *Drosophila* salivary gland relies on inward conductance of $K^+$ ions through Kir channels.

The data from this study raised the question of the physiological role of the Kir channels in salivary gland function at the cellular level. Electrolyte secretion in mammalian salivary glands is based on secondary active transport of anions, principally $Cl^-$ (and/or $HCO_3^-$) ions. $K^+$ channels in the basolateral membrane of acinar cells maintain the membrane potential of the apical cell membrane to be more negative than the Nernst potential for anions, thereby providing a driving force for sustained electrogenic anion efflux across the apical membrane. The second model for a role for Kir channels in the mammalian salivary gland was described through cell-attached patch and whole-cell patch-clamp studies. Here, researchers demonstrated the presence of four primary $K^+$ channels, two of which are the outward mediated $Ca^{2+}$-activated $K^+$ channel and a Kir channel. The inwardly rectifying property of the Kir channel was hypothesized to perform fast uptake of accumulated $K^+$ ions, in concert with $Na^+$—$K^+$-ATPase, into acinar cells with the $K^+$ influx depending on the relation between the membrane potential and the concentration gradient of $K^+$ across the basolateral membrane. This buffering action likely provides an ion gradient enabling the outward flow of $K^+$ ions through $Ca^{2+}$-activated $K^+$ channels.

Our experiments elucidated the role of Kir channels in the insect salivary gland. The potassium ion concentration in the sucrose solution was augmented to increase the potassium equilibrium constant of the channel ($E_K$; from the Nernst equation), which ultimately reduces the efficacy of intracellular $K^+$ channel inhibitors, such as Kir channel blockers. The loss of VU041 potency supported the notion that Kir channels provide a pathway for rapid influx of $K^+$ ions after depolarization events, a phenomenon often referred to as $K^+$-spatial buffering. It was hypothesized that Kir channels in *Drosophila* salivary glands are responsible, at least in part, for maintaining a high intracellular $K^+$ concentration through a buffering-like action, which provides the $K^+$ ion gradient to enable the outward flow of potassium ions, presumably through $Ca^{2+}$-activated $K^+$-channels.

Kir channels are not the only transport pathway facilitating inward flow of $K^+$ ions. Genetic depletion of Kir1 channels yielded a reduction of feeding at days 2, 3, and 4, but not on day 1. The time spent feeding was not statistically different from controls at day 1 when compared to subsequent days. These data suggest the presence of a compensatory mechanism that accounts for the reduced expression of Kir1 in the genetically depleted animals, but that is lost after day 1. Compensatory mechanisms are commonly observed in animals with genetic depletions of Kir channels, and may arise through upregulation of a different Kir gene. For instance, it has been reported that individual knockdown of any of the three Kir channel genes in *Drosophila* Malpighian tubules has no effect on organ function, yet simultaneous knockdown of irk1 and irk2 has significant effects on transepithelial $K^+$ transport, suggesting that Kir1 and Kir2 play redundant roles in Malpighian tubule function. Kir1 and Kir2 mRNA are both expressed in the *Drosophila* salivary gland, albeit with dramatically different mRNA expression levels. It is plausible that the Ir2 gene is upregulated after genetic depletion of Kir1, which may account for the absence of an effect on feeding at day 1. Furthermore, the Malpighian tubules partially rely on the $Na^+$—$K^+$-$2Cl^-$ cotransporter and $Na^+$—$K^+$-ATPase pump to establish a high intracellular $K^+$ ion gradient. The compensatory systems of the Malpighian tubules and the expression of the same conductance pathways in the salivary glands highlight the possibility that the *Drosophila* salivary gland is capable of utilizing the same pathways for establishing the intracellular $K^+$ ion concentration as well as providing redundancy in the system for salivary gland $K^+$ excretion. These results provide proof-of-concept that VU041 can be used as part of a vector control agent for disrupting blood feeding and pathogen transport.

An insecticide resistance-breaking mosquitocide targeting inward rectifier potassium channels in vectors of Zika virus and malaria. We have discovered a topically active, small-molecule mosquitocide (VU041) with a novel mechanism of action; viz., inhibition of inward rectifier potassium (Kir) channels. VU041 is equally toxic against representative insecticide-susceptible and insecticide-resistant strains of *Aedes aegypti* and *Anopheles gambiae*. However, it is non-toxic to honeybees. Topical application of VU041 inhibits post-blood-meal fluid-volume regulation. Lead optimization efforts yielded a VU041 derivative, named VU730, which is topically active and highly selective for mosquito versus mammalian Kir channels. VU041 and its active analogs can be used as a safe and selective mosquitocide to combat the emerging problem of insecticide-resistance.

VU041 is a submicromolar-affinity inhibitor of *Anopheles* (*An.*) *gambiae* and *Aedes* (*Ae.*) *aegypti* Kir1 channels. VU041 incapacitates adult female mosquitoes from representative insecticide-susceptible and -resistant strains of *An. gambiae* (G3 and Akron, respectively) and *Ae. aegypti* (Liverpool and Puerto Rico, respectively) following topical application. VU041 is selective for mosquito Kir channels over several mammalian orthologs, with the exception of Kir2.1. VU041 is not lethal to honeybees. An analog, VU730, retains activity toward mosquito Kir1 but is not active against Kir2.1 or other mammalian Kir channels. Thus, VU041 and VU730 and their analogs can be used as new classes of insecticides to combat insecticide-resistant mosquitoes and the transmission of mosquito-borne diseases, such as Zika virus, without harmful effects on humans, other mammals, or beneficial insects.

We have discovered that inward rectifier potassium (Kir) channels can be used as targets for new mosquitocides. In *Drosophila melanogaster*, embryonic depletion of Kir1, Kir2, or Kir3 mRNA levels leads to death or defects in wing development. Knocking down Kir1 and Kir2 mRNA expression in the heart and Malpighian (renal) tubules of *Drosophila*, respectively, inhibits the immune response against cardiotropic viruses and transepithelial secretion of fluid and $K^+$. In yellow fever mosquitoes (i.e. *Ae. aegypti*), pharmacological inhibition of Kir1 with structurally-distinct small molecules (e.g., VU573, VU590, or VU625) disrupts the secretion of fluid and $K^+$ in isolated Malpighian tubules, and impairs flight, urine production, and $K^+$ homeostasis in intact females. It is desirable to have inhibitors that are specific for mosquito Kir channels over mammalian Kir channels, since the latter play fundamental roles in nerve, muscle, endocrine, and epithelial cell function in humans and other mammals.

We have discovered that VU041, a Kir1 inhibitor, exhibits similar toxicity to adult female mosquitoes from representative insecticide-susceptible and -resistant strains of *An.* gambiae (G3 and Akron, respectively) and *Ae. aegypti* (Liverpool and Puerto Rico, respectively). Moreover, topical VU041 application to adult female mosquitoes of both species inhibits their fecundity. Importantly, VU041 is selective for mosquito Kir channels over mammalian Kir channel orthologs, and it is non-lethal to adult honeybees (*Apis mellifera*). VU041 may be used to control mosquitoes without harmful effects on humans and beneficial insects.

VU041. VU041 is the molecule 1-(3,4-dihydroquinolin-1(2H)-yl)-2-(3-(trifluoromethyl)-4,5,6,7-tetrahydro-1H-indazol-1-yl)ethan-1-one. VU041 is a potent inhibitor of AnKir1-dependent thallium (Tl$^+$) flux in vitro. VU041 has a high partition coefficient (cLogP>4) for penetrating the mosquito cuticle.

In whole-cell patch clamp experiments, VU041 inhibited AnKir1 with an $IC_{50}$ of 496 nM (95% CI: 396-619 nM; Hill coefficient value of 1.3), making it the second most potent in vitro inhibitor of mosquito Kir1 channels discovered to date. (VU625 is a more potent in vitro inhibitor ($IC_{50}$~100 nM), but it is not topically toxic to mosquitoes, which prevents practical use.)

The selectivity of VU041 for mosquito vs. mammalian Kir channels was evaluated in quantitative Tl$^+$ flux experiments against AnKir1, AeKir1, and a panel of Kir channels that play critical physiological roles in mammals: Kir1.1 (kidney), Kir2.1 (heart, brain), Kir4.1 (kidney, brain), Kir6.2/SUR1 (pancreas, brain), and Kir7.1 (broadly expressed). VU041 inhibited AnKir1 and AeKir1 with $IC_{50}$ values of 2.5 µM and 1.7 µM, respectively. VU041 inhibited mammalian Kir1.1, Kir4.1, Kir6.2/SUR1, and Kir7.1 by less than 10% at a concentration of 30 µM. The only mammalian Kir channel tested that VU041 inhibited appreciably was Kir2.1 ($IC_{50}$ of 12.7 µM).

Figure 5:
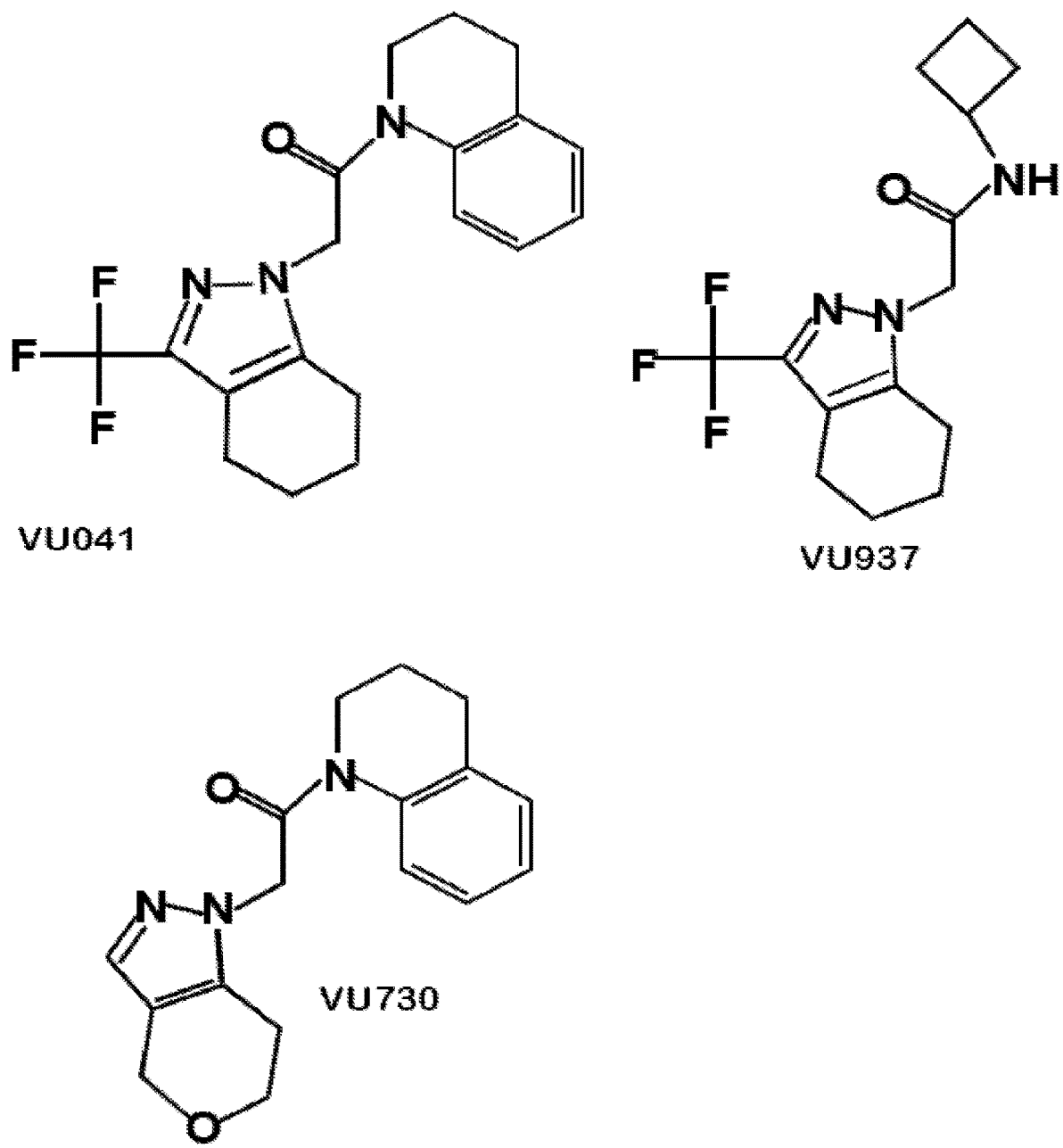

Analogs of VU041 to enhance potency and mosquito selectivity. Analogs of VU041 were synthesized with the goal of improving the selectivity of a VU041-like molecule for AnKir1 vs. Kir2.1. The first library of analogs was designed to keep the dihydroquinoline portion of the molecule constant, evaluating variations in the heterocyclic portion. One compound (VU730, FIG. 5) retained activity toward AnKir1 ($IC_{50}$=2.4 µM in Tl$^+$ flux assays; $IC_{50}$=717 nM in patch clamp experiments, but lost activity toward Kir2.1 ($IC_{50>30}$ µM in Tl$^+$ flux assays). The next library of analogs kept the trifluoromethyl tetrahydropyrazole portion of the molecule constant, while varying the amide portion of the molecule. Although none of the compounds in this series showed an increase in potency against AnKir1, VU937 (FIG. 5) inhibited AnKir1 channel activity in patch clamp experiments by 60-fold less than VU041 ($IC_{50}$=29.7 µM; 95% CI: 17.7-49.9 µM). With its significantly lower potency, VU937 was used in subsequent experiments as an 'inactive' analog to confirm that any toxic or physiological effects of VU041 on mosquitoes were associated with the inhibition of Kir1.

VU041 is equally toxic to insecticide-susceptible and -resistant strains of mosquitoes. A distinct advantage of the present invention is that it is effective against mosquito populations that have developed resistance to conventional insecticides.

Figure 6A:
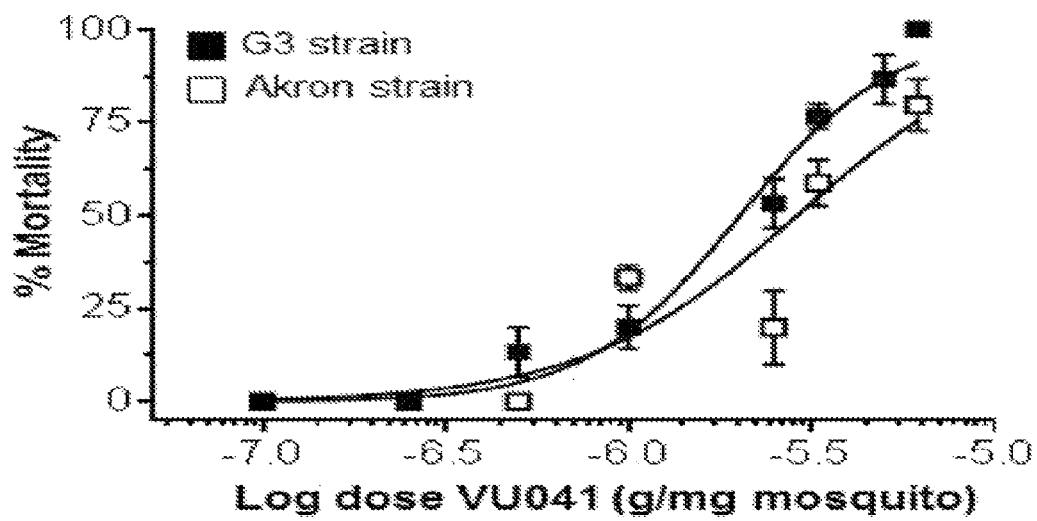
Figure 6B:
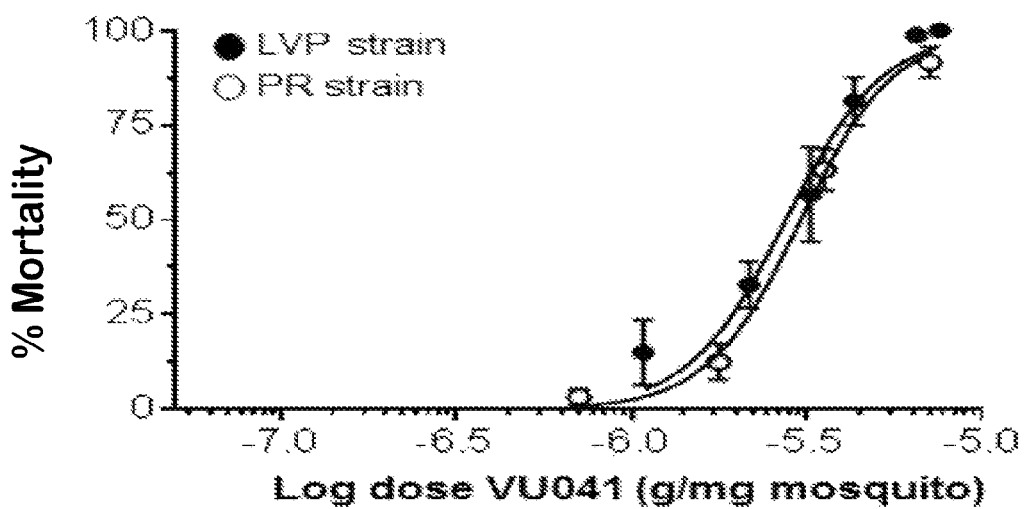

To determine the topical toxicity of VU041 against mosquitoes, the compound was applied to the cuticles of insecticide-susceptible and insecticide-resistant strains of *An. gambiae* and *Ae. aegypti* (adult females), and efficacy was assessed 24 h later. The resistant 'Akron' strain of *An. gambiae* is resistant to permethrin (33-fold) and propoxur (101-fold) when compared to the susceptible G3 strain of *An. gambiae*. The 'Akron' strain is known to express resistance through target-site (kdr) and Modified Acetylcholine Esterase (MACE) and metabolic resistance mechanisms. The resistant 'Puerto Rico' (PR) strain of *Ae. aegypti* possesses target-site (kdr) resistance (J.J. Becnel and BEI resources, personal communications), which contrasts with another Puerto Rican strain that possesses elevated mRNA levels encoding CYP450 enzymes. The $ED_{50}$, or effective dose to incapacitate 50% of the mosquitoes, for VU041 was similar for the insecticide-susceptible and -resistant strains of each species (FIGS. 6(A) & 6(B)). In both species, VU937 was not toxic, suggesting that the toxicity of VU041 was associated with its inhibition of Kir1 channels.

Pretreatment of the susceptible (G3) strain with piperonyl butoxide (PBO), an inhibitor of cytochrome P450 monoxygenases (CYP450s), enhanced the efficacy of VU041 by ~3-fold, whereas pre-treatment with S,S,S-tributyl phosphorotrithioate (DEF), an inhibitor of carboxylesterases, did not enhance toxicity. Inhibition of CYP450s in the AKRON strain, which overexpress some CYP450 genes up to 12-fold, enhanced toxicity 3-fold over the G3 strain, likely due to the increased levels of metabolic enzymes and the resulting altered pharmacokinetics and pharmacodynamics in the resistant strain. Thus VU041 was only moderately metabolized by cytochrome P450 enzymes, and it did not appear to be metabolized by esterases. Experiments in the G3 strain of *An. gambiae* with VU730, which does not inhibit mammalian Kir2.1, showed an $ED_{50}$ similar to that for VU041. Thus, VU041 is believed to be the first reported small-molecule inhibitor of mosquito Kir1 channels that exhibits topical toxicity against both insecticide-susceptible and insecticide-resistant lines of mosquitoes. Moreover, the structure VU041 can be modified to reduce its inhibition effects against mammalian Kir2.1 without affecting its efficacy as a mosquitocide (e.g., VU730).

Figure 6C:
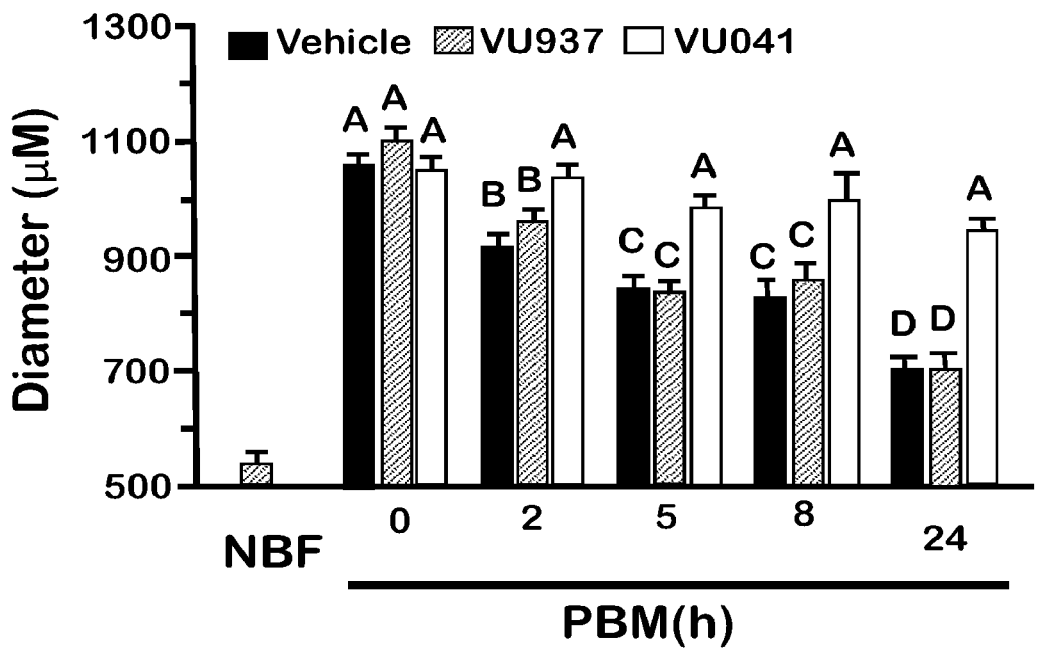

VU041 inhibits renal excretory function in mosquitoes. A signature feature of inhibiting Kir channels in mosquitoes is impairment of fluid secretion/urine production in Malpighian tubules, which reduces the mosquito's diuresis. Diuresis plays an especially important role in adult female mosquitoes after a blood meal; excess fluid and electrolytes are excreted and absorbed into the hemolymph. Experiments were conducted to determine whether VU041 disrupts fluid-volume regulation associated with blood meal processing in *An. gambiae* mosquitoes. Immediately after engorgement, mosquitoes were treated with an $ED_{30}$ dose of VU041, and their abdominal diameters were measured over the following 24 h. In vehicle (control)- and VU937-treated mosquitoes, abdominal diameter increased approximately 2-fold immediately following blood feeding (FIG. 6(C)), and then decreased significantly over 24 h. In striking contrast, although the abdominal diameter of VU041-treated mosquitoes initially increased similarly, it did not thereafter change much during the following 24 hours, an observation that is consistent with VU041-dependent inhibition of fluid-volume excretion.

Figure 6D:
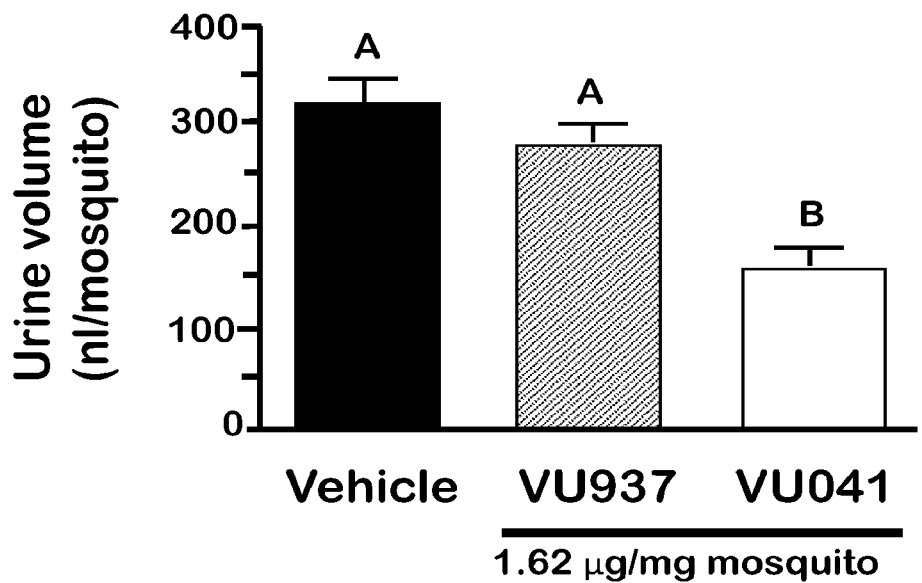

To directly determine whether VU041 impairs mosquito excretion, an in vivo diuresis assay was performed on adult female *Ae. aegypti*, with the inhibitors applied topically. The diuretic capacities of control and VU937-treated mosquitoes were similar to one another, whereas the diuretic capacity of VU041-treated mosquitoes was significantly lower, by ~51%, as compared to controls (FIG. 6(D)). Taken together with the data in FIG. 6(C), these results suggest that VU041 impairs renal excretory function and fluid-volume regulation during blood meal processing in mosquitoes.

VU041 reduces mosquito fecundity. VU041 disrupts blood meal processing and diuresis in mosquitoes (FIGS.

Figure 7A:
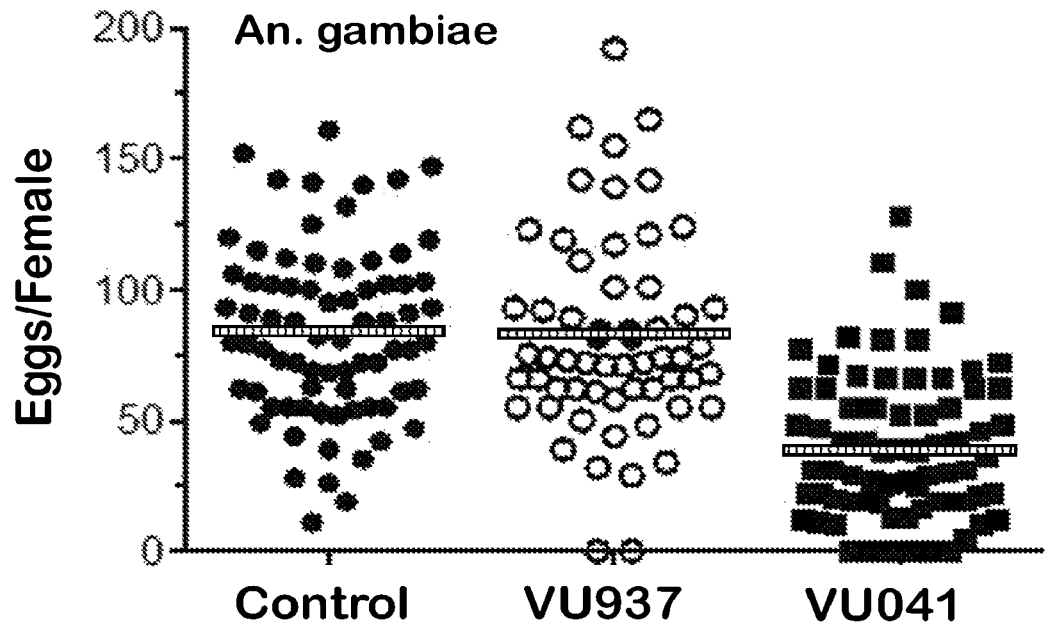
Figure 7B:
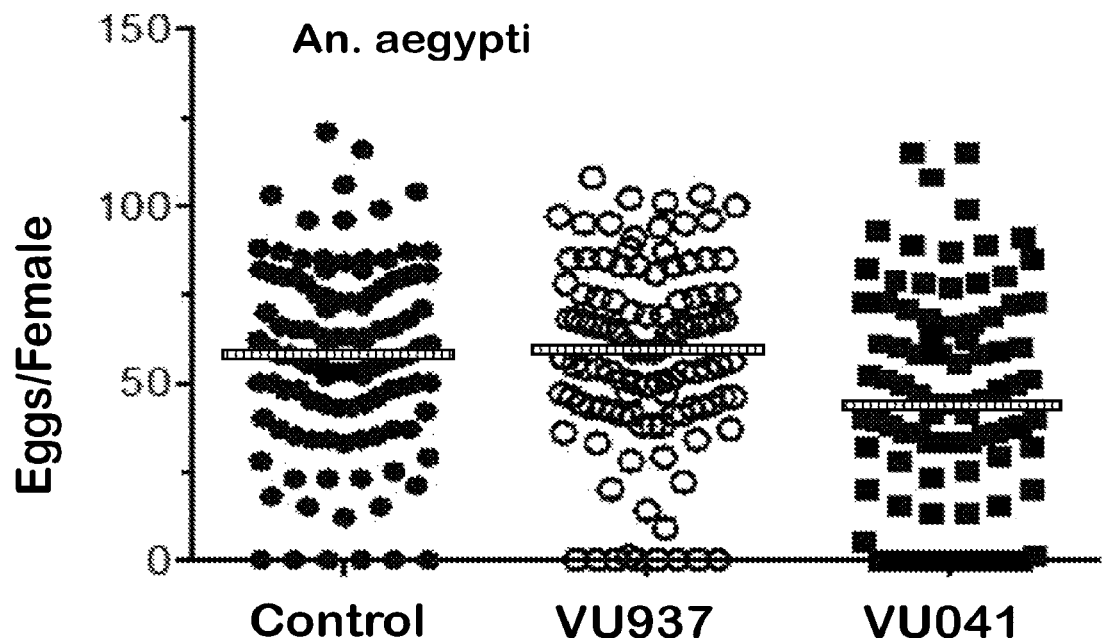

6(C) & 6(D)). Knockdown of AnKir1 expression via RNA interference reduces fecundity. We hypothesized that VU041 would also reduce egg laying after blood feeding. Adult female mosquitoes of both species were topically treated with ~1 µg/mg mosquito (*An. gambiae*) or 3.4 µg/mg mosquito (*Ae. aegypti*) of VU041 or up to ~10 µg/mg mosquito (solubility limit) of VU937 within 1 h after engorgement, and the total number of eggs laid per mosquito was counted 72 h post blood feeding. For both *An. gambiae* and *Ae. aegypti*, the control and VU937-treated mosquitoes laid a similar median number of eggs per mosquito, whereas the VU041-treated mosquitoes laid a significantly lower median number of eggs per mosquito (FIGS. 7A & 7B). Thus, VU041 reduced mosquito fecundity.

Figure 8A:
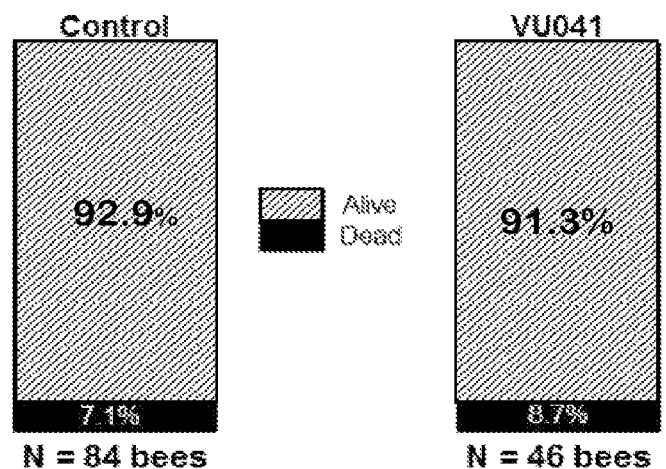
Figure 8B:
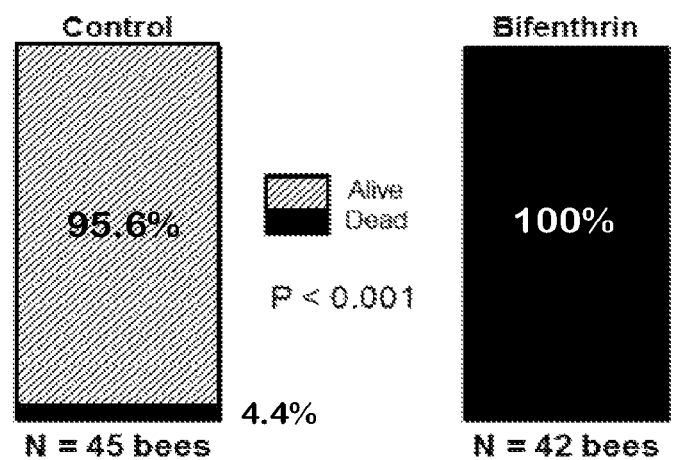

VU041 is not lethal to adult honeybees. Insecticidal activity against pollinators is undesirable, a factor whose importance has been highlighted in recent discussions about the role of insecticides in the decline of pollinator health. To determine whether VU041 is toxic to honeybees, 3-day old adult honeybees were treated topically on the thoracic notum with a limit dose of VU041 (1 mg/bee; i.e., ~10 µg/mg). Toxicity was assessed 48 h later compared to negative (vehicle) and positive (0.1 µg/bee bifenthrin) controls. As shown in FIG. 8, VU041 did not cause significant mortality to honeybees within 48 h as compared to the vehicle (Fisher's Exact Test, P=0.74, N=130), whereas application of bifenthrin resulted in 100% mortality at 48 h (P<0.001, N=87). Thus, VU041 is non-lethal to adult honeybees when applied topically.

Discussion Our data showed that a small molecule inhibitor of mosquito Kir channels (VU041) is a mosquitocide that overcomes insecticide resistance, and that it should be safe for humans and insect pollinators.

VU041 circumvents existing insecticide-resistance mechanisms. The Akron strain of *An. gambiae* used in some of our experiments carries multiple resistance mechanisms, including: 1) mutations in a voltage-gated $Na^+$-channel (kdr) that imparts resistance to pyrethroids, 2) mutations in an AChE (MACE, ace-1R) that confers resistance to carbamates, and 3) metabolic resistance derived from increased levels of CYP450s and carboxylesterases. The Puerto Rican (PR) strain of *Ae. aegypti* used in our experiments is resistant to pyrethroids via a single mechanism: a point mutation (kdr) in the voltage-gated sodium channel.

VU041 had similar efficacy against the LVP and PR strains of *Ae. aegypti*. However, mosquito strains with both target-site and metabolic resistance, such as the Akron strain of *An. gambiae*, might reasonably be expected to have the capacity to detoxify small molecules generally, regardless of the specific molecular target. However, VU041 showed similar efficacy against both the Akron and G3 strains of *An. gambiae*, showing that the detoxification mechanisms of the resistant Akron mosquitoes were ineffective against this new molecule.

Consistent with this finding, inhibiting CYP450s with PBO, or inhibiting esterases with DEF only nominally enhanced the toxicity of VU041 against the G3 strain of *An. gambiae*, showing that VU041 is inefficiently metabolized by these important detoxifying enzymes. By contrast, inhibiting CYP450s in the Akron strain enhanced toxicity of VU041 at a greater level as compared to the G3 strain, presumably due to the significant overexpression of multiple CYP450 genes in this resistant strain. These data are consistent with the hypothesis that VU041 is a "modest" substrate of this class of detoxification enzymes.

Mechanisms of action of VU041 against mosquitoes. In vivo experiments on blood meal processing and diuretic capacity suggested that one mechanism of action of VU041 is the disruption of excretory functions mediated by Malpighian tubules. The inhibition of Kir channels in Malpighian tubules could disrupt the processing of blood meals by limiting the excretion of blood-derived electrolytes and water absorbed into the hemolymph. There could also be effects on the midgut's digestion of blood, or absorption of ions or fluid from the blood. The mosquito midgut is a site of Kir mRNA expression and barium-sensitive $K^+$ transport. Our experiments in *An. gambiae* demonstrated that mosquitoes treated with VU041 retained a large abdominal girth 24 h after blood feeding while control mosquitoes did not, suggesting that the mosquitoes' processing of blood meals had been impaired—perhaps by disrupting post-prandial diuresis, or perhaps by disrupting blood digestion. Experiments in *Ae. aegypti* confirmed that VU041 inhibited mosquito diuretic capacity, which would be consistent with impairment of Malpighian tubule function. This mechanism of action, on a target outside the nervous system, may also contribute to the efficacy of VU041 against the Akron and PR strains, which are resistant to neurotoxic carbamates and pyrethroids.

The combined effects of VU041 on blood-meal processing and diuresis may also contribute to its inhibition of fecundity in the mosquitoes *An. gambiae* and *Ae. aegypti*. That is, if VU041 inhibits blood meal digestion, nutrient absorption, and solute and metabolite excretion, then vitellogenesis may not proceed efficiently. Another possibility is a direct effect on the ovaries. Or there may be a combined effect on the excretory and reproductive systems.

Selectivity of VU041 for mosquito vs. mammalian Kir channels. The selectivity of any new mosquitocide is important, because mosquito control is typically implemented near or even within human dwellings, especially in tropical regions having endemic malaria, dengue, or Zika. Typical modes of administration include, e.g., aerial sprays, or insecticide-treated bed nets. Our in vitro screening assays for VU041 show that this compound has a relatively "clean" ancillary pharmacology against a panel of mammalian Kir channels, with no meaningful activity against Kir1.1, Kir4.1, Kir7.1, and Kir6.2/SUR1. However, VU041 moderately inhibits mammalian Kir2.1, which is highly expressed in the human heart; inhibition of this channel might have deleterious consequences on mammalian heart function. We therefore developed and tested analogs of VU041 to identify structural changes promoting increased selectivity for AnKir1 vs. Kir2.1. The compound VU730 retained inhibition activity against AnKir1, but it had no measurable inhibition against Kir2.1.

VU730 retained topical mosquitocidal toxicity, with a similar potency to that of VU041. VU730 is expected to be non-toxic to mammals, as will be confirmed through routine testing.

Selectivity of VU041 for mosquitoes vs. adult honeybees. VU041 is toxic against mosquitoes, but has minimal effects on beneficial insects. Ideally, new mosquitocides should also have limited or no effects on beneficial insects, such as honeybees and other pollinators. Existing, broad-spectrum insecticides (e.g., neonicotinoids, pyrethroids) can adversely affect pollinator health. Remarkably, we observed that a dose of 10 µg VU041 per mg in adult honeybees (*A. mellifera*) was not toxic after 48 h. The same dose would be ~100% lethal against mosquitoes within 24 h. The honeybee ortholog of Kir1 shares only ~55% amino acid identity with mosquito Kir1 channels. Thus, without wishing to be bound by this hypothesis, the interaction of VU041 with mosquito Kir1 channels may involve a domain that is not conserved with the bee Kir1 channel. Alternatively, without wishing to be bound by this hypothesis, the chemical composition of the honeybee cuticle may substantially differ from that of mosquitoes in a manner that reduces the penetration of VU041 into the hemolymph; or the VU041 molecule may be more efficiently detoxified by bees.

T-REx-HEK293 cell line expressing Kir channels. The open-reading frame of a full-length cDNA encoding AnKir1 cloned from *An. gambiae* Malpighian tubules (GenBank Accession #KJ596497) was sub-cloned into the pcDNA5/TO expression vector (Life Technologies) and used for stable cell line generation.

Chemical Synthesis; Tl$^+$ flux assay. The thallium flux assay is an in vitro method of measuring conductance through a potassium ion channel. Potassium channels are also permeable to thallium ions. The modulation of a K$^+$ channel will thus increase or decrease thallium ion flow through the channel and thus, alter the observed fluorescence of a thallium-specific indicator dye.

Stably transfected T-Rex-HEK-293-AnKir1 cells were cultured overnight in 384-well plates in media containing DMEM, 10% dialyzed FBS, and 1 µg/mL tetracycline to induce channel expression. The next day the cell culture medium was replaced with a dye-loading solution containing assay buffer (Hanks Balanced Salt Solution with 20 mM HEPES, pH 7.3), 0.01% (w/v) Pluronic F-127 (Life Technologies, Carlsbad, CA), and 1.2 µM of the thallium-sensitive dye Thallos-AM (TEFlabs, Austin, TX). After 1 hr. incubation at room temperature, the dye-loading solution was washed from the plates and replaced with 20 µL/well of assay buffer. The plates were transferred to a Hamamatsu Functional Drug Screening System 6000 (FDSS6000; Hamamatsu, Tokyo, Japan), where 20 µL/well of each of the test compounds in assay buffer was added and allowed to incubate with the cells for 20 min. After incubation, a baseline recording was collected at 1 Hz for 10 s (excitation 470±20 nm, emission 540±30 nm); a thallium stimulus buffer was then added (10 µL/well), and data were then collected for an additional 4 min. The Tl$^+$ stimulus buffer contained (in mM): 125 NaHCO$_3$, 1.8 CaSO$_4$, 1 MgSO$_4$, 5 glucose, 12 Tl$_2$SO$_4$, 10 HEPES, pH 7.4. For Tl$^+$ flux assays on Kir2.x, Kir4.1 and Kir6.2/SUR1 expressing cells, the Tl$^+$ stimulus buffer contained 1.8 mM Tl$_2$SO$_4$. To ensure the small-molecule vehicle DMSO had no direct effect on AnKir1-dependent Tl$^+$ flux, the assay's tolerance to different doses of DMSO was evaluated. The robustness and reproducibility of the assay was determined by comparing Tl$^+$ flux through tetracycline-induced and tetracycline-free cells. The Z' value was calculated as:

Z'=1−(3SD$_p$+3SD$_n$)/|mean$_p$+mean$_n$| where SD is standard deviation, and p and n are control and uninduced flux values, respectively. To compare the effect of DMSO on AnKir1-mediated Tl$^+$ flux, a one-way ANOVA was performed with a Tukey's multiple comparison test. Prism software (GraphPad Software) was used to generate CRC from Tl$^+$ flux. Half-inhibition concentration (IC50) values were calculated from fits using a four parameter logistic equation.

High-throughput screening. Test compounds were transferred to daughter, 384-well polypropylene plates (Greiner Bio-One, Monroe, NC) with an Echo555 liquid handler (Labcyte, Sunnyvale, CA), and then diluted into assay buffer to generate a 2× stock in 0.6% DMSO (0.3% final). For Tl$^+$ flux assays on Kir6.2/SUR1 expressing cells, test compounds were diluted in assay buffer containing diazoxide (250 µM final) to induce channel activation. Concentration-response curves (CRCs) were generated by screening compounds at 3-fold dilution series (1 nM-30 µM).

Tl$^+$ flux data were analyzed using Excel (Microsoft Corp, Redmond, WA) with XLfit add-in (IDBS, Guildford, Surrey, UK), OriginPro (OriginLab, Northampton, MA), and GraphPad Prism (GraphPad Software, San Diego, CA, USA) software. Raw data were opened in Excel and each data point in a given trace was divided by the first data point from that trace (static ratio) followed by subtraction of data points from control traces generated with vehicle controls. The slope of the fluorescence increase beginning 5 s after Tl$^+$ addition and ending 15 s after Tl$^+$ addition was calculated.

Patch clamp electrophysiology. Patch electrodes were pulled from silanized 1.5 mm outer diameter borosilicate microhematocrit tubes using a P-1000 Flaming/Brown micropipette puller (Sutter Instrument, Novato CA, USA). Electrode resistance ranged from 2-4 MO. Whole-cell currents were recorded under voltage-clamp conditions using an Axopatch 200B amplifier (Molecular Devices, Sunnyvale, CA). Electrical connections to the amplifier used Ag/AgCl wires and 3 M KCl/agar bridges. Electrophysiological data were collected at 5 kHz and filtered at 1 kHz. Data acquisition and analysis were performed using pClamp 9.2 software (Axon Instruments).

Two-electrode voltage clamp electrophysiology. Defolliculated *Xenopus laevis* oocytes (Ecocyte Bioscience, Austin, TX) were injected with AeKir1 or AeKir2B cRNA (10 ng) and cultured in OR3 media for 3-7 days at 18° C. before electrophysiology experiments. When present, VU041 was dissolved in solution III (See Table S4) to a final concentration of 50 µM (0.05% DMSO). All solutions were delivered by gravity at a flow rate of ~2 ml/min to an RC-3Z oocyte chamber (Warner Instruments, Hamden, CT) in polyethylene tubing, and solution changes were performed with a Rheodyne Teflon 8-way Rotary valve (Model 5012, Rheodyne, Rohnert Park, CA).

For each experiment, an oocyte was transferred to the RC-3Z chamber under superfusion (solution I). To measure membrane potential ($V_m$) and whole-cell membrane current ($I_m$) of the oocyte, it was impaled with two glass microelectrodes backfilled with 3 M KCl (resistances of 0.5-1.5 MO). Each microelectrode was bridged to an OC-725 oocyte clamp (Warner Instruments) and was under the digital control of pCLAMP software (Clampex module, version 10, Molecular Devices, Sunnyvale, CA).

The voltage clamp was then turned off during solution changes, and when the oocyte reached a new steady-state $V_m$ (~90 s) the I-V relationship of the oocyte was measured again. All $V_m$ and $I_m$ values were digitally recorded (Digidata 1440A Data Acquisition System, Molecular Devices) and the resulting I-V plots were generated with the Clampfit module of pCLAMP.

To measure the inhibition of Kir channel activity by VU041, we focused on the maximal inward currents elicited, which occurred at a clamp voltage of −140 mV during the voltage-stepping protocol. The background current of an oocyte in solution II (low K$^+$) was subtracted from that in 1) solution III (elevated K$^+$) to calculate the inward current before exposure to VU041 ($I_A$), and 2) solution III with VU041 to calculate the inward current after exposure to a small molecule ($I_B$). The percent inhibition of $I_A$ by VU041 was calculated by subtracting $I_B$ from $I_A$ and then dividing by $I_A$.

Chemical analysis. All NMR spectra were recorded on a 400 MHz FT-NMR DRX-400 FT-NMR spectrometer or a 500 MHz Bruker DRX-500 FT-NMR spectrometer. 1H chemical shifts are reported as δ values in ppm downfield, with deuterated solvent as the internal standard. Data are reported as follows: chemical shift, multiplicity (s=singlet, d=doublet, t=triplet, q=quartet, br=broad, m=multiplet), integration, coupling constant (Hz). High resolution mass spectra were recorded on a Waters Q-TOF API-US plus Acquity system with electrospray ionization. Reversed-phase LCMS analysis was performed using an Agilent 1200 system with a binary pump with degasser, high-performance autosampler, thermostatted column compartment, diode-array detector (DAD) and a C18 column. Flow from the column was split to a 6130 SQ mass spectrometer and a Polymer Labs ELSD. The MS detector was configured with an electrospray ionization source. Data acquisition was performed with Agilent Chemstation and Analytical Studio Reviewer software. Samples were separated on a ThermoFisher Accucore C18 column (2.6 um, 2.1×30 mm) at 1.5 mL/min, with column and solvent temperatures maintained at 45° C. The gradient conditions were 7% to 95% acetonitrile in water (0.1% TFA) over 1.1 minutes. Low-resolution mass spectra were acquired by scanning from 135 to 700 AMU in 0.25 seconds with a step size of 0.1 AMU and peak width of 0.03 minutes. Drying gas flow was 11 liters per minute at a temperature of 350° C., and a nebulizer pressure of 40 psi. The capillary needle voltage was 3000 V, and the fragmentor voltage was 100 V. Preparative purification was performed on a custom HP1100 purification system with collection triggered by mass detection. Solvents for extraction, washing and chromatography were all HPLC grade. All reagents were purchased from Aldrich Chemical Co. and were used without purification.

General procedures for compound synthesis. Chloroacetyl chloride (1.3 eq.) was added to a solution of an amine (1 eq.) and pyridine (4 eq.) in DMF (2 mL). After 30 min at room temperature, the reaction was added to a mixture of EtOAc and water (1:1). The aqueous layer was extracted with EtOAc, and the organic extraction was washed with water. The organic extraction was concentrated under reduced pressure to yield the desired α-chloroacetamide.

A solution of the α-chloroacetamide (1 eq.), an amine (1 eq.) and cesium carbonate (1 eq.) in DMF was heated to 150° C. for 5 min in a microwave reactor. The solution was filtered (0.45 μm), and fractions were separated via reverse-phase HPLC in a gradient of MeCN in water (0.1% TFA). Fractions were combined and added to water:EtOAc (1:1) and added aq. NaHCO$_3$. The organic layer was collected, and solvent was removed on an air concentrator. Residue was resuspended in DCM/MeOH and filtered through a phase separator into a vial yielding the desired final products.

Figure 9:
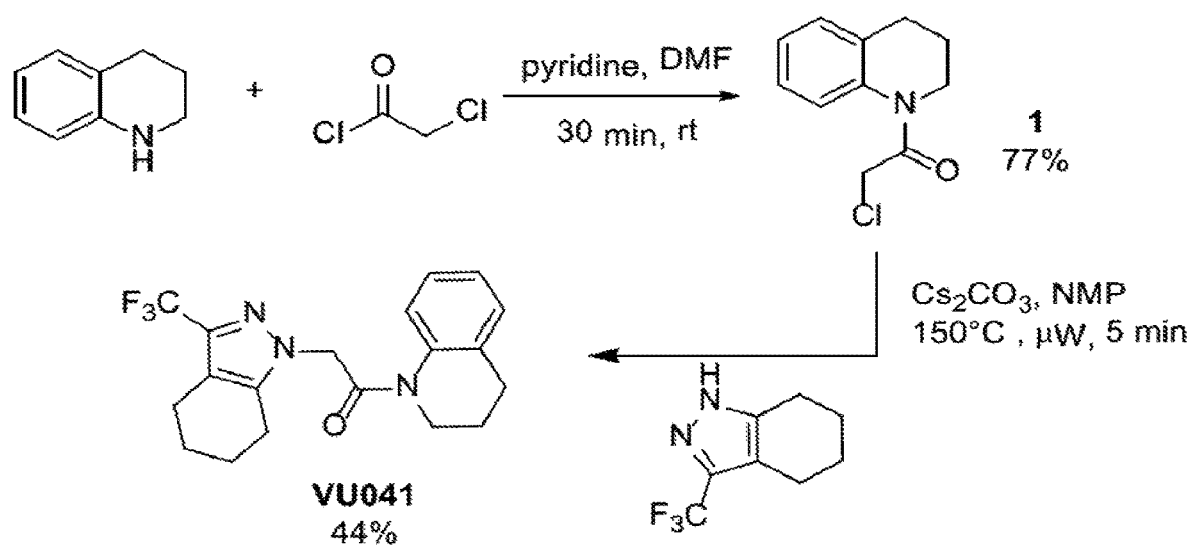
Figure 10A:
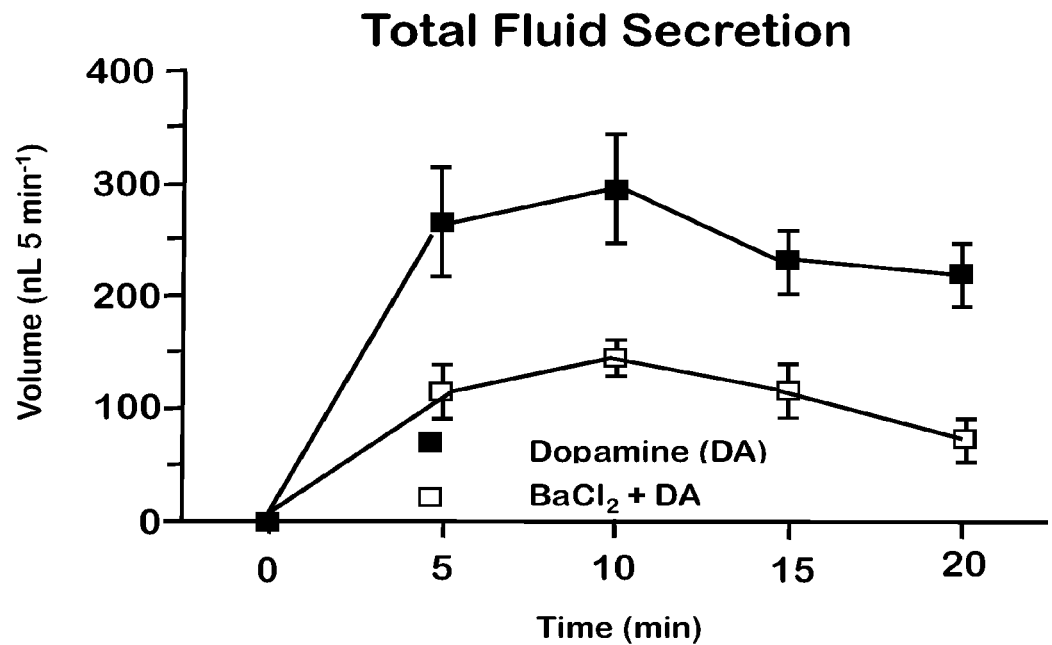
Figure 10B:
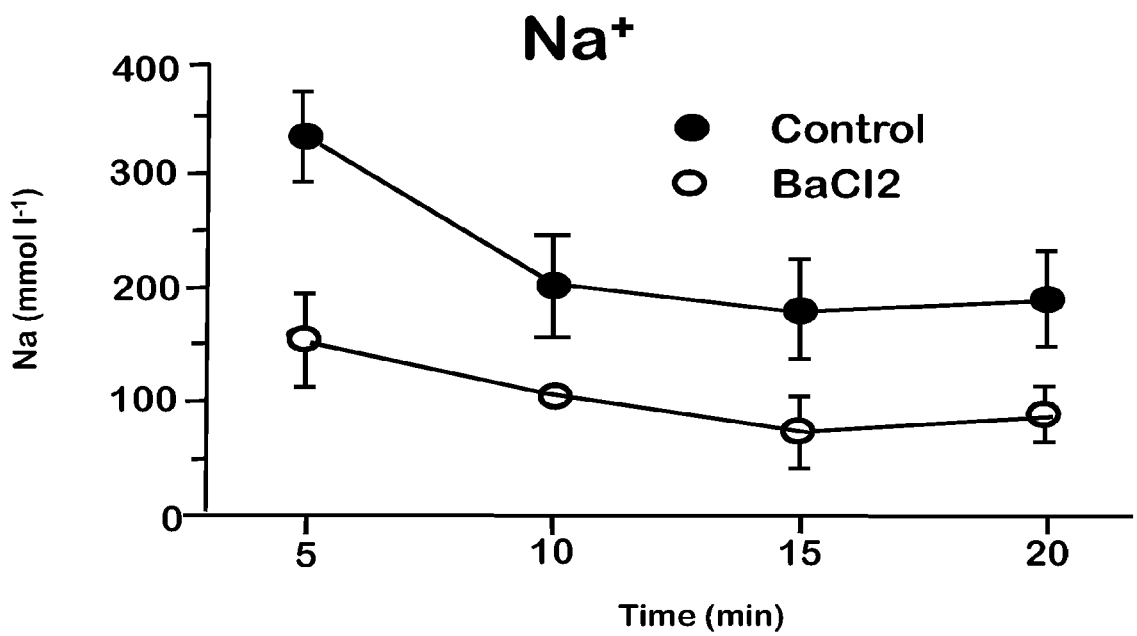
Figure 10C:
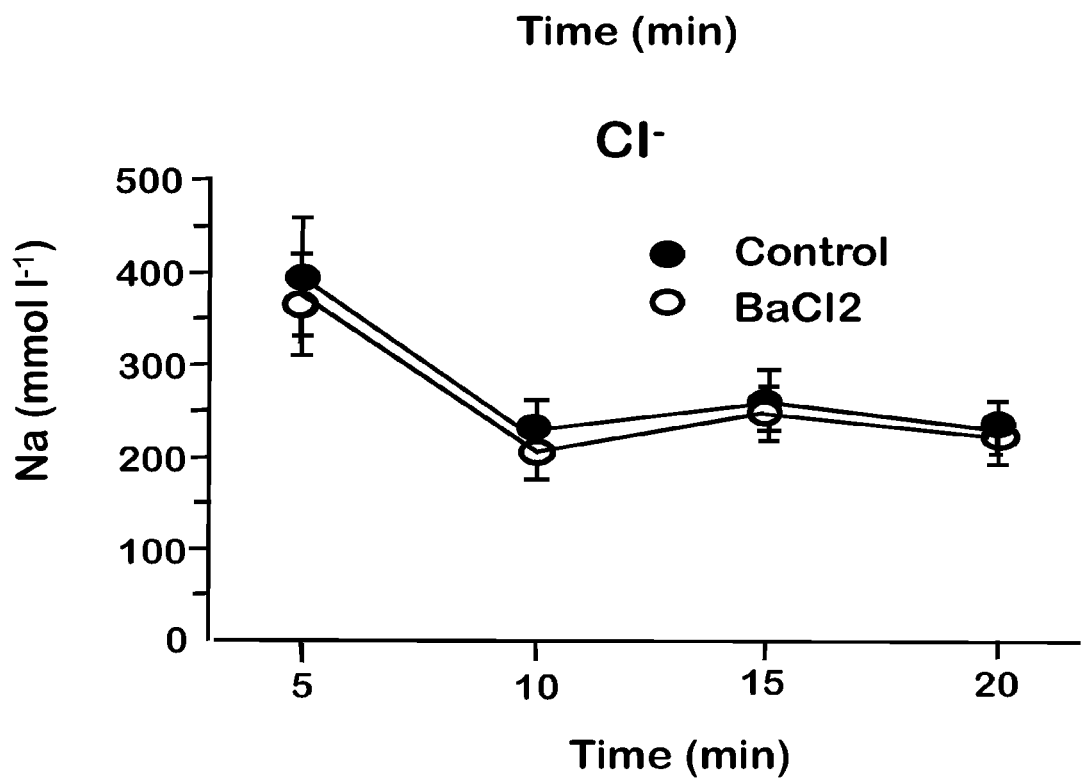
Figure 10D:
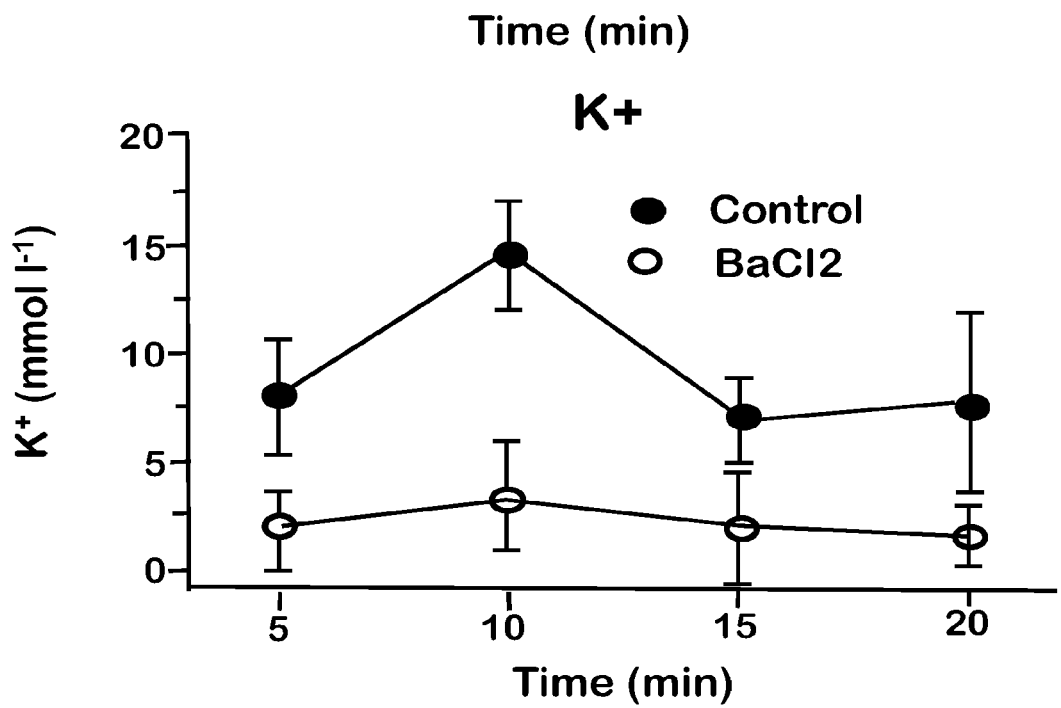
Figure 11A:
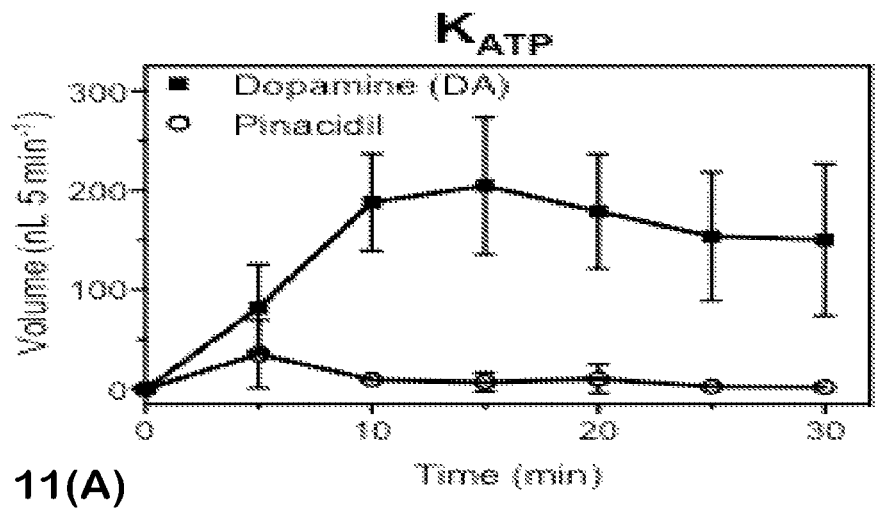
Figure 11B:
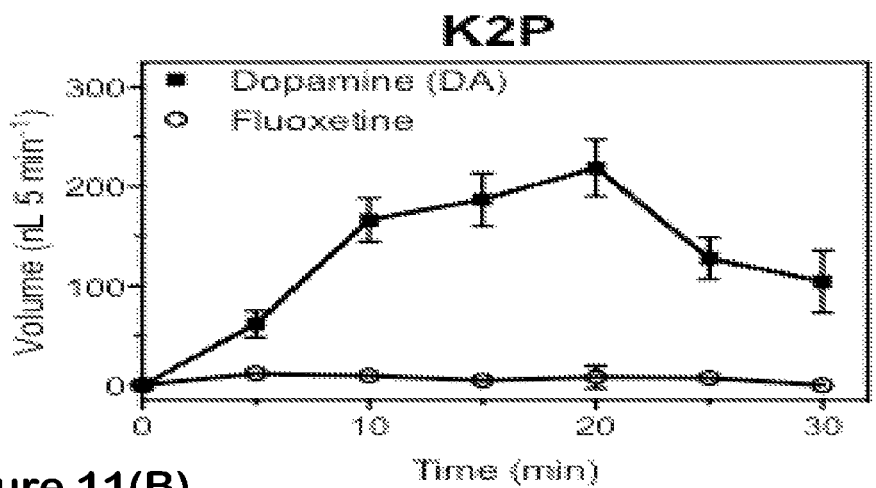
Figure 11C:
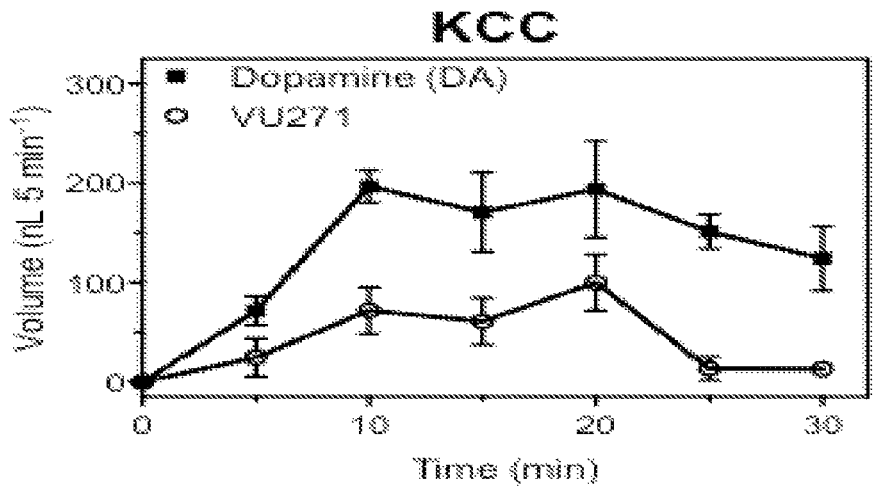
Figure 12:
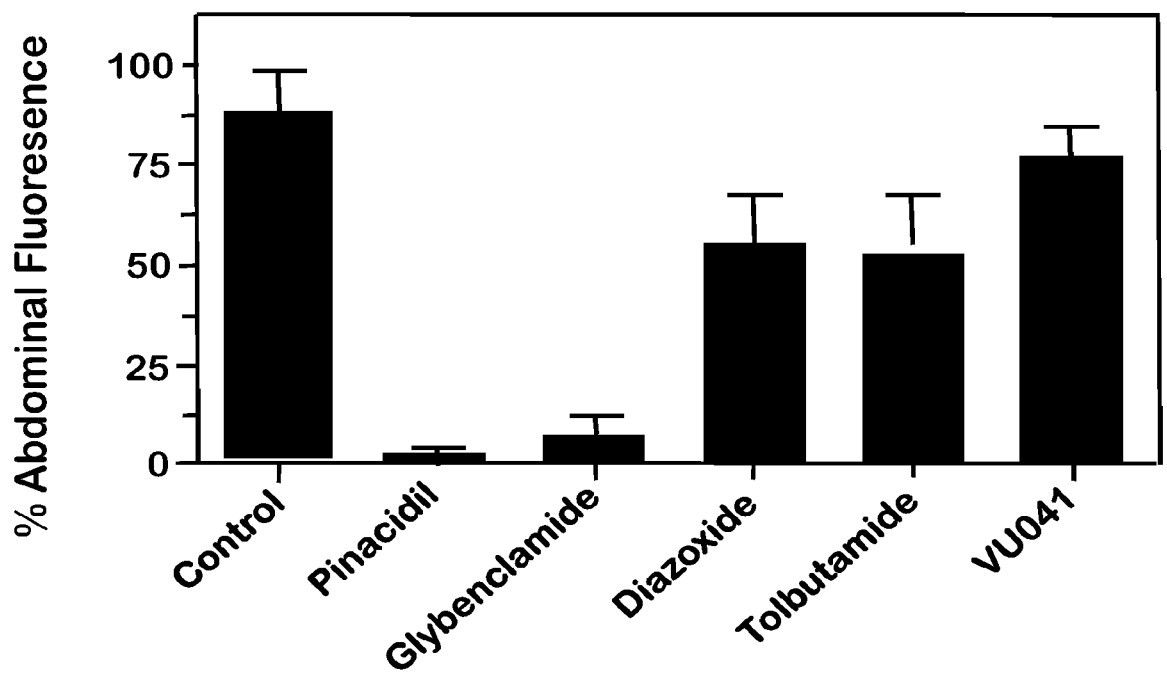
Figure 13:
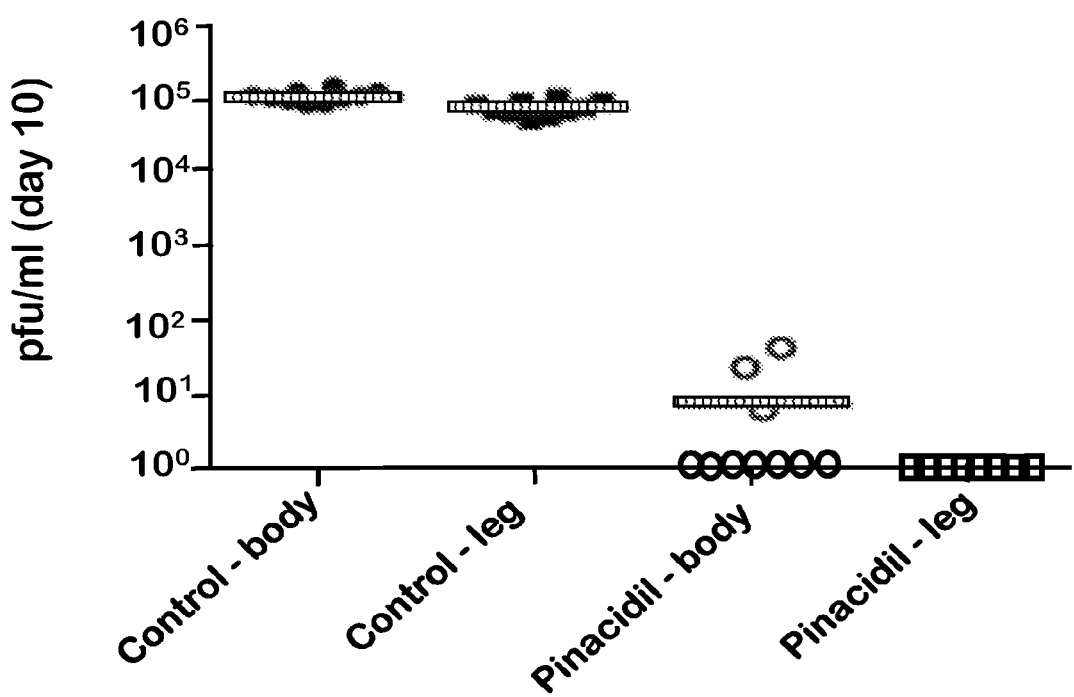
Figure 14A:
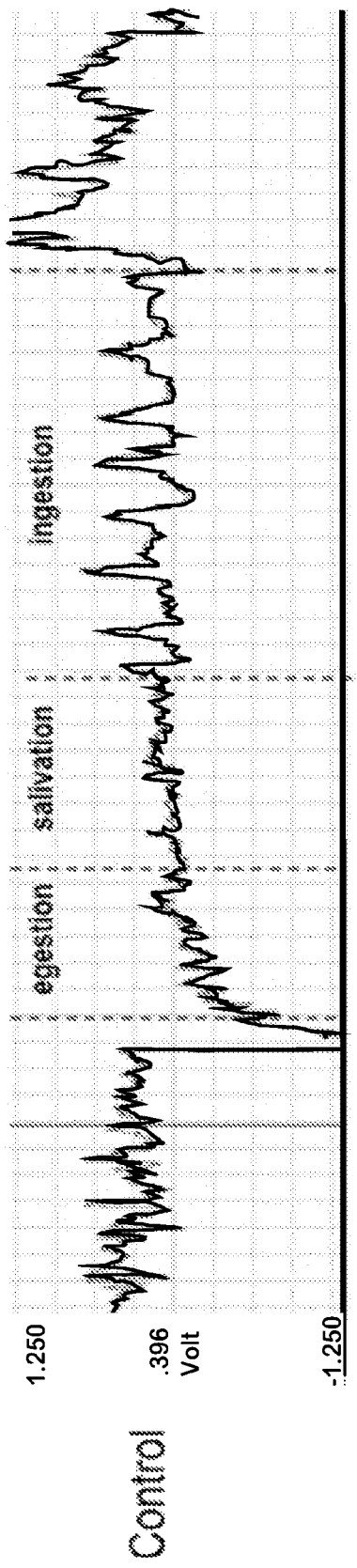
Figure 14B:
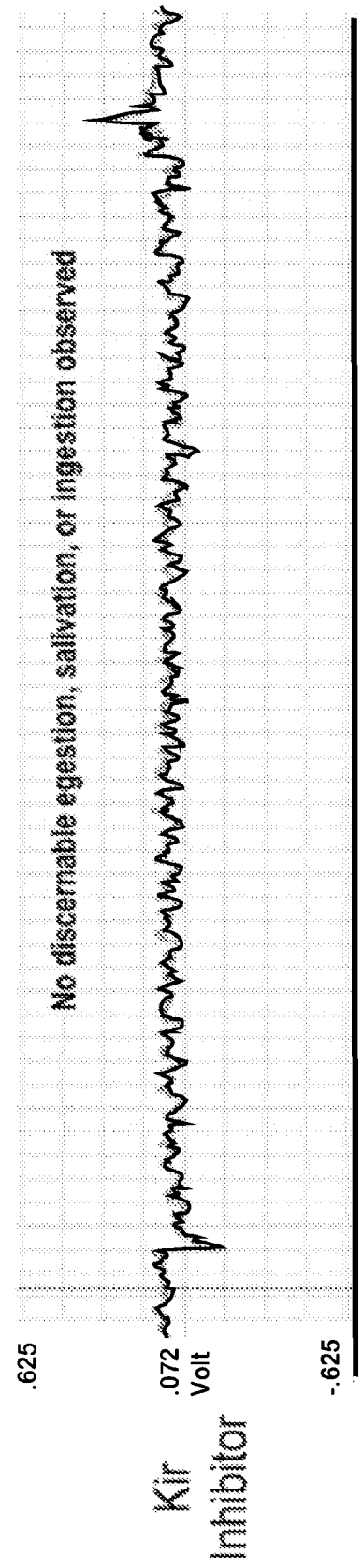
Figure 15A:
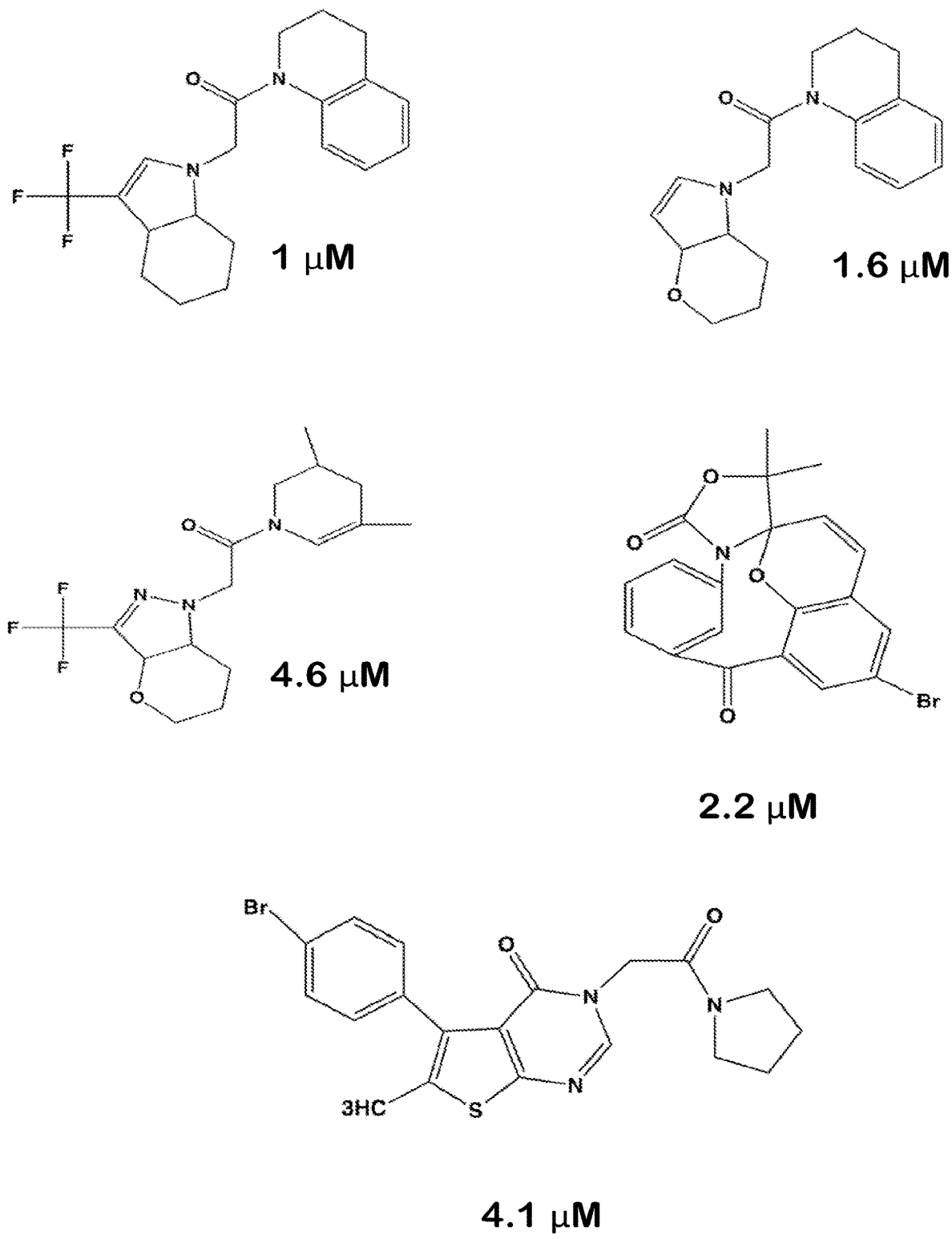
Figure 15B:
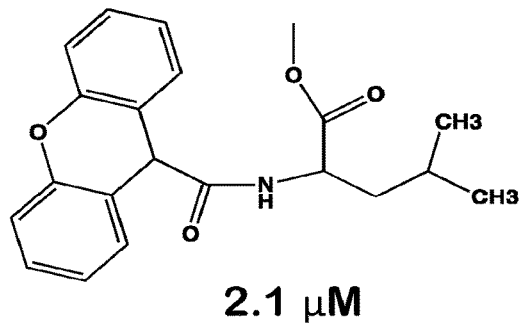
Figure 15B:
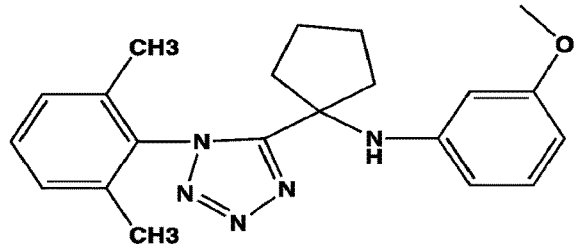
Figure 15B:
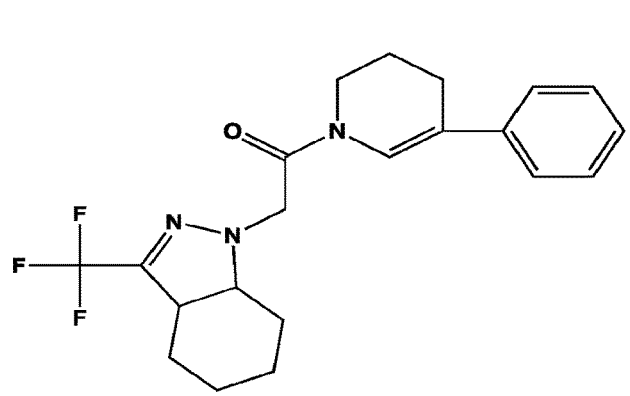
Figure 15B:
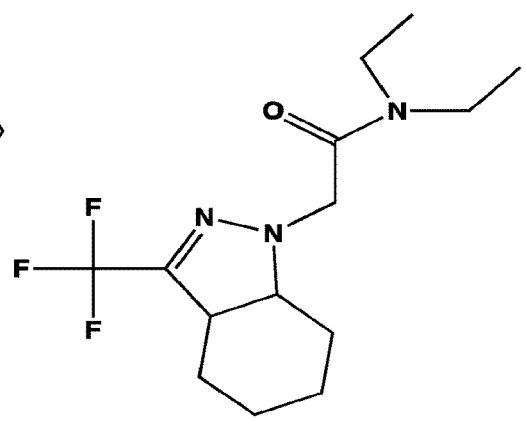
Figure 15B:
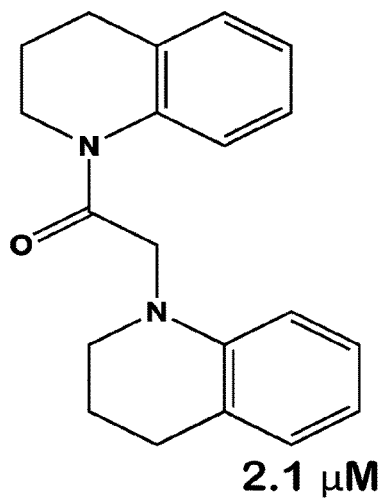
Figure 15B:
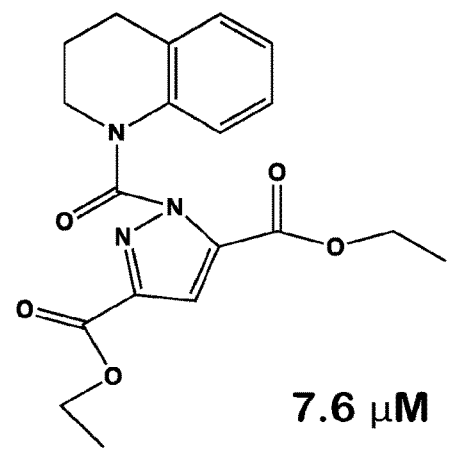
Figure 15C:
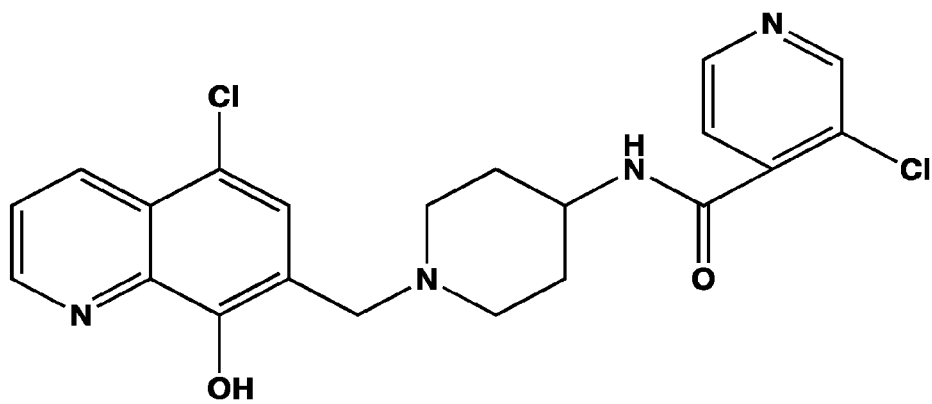
Figure 15C:
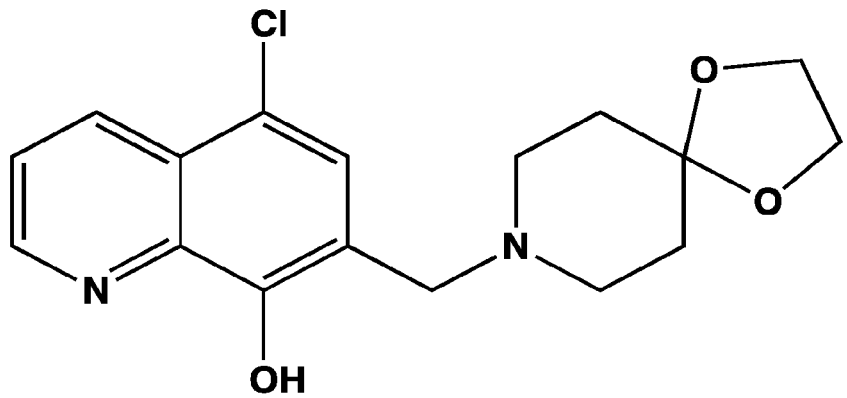
Figure 15C:
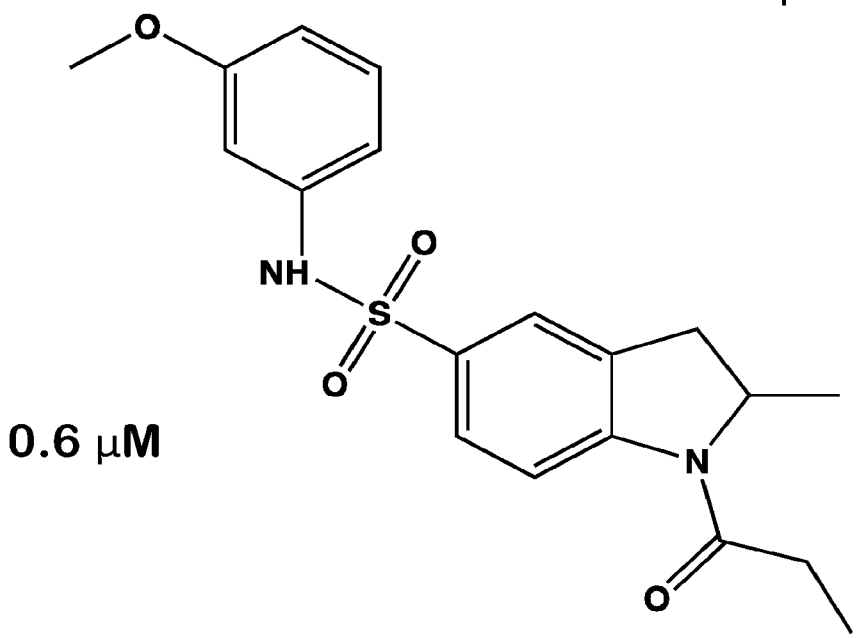
Figure 16A:
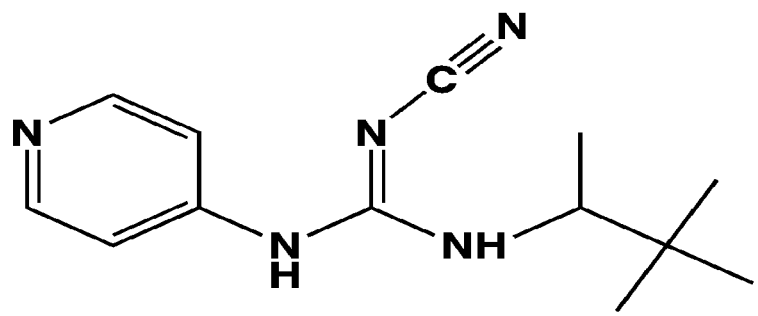
Figure 16B:
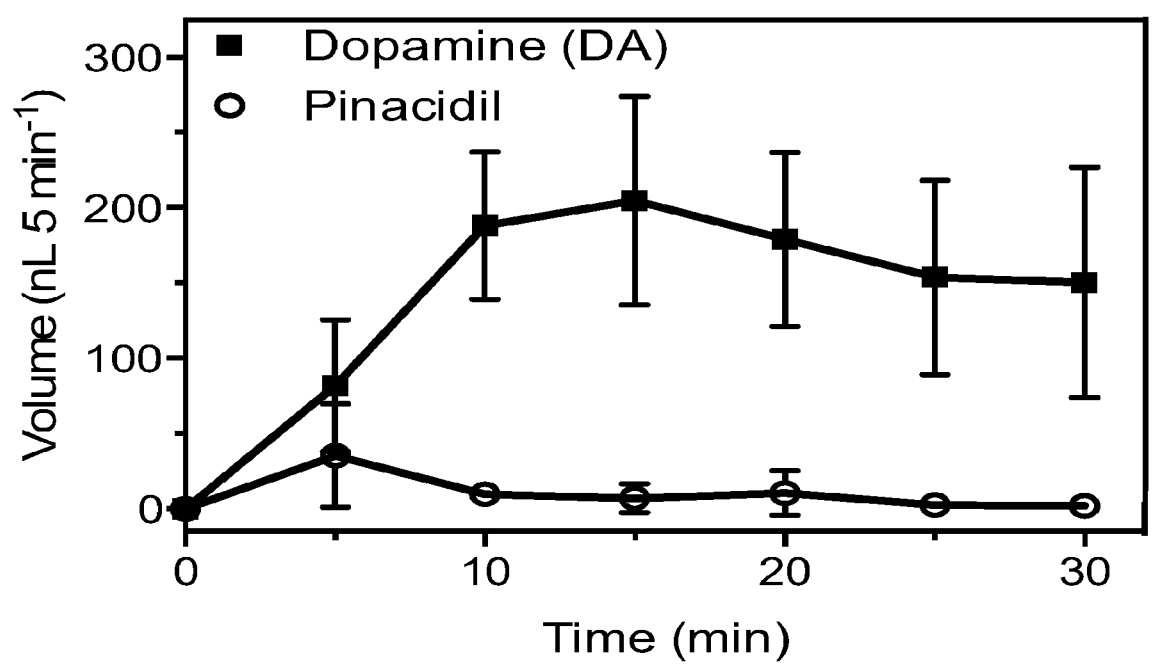
Figure 16C:
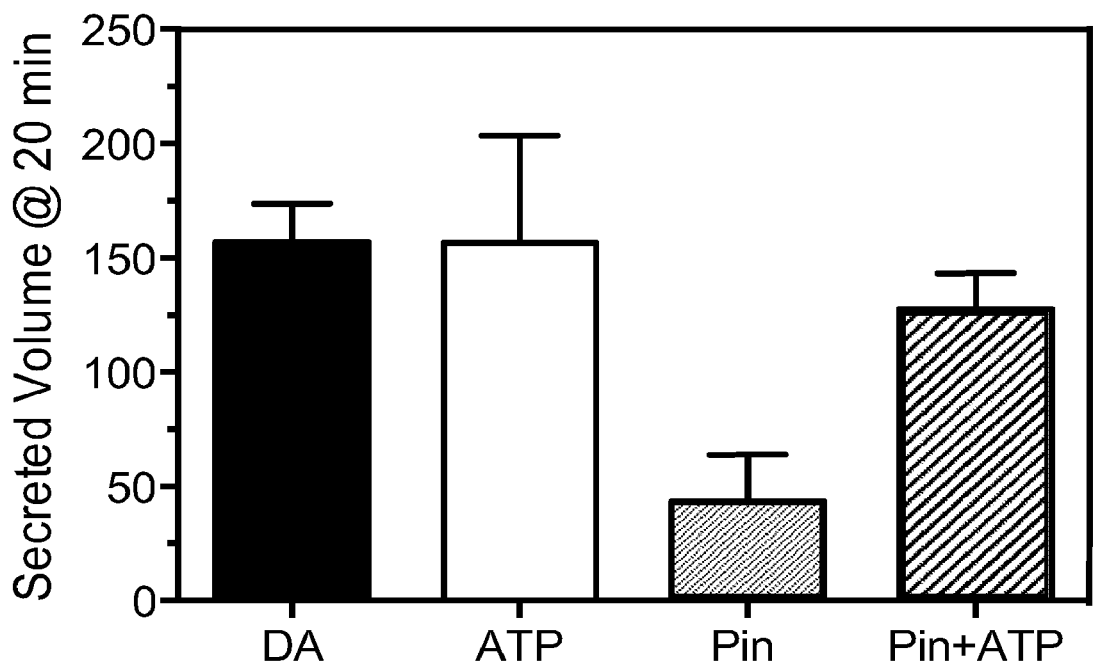
Figure 16D:
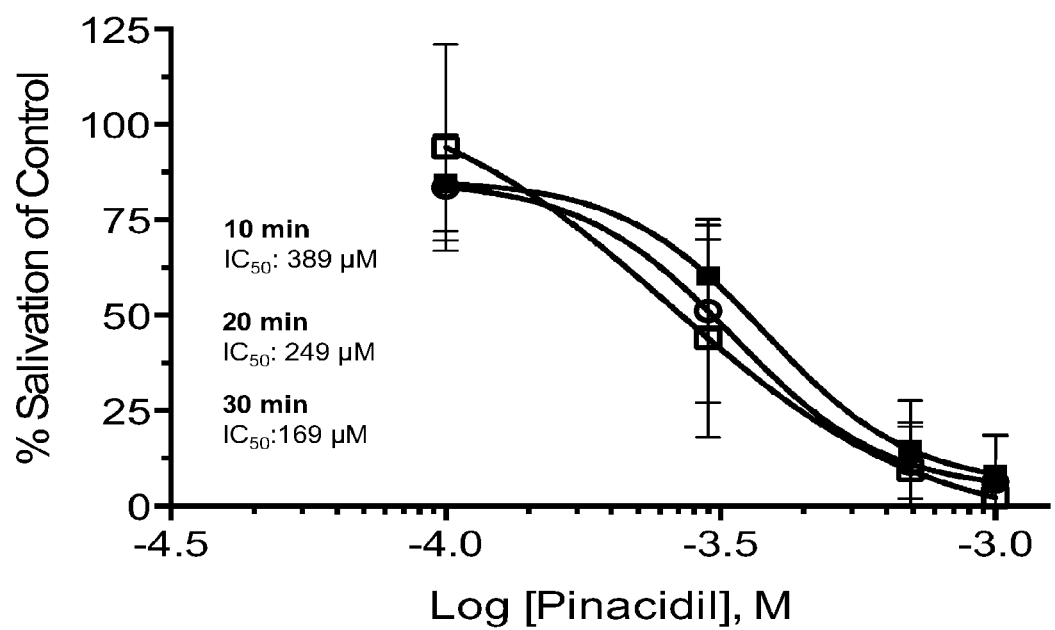
Figure 17A:
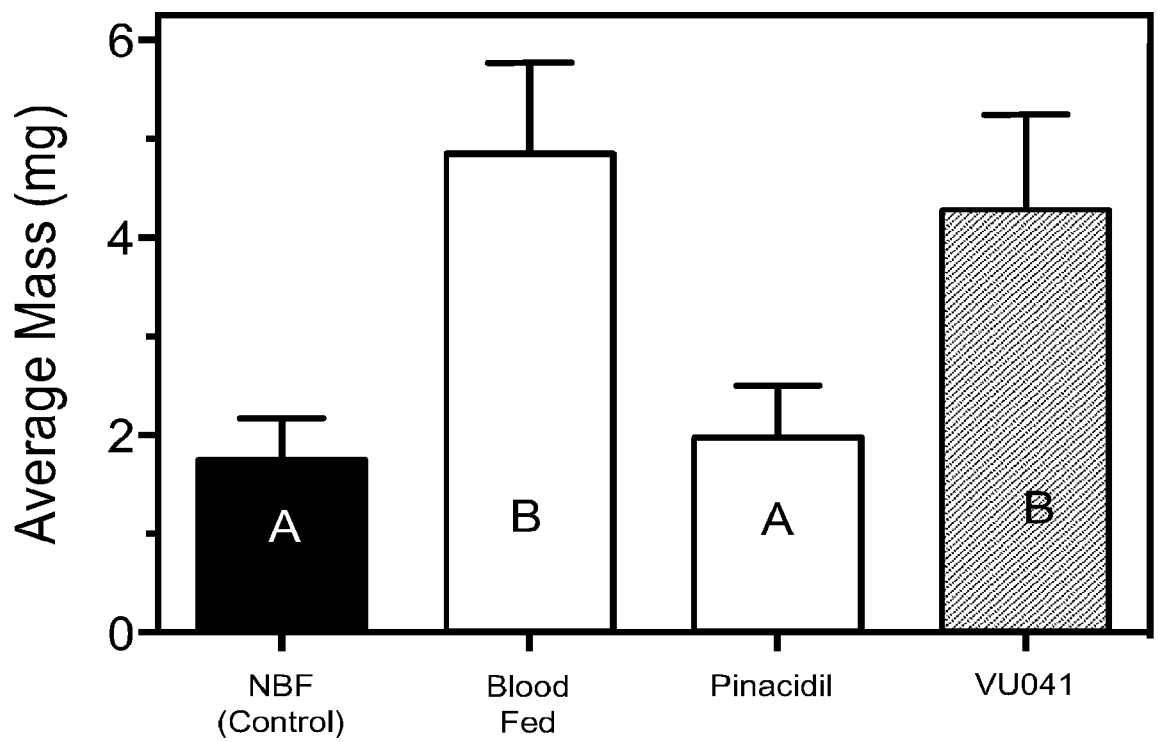
Figure 17B:
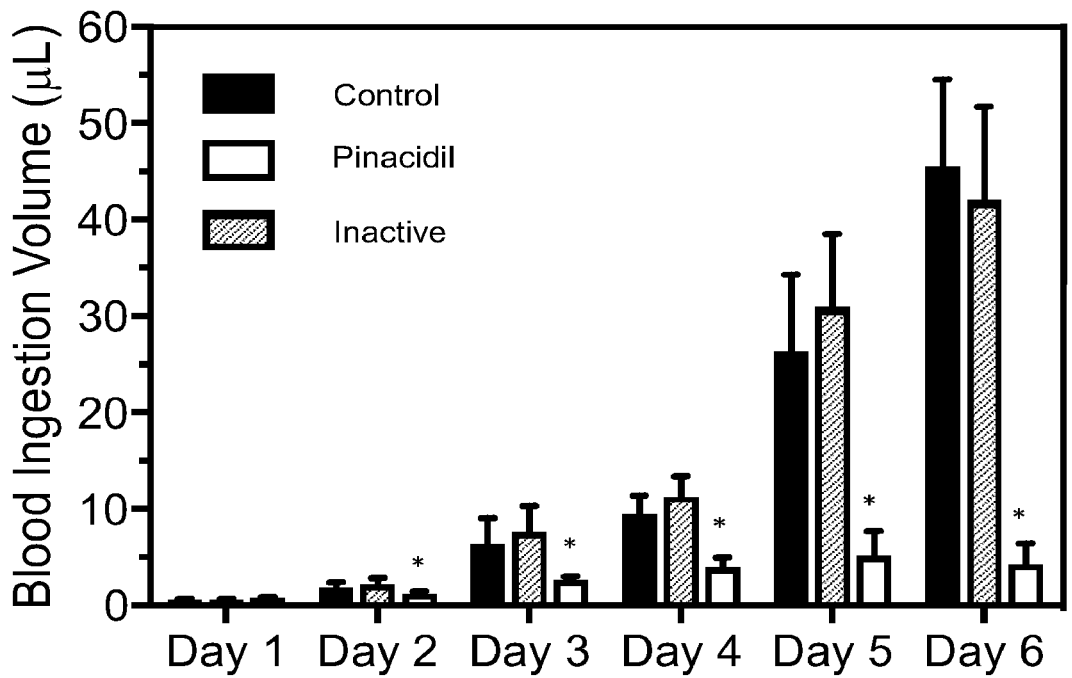
Figure 18:
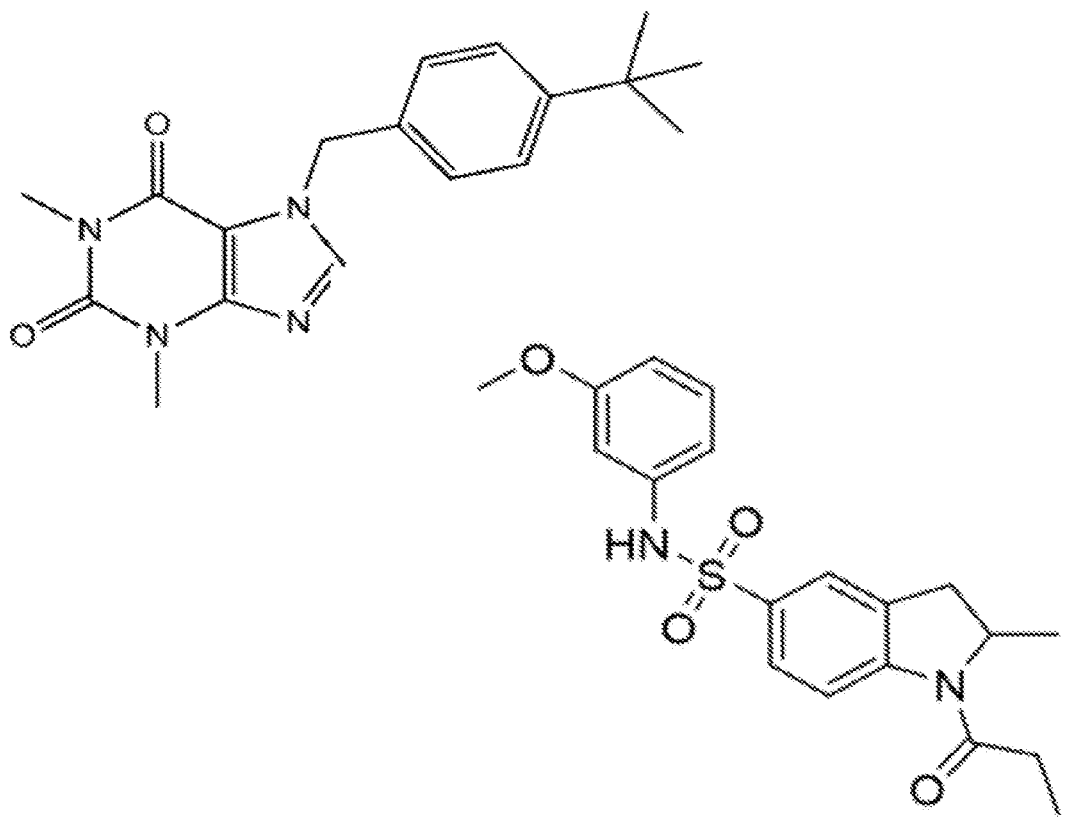
FIG. 18 depicts the structures of VU063 (also called VU0071063), VU625, and an inactive analog of VU063.
Figure 18:
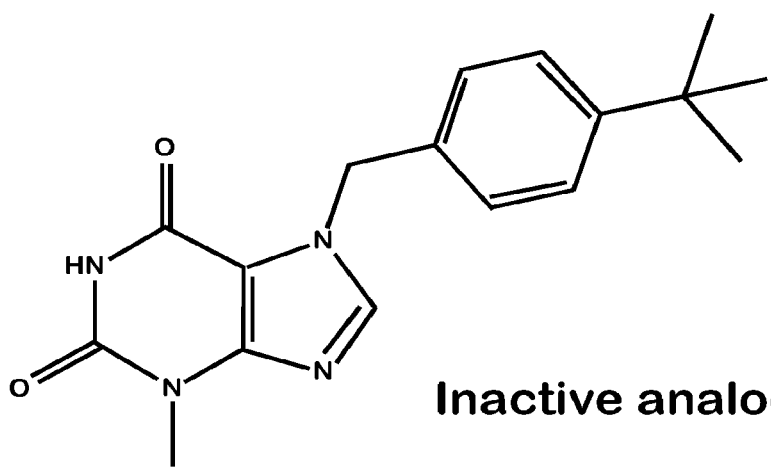
Figure 19:
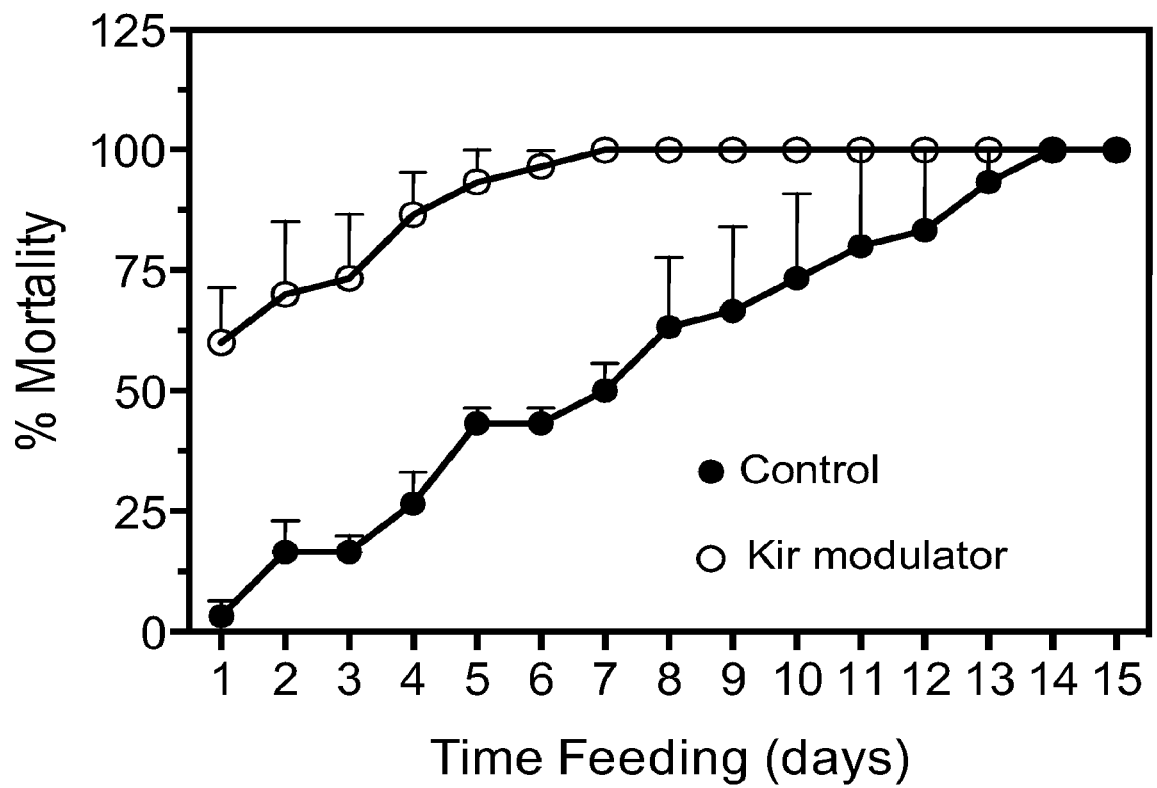
FIG. 19 depicts mortality of ticks as a function of time for *A. americanum* for controls, and for ticks treated with pinacidil. A nearly-identical pattern of mortality was observed when ticks were instead exposed to VU063 while feeding (data not shown).

Synthesis of 2-chloro-1-(3,4-dihydro-2H-quinolin-1-yl) ethanone (1). See FIG. 9. Chloroacetyl chloride (0.16 mL, 2.0 mmol) was added to a solution of 1,2,3,4-tetrahydroquinoline (0.19 mL, 1.5 mmol) and pyridine (0.50 mL, 6.2 mmol) in DMF (2 mL). After 30 min at room temperature, the reaction was added to a mixture of EtOAc and water (100 mL:100 mL). The aqueous layer was extracted with EtOAc (100 mL). The organic extraction was washed with water 3×(300 mL). The organic extraction was concentrated under reduced pressure to yield Compound 1 (243 mg, 1.16 mmol, 77% yield). LCMS: 0.90 min, >90% at 215 and 254 nm, [M+H]$^+$=210.2.

Synthesis of 1-(3,4-dihydroquinolin-1(2H)-yl)-2-(3-(trifluoromethyl)-4,5,6,7-tetrahydro-1H-indazol-1-yl)ethan-1-one (VU041). See FIG. 9. A solution of Compound 1 (25 mg, 0.12 mmol), 3-(trifluoromethyl)-4,5,6,7-tetrahydro-1H-indazole (22.7 mg, 0.12 mmol) and cesium carbonate (38.8 mg, 0.12 mmol) in DMF (1 mL) was heated to 150° C. for 5 min in a microwave reactor. The solution was filtered (0.45 μm) and fractions were separated via reverse-phase HPLC in a gradient of MeCN in water (0.1% TFA). Fractions were combined and added to a mixture of water (15 mL) and EtOAc (15 mL). To the mixture was added a saturated solution of NaHCO$_3$ (1 mL). The organic layer was collected, and solvent was removed on an air concentrator. The residue was resuspended in DCM:MeOH and filtered through a phase separator into vials, yielding VU041 (43.4 mg, 0.0523 mmol, 44% yield). LCMS: RT=0.793 min, >95% at 215 and 254 nm, [M+H]$^+$=364.1.

Lead compound optimization. Commercial 1,2,3,4-tetrahydroquinoline was treated with chloroacetyl chloride in the presence of pyridine to yield Compound 1. Next, the appropriate nitrogen heterocycle was reacted in a microwave reactor with Compound 1 under basic conditions, yielding the product compounds. A first library was designed to keep the dihydroquinoline moiety constant, and evaluate variations in the heterocyclic portion. If the six-membered ring was aromatized, the compound lost activity against AnKir1, 2. Addition of a carbonyl group to the 4-position of the tetrahydroindazole, Compound 3, also led to an inactive compound. Interestingly, deletion of a nitrogen from Compound 3 brought some activity back into Compound 4 (12.1 μM). One compound (VU730, Compound 5) retained activity toward AnKir1 (IC$_{50}$=2.4 μM), but lost activity toward Kir2.1 (IC50>30 μM). Expanding the ring system to incorporate a tetrahydroquinoline retained some activity against AnKir1 (Compound 6, 8.0 μM), and deletion of the 6-membered ring of the tetrahydroisoquinoline leaving the unsubstituted pyrazole was unproductive (Compound 7, inactive).

A second library kept the trifluoromethyl tetrahydropyrazole moiety constant, while varying the amide portion of the molecule. Moving from the tetrahydroquinoline to the tetrahydroisoquinoline led to a ~7-fold loss of potency (Compound 8, 15 μM). Moving to the decahydroquinoline (Compound 9, 6.7 μM) retained some activity while the regioisomer was inactive (Compound 10). Moving to a piperidine ring was not productive (Compound 11); however, adding pendant substitution led to active compounds (phenyl, Compound 12, 5.6 μM and dimethyl, Compound 13, 4.5 μM). Addition of oxygen in a benzo[b]oxazine structure (Compound 14, 4.6 μM) retained activity; and like the piperidine scaffold, deletion of the phenyl portion led to an inactive compound (morpholine, Compound 15, inactive). Addition of a phenyl substitution did not bring back activity, unlike in the piperidine scaffold, Compound 16. Finally, moving the nitrogen outside of the ring system led to an inactive compound (Compound 17) and other smaller ring systems were not tolerated, Compound 18. Compound 18, VU937, inhibited the AnKir1 channel with activity 60-fold less than VU041 with an IC$_{50}$ of 29,670 nM (95% CI: 17,680-49,770 nM).

TABLE 1

Selectivity of VU041 against mosquito and mammalian Kir channels. $IC_{50}$ values were determined by thallium-flux assay, and are expressed as means (n = 3). Selectivity ratios (SR) are expressed as: AnKir1 IC50/secondary Kir $IC_{50}$. Mean $IC_{50}$ values were compared by a one-way ANOVA followed by Tukey's posttest using InStat ™ (GraphPad Software, San Diego CA, USA). Capital letter superscripts (A, B, C) indicate statistical categorization of the means.

| Kir Channel | $IC_{50}$ µM (95% CI). | Selectivity Ratio |
| --- | --- | --- |
| AnKir1 | 2.5 (1.1-3.6) [A] | — |
| AeKir1 | 1.7 (0.6-2.8) [A] | 0.7 |
| Kir1.1 | >30 [B] | >12 |
| Kir2.1 | 12.7 (10.2-14.3) [C] | 5 |
| Kir4.1 | >30 [B] | >12 |
| Kir6.2 + SUR1 | >30 [B] | >12 |
| Kir7.1 | >30 [B] | >12 |

TABLE 2

Structure-activity relationship (SAR) for the "left-hand" portion of VU041.

| Cmpd | VU# | R | AnKir1 $IC_{50}$ (µM) | hKir2.1 $IC_{50}$ (µM) |
| --- | --- | --- | --- | --- |
| 1 | VU0048041 | (F3C-indazole-tetrahydro) | 2.3 | 11.3 |
| 2 | VU0650728 | (F3C-indazole-tetrahydro) | Inactive | N.D. |
| 3 | VU0650727 | (pyrazole-ketone) | inactive | N.D. |
| 4 | VU0650729 | (pyrrole-ketone) | 12.1 | >30 |
| 5 | VU0650730 | (pyrazole-tetrahydropyran) | 2.4 | >30 |
| 6 | VU0657111 | (tetrahydroquinoline-N) | 8.0 | N.D. |
| 7 | VU0657112 | (pyrazole) | Inactive | N.D. |

TABLE 3

Structure-activity relationship (SAR) for the "right-hand" portion of VU041.

| Cmpd | VU# | R | AnKir1 $IC_{50}$ (µM) | hKir2.1 $IC_{50}$ (µM) |
| --- | --- | --- | --- | --- |
| 1 | VU0048041 | (tetrahydroquinoline) | 2.3 | N.D. |
| 8 | VU0652933 | (tetrahydroisoquinoline) | 15 | N.D. |

TABLE 3-continued

Structure-activity relationship (SAR) for the "right-hand" portion of VU041.

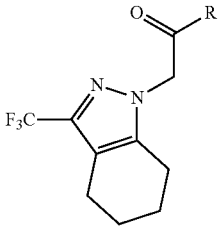

| Cmpd | VU# | R | AnKir1 IC$_{50}$ (μM) | hKir2.1 IC$_{50}$ (μM) |
|---|---|---|---|---|
| 9 | VU0652954 | 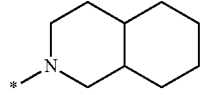 [SMILES: *N1CCC2CCCCC2C1] | 6.7 | >30 |
| 10 | VU0652944 | 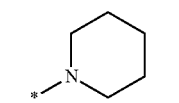 | Inactive | N.D. |
| 11 | VU0652947 | 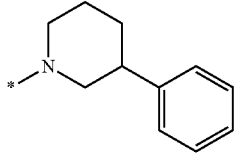 [SMILES: *N1CCCC(c2ccccc2)C1] | Inactive | N.D. |
| 12 | VU0652942 | 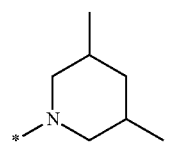 [SMILES: *N1CC(C)CC(C)C1] | 5.6 | >30 |
| 13 | VU0652943 | 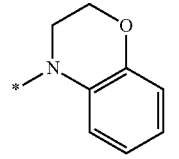 [SMILES: *N1CCOc2ccccc21] | 4.5 | >30 |
| 14 | VU0652934 | 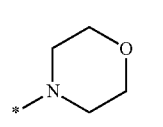 | 4.6 | N.D. |
| 15 | VU0299695 | 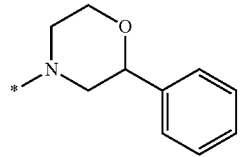 [SMILES: *N1CCOC(c2ccccc2)C1] | Inactive | N.D. |
| 16 | VU0652955 | 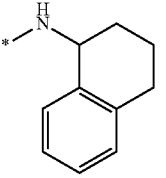 [SMILES: *NC1CCCc2ccccc21] | Inactive | N.D. |
| 17 | VU0652931 | 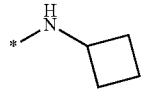 [SMILES: *NC1CCC1] | Inactive | N.D. |
| 18 | VU0652937 | *—NH—cyclobutyl | inactive | N.D. |

TABLE 4

Chemical composition of solutions used in *Xenopus* oocyte experiments.

| Solution # | I | II | III |
|---|---|---|---|
| NaCl | 96 | 88.5 | 88.5 |
| NMDG-Cl | 0 | 9.5 | 0 |
| KCl | 2 | 0.5 | 10 |
| MgCl2 | 1.0 | 1.0 | 1.0 |
| CaCl2 | 1.8 | 1.8 | 1.8 |
| HEPES | 5 | 5 | 5 |

The pH of all solutions was adjusted to 7.5 with NMDG-OH.

The osmolality of each solution was verified to be 190 ± 5 mOsm/kg H2O by vapor pressure osmometry.

NMDG = N-methyl D-glucamine.

TABLE 5

Mean (n = 5) $ED_{50}$ (μg/mg of mosquito) after topical exposure to VU041 with
and without the synergists Piperonyl butoxide and S,S,S-tributyl phosphorotrithioate
(500 ng/insect) in adult female *An. gambiae*. Mosquitoes were pre-treated with
PBO and DEF four hours prior to VU041 treatment. Mosquito strains not labeled
by the same letter (e.g., A or B) indicates statistical significance ($P <$
0.05) of the means as determined by a one-way ANOVA with Tukey's post-hoc test.

| Compound(s) | [1]G3 Strain | [1]Akron Strain | [2]Resistance Ratio |
|---|---|---|---|
| VU041 | 1.8 (0.9-3.1) A | 2.8 (2.1-4.1) A | 1.5 |
| VU041 + PBO | 0.88 (0.3-1.4) B | 0.37 (0.2-0.7) B | 0.4 |
| VU041 + DEF | 1.7 (1.1-2.2) A | N.D. | N.D. |
| VU730 | 2.4 (2.1-2.9) A | N.D. | N.D. |
| VU730 + PBO | 0.9 (0.4-1.5) B | N.D. | N.D. |
| VU937 | >10 | >10 | N.D. |
| Permethrin* | 0.03e-5 (0.02e-5-0.05e-5) | 1.0e-3 (0.8e-4-1.3e-3) | 33 |

[1]$ED_{50}$, μg/mg (95% confidence limits).
[2]RR: Resistance ratio for G3 = $ED_{50}$ Akron/$ED_{50}$ G3
N.D. = no data
*Topical $ED_{50}$ values from reference[21].

High Throughput Screening. To perform Tl+ flux assays, stably transfected T-Rex-HEK-293 cells expressing AnKir1 channels were cultured overnight in 384-well plates (20,000 cells/20 μL/well), black-walled, clear-bottomed BD Pure Coat amine-coated plates (BD, Bedford, MA) with a plating media containing DMEM, 10% dialyzed FBS and 1 μg/mL tetracycline. Approximately twenty-four hours after cell plating, the cell culture medium was replaced with a dye-loading solution containing assay buffer (Hanks Balanced Salt Solution with 20 mM HEPES, pH 7.3), 0.01% (w/v) Pluronic F-127 (Life Technologies, Carlsbad, CA), and 1.2 μM of the thallium-sensitive dye Thallos-AM (TEFlabs, Austin, TX). Following 1 hr. incubation at room temperature, the dye-loading solution was washed from the plates and replaced with 20 μL/well of assay buffer.

Whole-cell patch clamp electrophysiology. Transiently transfected HEK-293T cells expressing AnKir1 were voltage-clamped in the whole-cell configuration of the patch clamp technique. The extracellular bath solution contained (in mM): 135 NaCl, 5 KCl, 2 $CaCl_2$, 1 $MgCl_2$, 5 glucose, 10 HEPES free acid, pH 7.4, 290 mOsm/kg $H_2O$. The pipette solution contained (in mM): 135 KCl, 2 $MgCl_2$, 1 EGTA, 10 HEPES free acid, 2 $Na_2ATP$ (Roche, Indianapolis, IN), pH 7.3, 275 mOsm. Cells were voltage clamped at −75 mV, stepped to −120 mV for 200 msec, and then ramped to 120 mV at a rate of 2.4 mV/msec. Concentration-response curves (CRCs) were constructed by measuring the effects of increasing doses of inhibitors on AnKir1 currents at −120 mV. All recordings were made at room temperature (20-23° C.).

Two-electrode voltage clamp electrophysiology. Heterologous expression of AeKir1 or AeKir2B was performed in *Xenopus laevis* oocytes. Current-voltage (I-V) relationships of oocytes were measured by clamping the membrane potential ($V_m$) near the spontaneous, resting potential and then initiating a voltage-stepping protocol (via the Clampex module of pCLAMP) with 20 mV steps from −140 mV to +40 mV (100 ms each).

Mosquito colonies. *An. gambiae* mosquitoes, G3 strain (MRA-112), were reared in an environmental chamber at 27° C. and 75% relative humidity at Vanderbilt University, Department of Biological Sciences, Nashville, TN *An. gambiae*, Akron strain (MRA-913, isolated in Benin), was reared in a separate environmental chamber at the Emerging Pathogens Institute, University of Florida, Gainesville, FL at 27° C. and 75% relative humidity. The Akron strain of *An. gambiae* was selected every 5th generation for anticholinergic and pyrethroid resistance by exposing adult mosquitoes to bendiocarb (12.5 μg/bottle) and permethrin (21.5 μg/bottle) using the CDC bottle assay. Survivors of both sexes were then mixed and allowed to breed. To ensure resistance, the mosquitoes from each resistant egg cohort were exposed to an $LC_{99}$ dose (based on G3 toxicity values) of permethrin and propoxur. The mosquitoes used in this study were derived from the same colony that had previously been used to demonstrate the resistance of the Akron strain to propoxur and permethrin, resistance that has been attributed to both target site and metabolic resistance through upregulation of CYP450 enzymes.

An established colony of *Ae. aegypti* mosquitoes, Liverpool strain (LVP-IB12, MRA-735), was reared and maintained in an environmental chamber at 28° C. and 80% relative humidity at the Ohio Agricultural Research and Development Center (OARDC) of The Ohio State University, Wooster, OH. When needed, eggs from a pyrethroid-resistant strain of *Ae. aegypti*, Puerto Rico strain (PR, NR-48830), were obtained from BEI Resources, NIAID, NIH and reared to adulthood. Third-instar larvae of the resistant strain of *Ae. aegypti* were exposed to permethrin (0.1 mg/ml) every third generation to maintain the resistance trait. Adult mosquitoes of all strains were fed a 10% sucrose solution ad libitum and held under a 12 h/12 h light cycle. All experiments were carried out on adult females 3-5 days post-emergence.

Toxicology experiments in *An. gambiae*. Topical toxicity bioassays were performed on non-blood-fed adult female mosquitoes. The mosquitoes were chilled on ice for 1-3 minutes, during which 200 nL of compound (dissolved in 95% ethanol) was applied onto the abdomen of each insect with a handheld Hamilton® micro-applicator. For synergism studies, 500 ng of the potential synergist (e.g., piperonyl butoxide [PBO] or S,S,S-tributyl phosphorotrithioate [DEF]) per milligram of mosquito (ng/mg) was applied to the abdomen 4 h prior to application of the insecticide. For each compound, 6-8 doses that resulted in toxicity ranging between 0% and 100% were applied to a minimum of 30 mosquitoes each, repeated 3 times on different mosquito broods. The three resulting $ED_{50}$ values were averaged. An ethanol-only treatment was included in each experiment as a negative control. Treated mosquitoes were transferred to small cages with access to 10% sucrose and held under rearing conditions for 24 h. Mortality was recorded at 24 h.

Mortality data were pooled and analyzed by log-probit using Poloplus® to determine 24 h $ED_{50}$ values, after correcting for control mortality using Abbot's formula.

Blood meal processing studies were performed with similar methods, with the exception that *An. gambiae* were blood-fed on anesthetized mice. All methods were carried out in accordance with Vanderbilt Institutional Animal Care and Use Committee approval. Upon completion of blood feeding, female mosquitoes with fully distended abdomens were selected, and 200 nL of compound at a non-lethal concentration (1 µg/mg) was applied directly to the abdomen. Any mosquito that died during the 24 h observation period was excluded from the analysis. Images of the abdomens were acquired at 0, 2, 5, 8, and 24 h through the dorsal cuticle; abdomens were measured at the widest point. Images were captured using bright-field illumination on a Nikon 90i light microscope (Nikon Corp., Tokyo, Japan) connected to a Photometrics CoolSNAP HQ2 high-sensitivity monochrome CCD camera (Roper Scientific, Ottobrunn, Germany). Digital images were acquired using Nikon Advanced Research NIS-Elements software. Mean abdominal diameters were compared using one-way ANOVA with a Tukey's post-hoc analysis (Prism 6, Graphpad Software, La Jolla, CA).

Toxicity experiments in *Ae. aegypti*. Topical toxicity bioassays in adult female *Ae. aegypti* (LVP and PR strains) were performed. For a given dose, 10 non-blood-fed mosquitoes were immobilized on ice, and 500 nL of VU041 was applied to the thorax of each using a handheld Hamilton® microapplicator. A solvent-only treatment was included in each experiment as a negative control. Treated mosquitoes were transferred to small cages with access to 10% sucrose and held under rearing conditions for 24 h. The efficacy of a dose was measured as the percentage of treated mosquitoes in a cage that were flightless or dead at 24 h. Four to eight replicates of 10 mosquitoes were performed per dose. The $ED_{50}$ values were determined using a non-linear curve fit analysis (log [inhibitor] vs. response variable-slope) in Prism 6 (Graphpad Software).

The efficacy of VU041 was compared to that of its inactive analog VU937 in LVP mosquitoes (only). In these experiments, two groups of 10 mosquitoes were treated with a dose of VU041 or VU937 at the approximate $ED_{50}$ of VU041 (3.24 µg/mg mosquito), and the mosquitoes' conditions were assessed 24 h later. Six replicate experiments of 10 mosquitoes each were performed. The mean efficacies of the solvent, VU041, and VU937 were analyzed using a one-way ANOVA with a Newman-Keuls post hoc analysis (Prism 6, Graphpad Software).

Diuresis experiments in *Ae. aegypti*. The excretory capacity of adult female *Ae. aegypti* (LVP strain) was measured in groups of 5 mosquitoes treated with a sub-lethal dose of VU041 (1.7 µg/mg mosquito), VU937 (1.7 µg/mg mosquito), or solvent 2 h before injecting the hemolymph of each mosquito with 900 nL of a potassium-enriched, phosphate-buffered saline ($K^+$-PBS) using a Nanoject II microinjector (Drummond Scientific Company, Broomall, PA). The $K^+$-PBS contained the following (in mM): 92.2 NaCl, 47.5 KCl, 10 $Na_2HPO_4$, and 2 $KH_2PO_4$ (pH 7.5). Each treatment group of 5 mosquitoes was transferred into a separate graduated, packed-cell volume tube (MidSci, St. Louis, MO) and held for 1 h at 28° C. The volume excreted by the mosquitoes was measured visually via the graduated column at the bottom of the tube. At least 8 replicates (5 mosquitoes per replicate) were performed for each treatment. All mosquitoes were confirmed to be alive at the end of 1 h. The mean volumes excreted by solvent-, VU041-, and VU937-treated mosquitoes were analyzed using one-way ANOVA with a Newman-Keuls post hoc analysis (Prism 6, Graphpad Software).

Mosquito fecundity experiments. The effects of VU041 on fecundity in *An. gambiae* were determined. Briefly, adult female mosquitoes were given access to an anesthetized mouse for 60 min. After 60 min., engorged mosquitoes were immobilized on ice; and 200 nL of VU041 ($ED_{30}$: 1 µg/mg of mosquito), VU937 (10 µg/mg of mosquito), or solvent was applied directly to the abdomen. After treatment, individual female mosquitoes were transferred to *Drosophila* vials (Fisher Scientific, Pittsburgh, OA) containing 2 mL of water. The total number of eggs was counted 72 hours after each mosquito was transferred into a vial. Any mosquitoes that died during this 72-hour period were excluded from the analysis. All assays were performed in an environmental chamber that was maintained at 27° C. and 75% relative humidity; mosquitoes were given access to 10% sucrose solution ad libitum. At least 25 female mosquitoes were used per replicate for each treatment group; each treatment was repeated on three separate broods, giving a total number of individuals from 75-113 for each group.

To determine the effects of VU041 on fecundity in *Ae. aegypti*, adult female mosquitoes were allowed to feed for 1 h on heparinized rabbit blood (Hemostat) presented in a membrane feeder (Hemotek). After the feeding period, the mosquitoes were immobilized on ice, visually inspected for blood engorgement, and topically treated with 500 nL of solvent, VU041 (3.4 µg/mg mosquito), or VU937 (3.4 µg/mg mosquito). The mosquitoes were returned to rearing conditions for 24 h, after which they were transferred to individual egg-laying glass tubes 21 mm×70 mm (Fisher Scientific, Pittsburgh, PA) with a piece of coffee filter (Melitta USA, Clearwater, FL) cut to fit the bottom of the tube. The filter was wetted with 150 µl of $dH_2O$, and the open end of the tube was plugged with a cotton ball. The mosquitoes in their individual egg laying tubes were returned to rearing conditions for an additional 48 h, and the number of eggs laid was counted. Any mosquitoes that died during the 72 h period after blood feeding were excluded from the analysis. Thirty female mosquitoes were used per replicate for each treatment group; each treatment was repeated on four separate broods, giving a total number of individuals from 87-113 for each treatment group. For both species, the median number of eggs laid per mosquito was compared using a Kruskal-Wallis ANOVA with a Dunn's post-hoc analysis (Prism 6, Graphpad Software).

Honeybee rearing and toxicity experiments. Frames of late-stage honeybee (*A. mellifera*) pupae were taken from four colonies at The Ohio State University Honeybee Lab in Wooster, OH, and maintained in a dark humid incubator at 34° C. (Darwin Chambers Co., St. Louis, MO, model H024) until adult bees emerged. New adults were brushed from frames daily, placed in wooden screen cages (21×14×12 cm), and provided with 1:1 (w/w) sucrose in water.

Acute toxicity experiments in adult bees were performed as follows: Twenty-four hours after emergence, adult honeybees in cages were anaesthetized with carbon dioxide, divided into groups of approximately 20 bees each, and placed in plastic-coated paper cups (177 $cm^3$; UNIQ Paper Yogurt Cup, Frozen Dessert Supplies, Gilbert, AZ) covered with cotton cheesecloth. Smaller groups of bees were anaesthetized a second time and dosed on the thoracic notum with 10 µl of VU041 (100 µg/µl) or 10 µl of vehicle. As a positive control, some bees were treated with 3 µl of bifenthrin (0.1 µg/µl). Negative control bees were treated with 3 µl of solvent. Applications were made using a 20 µl micropipette (Fisherbrand Finnpipette F2, Fisher Scientific, Pittsburgh, PA) with a disposable plastic tip. After treatment, bees were returned to the paper cups and provided with sugar syrup in punctured 1.5 ml microcentrifuge tubes. Toxicity to honeybees was recorded at 48 h, rather than the 24 h used for mosquitoes, to allow for the possibility of delayed toxicity due to the larger body size of the bee. Bees showing no movement 48 h after treatment were scored as dead. A Fisher's Exact Test was used to compare the proportion of mortality induced by VU041 or bifenthrin compared to their respective vehicle controls.

Structure-activity relationships of pinacidil analogs to salivary gland function in *Amblyomma americanum*. We modified the structure of pinacidil to form analogs, and tested the effect of the analogs on salivary function in the tick *Amblyomma americanum*. Results are shown in Table 6.

TABLE 6

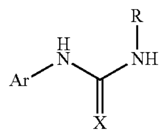

| Name | Ar | X | R | Class | Effect on Salivation at 10 minutes |
|---|---|---|---|---|---|
| Pinacidil | 4-pyridyl | NCN | (±)$CHMeCMe_3$ | cyano-guanidine | Reduced ~98% |
| DRS-1 | 4-pyridyl | S | (S)-$CHMeCMe_3$ | thiourea | Reduced ~80% |
| DRS-2 | 4-pyridyl | O | $CH_2CMe_3$ | urea | No change |
| DRS-3 | 3-pyridyl | NCN | (±)$CHMeCMe_3$ | cyano-guanidine | Reduced ~100% |
| DRS-4 | 4-pyridyl | E-$CHNO_2$ | $CH_2CMe_3$ | nitroethene-diamine | Reduced ~83% |

Insects and arachnids that may be targeted by this invention. This invention may be used against any blood-feeding or sap-feeding insects or arachnids, including (in each case, where applicable—not all members of a taxon necessarily feed on blood or sap): members of the order Diptera, for example *Aedes* spp., *Agromyza* spp., *Anastrepha* spp., *Anopheles* spp., *Asphondylia* spp., *Bactrocera* spp., *Bibio hortulanus, Calliphora erythrocephala, Calliphora vicina, Ceratitis capitata, Chironomus* spp., *Chrysomyia* spp., *Chrysops* spp., *Chrysozona pluvialis, Cochliomyia* spp., *Contarinia* spp., *Cordylobia anthropophaga, Cricotopus sylvestris, Culex* spp., *Culicoides* spp., *Culiseta* spp., *Cuterebra* spp., *Dacus oleae, Dasyneura* spp., *Delia* spp., *Dermatobia hominis, Drosophila* spp., *Echinocnemus* spp., *Fannia* spp., *Gasterophilus* spp., *Glossina* spp., *Haematopota* spp., *Hydrellia* spp., *Hydrellia griseola, Hylemya* spp., *Hippobosca* spp., *Hypoderma* spp., *Liriomyza* spp., *Lucilia* spp., *Lutzomyia* spp., *Mansonia* spp., *Musca* spp., *Oestrus* spp., *Oscinella frit, Paratanytarsus* spp., *Paralauterborniella subcincta, Pegomyia* spp., *Phlebotomus* spp., *Phorbia* spp., *Phormia* spp., *Piophila casei, Prodiplosis* spp., *Psila rosae, Rhagoletis* spp., *Sarcophaga* spp., *Simulium* spp., *Stomoxys* spp., *Tabanus* spp., *Tetanops* spp., and *Tipula* spp.; and members of the order Hemiptera, for example *Acyrthosiphon onobrychis, Acyrthosiphon pisum, Adelges laricis, Aonidiella aurantii, Aphidula nasturtii, Aphis fabae, Aphis gossypii, Aphis pomi, Aulacorthum solani, Bemisia tabaci, Brachycaudus cardui, Brevicoryne brassicae, Dalbulus maidis, Dreyfusia nordmannianae, Dreyfusia piceae, Dysaphis radicola, Empoasca fabae, Eriosoma lanigerum, Laodelphax striatella, Macrosiphum avenae, Macrosiphum euphorbiae, Macrosiphon rosae, Megoura viciae, Metopolophium dirhodum, Myzus persicae, Myzus cerasi, Nephotettix cincticeps, Nilaparvata lugens, Perkinsiella saccharicida, Phorodon humuli, Psylla mali, Psylla pini, Psylla pyricola, Rhopalosiphum maidis, Schizaphis graminum, Sitobion avenae, Sogatella funcifera, Toxoptera citricida, Trialeurodes abutilonea, Trialeurodes vaporariorum*, and *Viteus vitifolii; Coleoptera*, for example *Anthonomus grandis*; and arachnids, for example *Acarus* spp., *Aceria sheldoni, Aculops* spp., *Aculus* spp., *Amblyomma* spp., *Amphitetranychus viennensis, Argas* spp., *Boophilus* spp., *Brevipalpus* spp., *Bryobia graminum, Bryobia praetiosa, Centruroides* spp., *Chorioptes* spp., *Dermanyssus gallinae, Dermatophagoides pteronyssinus, Dermatophagoides farinae, Dermacentor* spp., *Eotetranychus* spp., *Epitrimerus pyri, Eutetranychus* spp., *Eriophyes* spp., *Glycyphagus domesticus, Halotydeus destructor, Hemitarsonemus* spp., *Hyalomma* spp., *Ixodes* spp., *Latrodectus* spp., *Loxosceles* spp., *Metatetranychus* spp., *Neutrombicula autumnalis, Nuphersa* spp., *Oligonychus* spp., *Ornithodorus* spp., *Ornithonyssus* spp., *Panonychus* spp., *Phyllocoptruta oleivora, Polyphagotarsonemus latus, Psoroptes* spp., *Rhipicephalus* spp., *Rhizoglyphus* spp., *Sarcoptes* spp., *Scorpio maurus, Steneotarsonemus* spp., *Steneotarsonemus spinki, Tarsonemus* spp., *Tetranychus* spp., *Trombicula alfreddugesi, Vaejovis* spp., and *Vasates lycopersici*.

Compositions containing compounds of the invention. The compounds of the invention are suitable for use on any plant, including but not limited to those that have been genetically modified to be resistant to active ingredients such as herbicides, or to produce biologically active compounds that control infestation by plant pests, e.g. "BT cotton."

A compound of the invention may be used in mixtures with fertilizers (for example nitrogen-, potassium- or phosphorus-containing fertilizers). Suitable formulation types include granules of fertilizer. The mixtures preferably contain up to 25% by weight of the compound of the invention. The invention therefore also provides a fertilizer composition comprising a fertilizer and a compound of the invention.

The compositions of this invention may contain other compounds having biological activity, for example micronutrients or compounds having fungicidal activity or which possess plant growth regulating, herbicidal, insecticidal, nematocidal or acaricidal activity.

The compound of the invention may be the sole active ingredient of a composition, or it may optionally be admixed with one or more additional active ingredients such as another pesticide, e.g. another insecticide, fungicide, or herbicide, or a synergist or plant growth regulator where appropriate. An additional active ingredient may provide a composition having a broader spectrum of activity or increased persistence at a locus; it may synergize the activity or complement the activity (for example by increasing the speed of effect or overcoming repellency) of a compound; or help to overcome or prevent the development of resistance to individual components. The particular additional active ingredient will depend upon the intended utility of the composition. Examples of suitable additional pesticide compounds include the following: a) Pyrethroids, such as permethrin, cypermethrin, fenvalerate, esfenvalerate, deltamethrin, cyhalothrin (in particular lambda-cyhalothrin and gamma cyhalothrin), bifenthrin, fenpropathrin, cyfluthrin, tefluthrin, fish safe pyrethroids (for example ethofenprox), natural pyrethrin, tetramethrin, S-bioallethrin, fenfluthrin, prallethrin, acrinathirin, etofenprox or 5-benzyl-3-furylmethyl-(E)-(1R,3S)-2,2-dimethyl-3-(2-oxothiolan-3-ylidenemethyl)cyclopropane carboxylate; b) Organophosphates, such as profenofos, sulprofos, acephate, methyl parathion, azinphos-methyl, demeton-s-methyl, heptenophos, thiometon, fenamiphos, monocrotophos, profenofos, triazophos, methamidophos, dimethoate, phosphamidon, malathion, chlorpyrifos, phosalone, terbufos, fensulfothion, fonofos, phorate, phoxim, pirimiphos-methyl, pirimiphos-ethyl, fenitrothion, fosthiazate or diazinon; c) Carbamates (including aryl carbamates), such as pirimicarb, triazamate, cloethocarb, carbofuran, furathiocarb, ethiofencarb, aldicarb, thiofurox, carbosulfan, bendiocarb, fenobucarb, propoxur, methomyl or oxamyl; d) Benzoyl ureas, such as diflubenzuron, triflumuron, hexaflumuron, flufenoxuron, diafenthiuron, lufeneron, novaluron, noviflumuron or chlorfluazuron; e) Organo-tin compounds, such as cyhexatin, fenbutatin oxide or azocyclotin; f) Pyrazoles, such as tebufenpyrad, tolfenpyrad, ethiprole, pyriprole, fipronil, and fenpyroximate; g) Macrolides, such as avermectins or milbemycins, for example abamectin, emamectin benzoate, ivermectin, milbemycin, spinosad, azadirachtin, milbemectin, lepimectin or spinetoram; h) Hormones or pheromones; i) Organochlorine compounds, such as endosulfan (in particular alpha-endosulfan), benzene hexachloride, DDT, chlordane or dieldrin; j) Amidines, such as chlordimeform or amitraz; k) Fumigant agents, such as chloropicrin, dichloropropane, methyl bromide or metam; l) Neonicotinoid compounds, such as imidacloprid, thiacloprid, acetamiprid, nitenpyram, dinotefuran, thiamethoxam, clothianidin, or nithiazine; m) Diacylhydrazines, such as tebufenozide, chromafenozide or methoxyfenozide; n) Diphenyl ethers, such as diofenolan or pyriproxifen; o) Ureas such as Indoxacarb or metaflumizone; p) Ketoenols, such as Spirotetramat, spirodiclofen or spiromesifen; q) Diamides, such as flubendiamide, chlorantraniliprole (Rynaxypyr®) or cyantraniliprole; r) Essential oils such as Bugoil®—(PlantImpact); or s) a compound selected from buprofezine, flonicamid, acequinocyl, bifenazate, cyenopyrafen, cyflumetofen, etoxazole, flometoquin, fluacrypyrim, fluensulfone, flufenerim, flupyradifuone, harpin, iodomethane, dodecadienol, pyridaben, pyridalyl, pyrimidifen, flupyradifurone, 4-[(6-Chloro-pyridin-3-ylmethyl)-(2,2-difluoro-ethyl)-amino]-5H-furan-2-one (DE 102006015467), CAS: 915972-17-7 (WO 2006129714; WO2011/147953; WO2011/147952), CAS: 26914-55-8 (WO 2007020986), chlorfenapyr, pymetrozine, sulfoxaflor and pyrifluqinazon.

In addition to the major chemical classes of pesticide listed above, other pesticides having particular targets may optionally be employed in the composition, if appropriate for the intended use of the composition. For instance, selective insecticides for particular crops, for example stem borer specific insecticides (such as cartap) or hopper specific insecticides (such as buprofezin) for use in rice may be employed. Alternatively, insecticides or acaricides specific for particular insect species/stages may also be included in the compositions (for example acaricidal ovo-larvicides, such as clofentezine, flubenzimine, hexythiazox or tetradifon; acaricidal motilicides, such as dicofol or propargite; acaricides, such as bromopropylate or chlorobenzilate; or growth regulators, such as hydramethylnon, cyromazine, methoprene, chlorfluazuron or diflubenzuron).

Examples of fungicidal compounds which may optionally be included in the composition of the invention are (E)-N-methyl-2-[2-(2,5-dimethylphenoxymethyl)phenyl]-2-methoxy-iminoacetamide (SSF-129), 4-bromo-2-cyano-N,N-dimethyl-6-trifluoromethylbenzimidazole-1-sulfonamide-, .alpha.-[N-(3-chloro-2,6-xylyl)-2-methoxyacetamido]-.gamma.-butyrolacton-e, 4-chloro-2-cyano-N,N-dimethyl-5-p-tolylimidazole-1-sulfonamide (IKF-916, cyamidazosulfamid), 3-5-dichloro-N-(3-chloro-1-ethyl-1-methyl-2-oxopropyl)-4-methylbenzamide (RH-7281, zoxamide), N-allyl-4,5-dimethyl-2-trimethylsilylthiophene-3-carboxamide (MON65500), N-(1-cyano-1,2-dimethylpropyl)-2-(2, 4-dichlorophenoxy)propionamide (AC382042), N-(2-methoxy-5-pyridyl)-cyclopropane carboxamide, acibenzolar (CGA245704) (e.g. acibenzolar-S-methyl), alanycarb, aldimorph, anilazine, azaconazole, azoxystrobin, benalaxyl, benomyl, benthiavalicarb, biloxazol, bitertanol, bixafen, blasticidin S, boscalid, bromuconazole, bupirimate, captafol, captan, carbendazim, carbendazim chlorhydrate, carboxin, carpropamid, carvone, CGA41396, CGA41397, chinomethionate, chlorothalonil, chlorozolinate, clozylacon, copper containing compounds such as copper oxychloride, copper oxyquinolate, copper sulfate, copper tallate and Bordeaux mixture, cyclufenamid, cymoxanil, cyproconazole, cyprodinil, debacarb, di-2-pyridyl disulfide 1,1'-dioxide, dichlofluanid, diclomezine, dicloran, diethofencarb, difenoconazole, difenzoquat, diflumetorim, 0,0-di-iso-propyl-S-benzyl thiophosphate, dimefluazole, dimetconazole, dimethomorph, dimethirimol, diniconazole, dinocap, dithianon, dodecyl dimethyl ammonium chloride, dodemorph, dodine, doguadine, edifenphos, epoxiconazole, ethirimol, ethyl-({umlaut over (Z)})—N-benzyl-N-([methyl(methylthioethylideneamino-oxycarbonyl)amino]thio).beta.-alaninate, etridiazole, famoxadone, fenamidone (RPA407213), fenarimol, fenbuconazole, fenfuram, fenhexamid (KBR2738), fenpiclonil, fenpropidin, fenpropimorph, fentin acetate, fentin hydroxide, ferbam, ferimzone, fluazinam, fludioxonil, flumetover, fluopyram, fluoxastrobin, fluoroimide, fluquinconazole, flusilazole, flutolanil, flutriafol, fluxapyroxad, folpet, fuberidazole, furalaxyl, furametpyr, guazatine, hexaconazole, hydroxyisoxazole, hymexazole, imazalil, imibenconazole, iminoctadine, iminoctadine triacetate, ipconazole, iprobenfos, iprodione, iprovalicarb (SZX0722), isopropanyl butyl carbamate, isoprothiolane, isopyrazam, kasugamycin, kresoxim-methyl, LY186054, LY211795, LY248908, mancozeb, mandipropamid, maneb, mefenoxam, metalaxyl, mepanipyrim, mepronil, metalaxyl, metconazole, metiram, metiram-zinc, metominostrobin, myclobutanil, neoasozin, nickel dimethyldithiocarbamate, nitrothal-isopropyl, nuarimol, ofurace, organomercury compounds, oxadixyl, oxasulfuron, oxolinic acid, oxpoconazole, oxycarboxin, pefurazoate, penconazole, pencycuron, penflufen, penthiopyrad, phenazin oxide, phosetyl-Al, phosphorus acids, phthalide, picoxystrobin (ZA1963), polyoxinD, polyram, probenazole, prochloraz, procymidone, propamocarb, propiconazole, propineb, propionic acid, prothioconazole, pyrazophos, pyrifenox, pyrimethanil, pyraclostrobin, pyroquilon, pyroxyfur, pyrrolnitrin, quaternary ammonium compounds, quinomethionate, quinoxyfen, quintozene, sedaxane, sipconazole (F-155), sodium pentachlorophenate, spiroxamine, streptomycin, sulfur, tebuconazole, tecloftalam, tecnazene, tetraconazole, thiabendazole, thifluzamid, 2-(thiocyanomethylthio)benzothiazole, thiophanate-methyl, thiram, timibenconazole, tolclofos-methyl, tolylfluanid, triadimefon, triadimenol, triazbutil, triazoxide, tricyclazole, tridemorph, trifloxystrobin (CGA279202), triforine, triflumizole, triticonazole, validamycin A, vapam, vinclozolin, zineb and ziram, N-[9-(dichloromethylene)-1,2,3,4-tetrahydro-1,4-methanonaphthalen-5-yl]-3-(difluoromethyl)-1-methyl-1H-pyrazole-4-carboxamide[1072957-71-1], 1-methyl-3-difluoromethyl-1H-pyrazole-4-carboxylic acid (2-dichloromethylene-3-ethyl-1-methyl-indan-4-yl)-amide, and 1-methyl-3-difluoromethyl-4H-pyrazole-4-carboxylic acid [2-(2,4-dichloro-phenyl)-2-methoxy-1-methyl-ethyl]-amide.

In addition, biological agents may be included in the composition of the invention e.g. *Bacillus* species such as *Bacillus firmus, Bacillus cereus, Bacillus subtilis*, and *Pasteuria* species such as *Pasteuria penetrans* and *Pasteuria nishizawae*. A suitable *Bacillus firmus* strain is strain CNCM 1-1582 which is commercially available as BioNem™. A suitable *Bacillus cereus* strain is strain CNCM 1-1562. For both *Bacillus* strains more details can be found in U.S. Pat. No. 6,406,690. Other biological organisms that may be included in the compositions of the invention are bacteria such as *Streptomyces* spp. such as *S. avermitilis*, and fungi such as *Pochonia* spp. such as *P. chlamydosporia*. Also of interest are *Metarhizium* spp. such as *M. anisopliae; Pochonia* spp. such as *P. chlamydosporia*.

The compounds of the invention may be mixed with soil, peat, or other rooting media for the protection of plants against seed-borne, soil-borne, or foliar fungal diseases.

Examples of suitable synergists for use in the compositions include piperonyl butoxide, sesamex, safroxan and dodecyl imidazole.

Suitable herbicides and plant-growth regulators for inclusion in the compositions will depend upon the intended target and the effect required.

An example of a rice selective herbicide which may be included is propanil. An example of a plant growth regulator for use in cotton is PIX™.

Some mixtures may comprise active ingredients which have significantly different physical, chemical, or biological properties such that they do not easily lend themselves to the same conventional formulation type. In these circumstances other formulation types may be prepared. For example, where one active ingredient is a water insoluble solid and the other a water insoluble liquid, it may nevertheless be possible to disperse each active ingredient in the same continuous aqueous phase by dispersing the solid active ingredient as a suspension but dispersing the liquid active ingredient as an emulsion. The resultant composition is a suspoemulsion (SE) formulation.

Unless otherwise stated the weight ratio of compounds of the invention with an additional active ingredient may generally be between 1000:1 and 1:1000. In other embodiments that weight ratio may be between 500:1 to 1:500, for example between 100:1 to 1:100, for example between 1:50 to 50:1, for example 1:20 to 20:1, for example 1:10 to 10:1, for example 1:5 to 5:1, for example 1:1, 1:2, 1:3, 1:4, 1:5, 2:1, 3:1, 4:1, or 5:1.

Compositions of the invention include those prepared by premixing prior to application, e.g. as a ready mix or tank mix, or by simultaneous application or sequential application to the plant.

In order to apply a compound of the invention as an insecticide or acaricide to a pest, a locus of pest, or to a plant susceptible to attack by a pest, a compound of the invention may be formulated into a composition which includes, in addition to the active compound, a suitable inert diluent or carrier and, optionally, a surface active agent or surfactant (SFA). SFAs are compounds that can modify the properties of an interface (for example, a liquid/solid, liquid/air, or liquid/liquid interface) by lowering the interfacial tension, thereby leading to changes in other properties (for example dispersion, emulsification, and wetting). It is preferred that such compositions (both solid and liquid formulations) comprise, by weight, 0.0001 to 95%, more preferably 1 to 85%, for example 5 to 60%, of that of a compound of the invention. The composition may be used for the control of pests such that a compound of the invention is applied at a rate of from 0.1 g to 10 kg per hectare, preferably from 1 g to 6 kg per hectare, more preferably from 1 g to 1 kg per hectare.

In one embodiment the compounds of the invention are used for pest control on cotton or other crop plants at 1:500 g/ha, for example 10-70 g/ha.

When used in a seed dressing, a compound of the invention is used at a rate of 0.0001 g to 10 g (for example 0.001 g or 0.05 g), preferably 0.005 g to 10 g, more preferably 0.005 g to 4 g, per kilogram of seed.

Compositions comprising a compound of the invention can be chosen from a number of formulation types known in the art, including dustable powders (DP), soluble powders (SP), water soluble granules (SG), water dispersible granules (WG), wettable powders (WP), granules (GR) (slow or fast release), soluble concentrates (SL), oil miscible liquids (OL), ultra-low volume liquids (UL), emulsifiable concentrates (EC), dispersible concentrates (DC), emulsions (both oil in water (EW) and water in oil (EO)), micro-emulsions (ME), suspension concentrates (SC), aerosols, fogging/smoke formulations, capsule suspensions (CS) and seed treatment formulations. The formulation type chosen in any instance will depend upon the particular purpose and the physical, chemical, and biological properties of the compound of the invention.

Dustable powders (DP) may be prepared by mixing a compound of the invention with one or more solid diluents (for example natural clays, kaolin, pyrophyllite, bentonite, alumina, montmorillonite, kieselguhr, chalk, diatomaceous earths, calcium phosphates, calcium and magnesium carbonates, sulfur, lime, flours, talc, and other organic and inorganic solid carriers) and mechanically grinding the mixture to a fine powder.

Soluble powders (SP) may be prepared by mixing a compound of the invention with one or more water-soluble inorganic salts (such as sodium bicarbonate, sodium carbonate or magnesium sulfate) or one or more water-soluble organic solids (such as a polysaccharide) and, optionally, one or more wetting agents, one or more dispersing agents or a mixture of said agents to improve water dispersibility/solubility. The mixture is then ground to a fine powder Similar compositions may also be granulated to form water soluble granules (SG).

Wettable powders (WP) may be prepared by mixing a compound of the invention with one or more solid diluents or carriers, one or more wetting agents and, preferably, one or more dispersing agents and, optionally, one or more suspending agents to facilitate the dispersion in liquids. The mixture is then ground to a fine powder. Similar compositions may also be granulated to form water dispersible granules (WG).

Granules (GR) may be formed either by granulating a mixture of a compound of the invention and one or more powdered solid diluents or carriers, or from pre-formed blank granules by absorbing a compound of the invention (or a solution thereof, in a suitable agent) in a porous granular material (such as pumice, attapulgite clays, fuller's earth, kieselguhr, diatomaceous earths or ground corn cobs) or by adsorbing a compound of the invention (or a solution thereof, in a suitable agent) on to a hard core material (such as sands, silicates, mineral carbonates, sulfates or phosphates) and drying if necessary. Agents which are commonly used to aid absorption or adsorption include solvents (such as aliphatic and aromatic petroleum solvents, alcohols, ethers, ketones, and esters) and sticking agents (such as polyvinyl acetates, polyvinyl alcohols, dextrins, sugars and vegetable oils). One or more other additives may also be included in granules (for example an emulsifying agent, wetting agent or dispersing agent).

Dispersible Concentrates (DC) may be prepared by dissolving a compound of the invention in water or an organic solvent, such as a ketone, alcohol, or glycol ether. These solutions may contain a surface active agent (for example to improve water dilution or prevent crystallization in a spray tank).

Emulsifiable concentrates (EC) or oil-in-water emulsions (EW) may be prepared by dissolving a compound of the invention in an organic solvent (optionally containing one or more wetting agents, one or more emulsifying agents or a mixture of said agents). Suitable organic solvents for use in ECs include aromatic hydrocarbons (such as alkylbenzenes or alkylnaphthalenes, exemplified by SOLVESSO 100, SOLVESSO 150 and SOLVESSO 200; SOLVESSO is a Registered Trade Mark), ketones (such as cyclohexanone or methylcyclohexanone) and alcohols (such as benzyl alcohol, furfuryl alcohol or butanol), N-alkylpyrrolidones (such as N-methylpyrrolidone or N-octylpyrrolidone), dimethyl amides of fatty acids (such as $C_8$-$C_{10}$ fatty acid dimethylamide) and chlorinated hydrocarbons. An EC product may spontaneously emulsify on addition to water, to produce an emulsion with sufficient stability to allow spray application through appropriate equipment. Preparation of an EW involves obtaining a compound of the invention either as a liquid (if it is not a liquid at room temperature, it may be melted at a reasonable temperature, typically below 70° C.) or in solution (by dissolving it in an appropriate solvent) and then emulsifying the resultant liquid or solution into water containing one or more SFAs, under high shear, to produce an emulsion. Suitable solvents for use in EWs include vegetable oils, chlorinated hydrocarbons (such as chlorobenzenes), aromatic solvents (such as alkylbenzenes or alkylnaphthalenes) and other appropriate organic solvents which have a low solubility in water.

Microemulsions (ME) may be prepared by mixing water with a blend of one or more solvents with one or more SFAs, to produce spontaneously a thermodynamically stable isotropic liquid formulation. A compound of the invention is present initially in either the water or the solvent/SFA blend. Suitable solvents for use in MEs include those hereinbefore described for use in ECs or in EWs. An ME may be either an oil-in-water or a water-in-oil system (which system is present may be determined by conductivity measurements) and may be suitable for mixing water-soluble and oil-soluble pesticides in the same formulation. An ME is suitable for dilution into water, either remaining as a microemulsion or forming a conventional oil-in-water emulsion.

Suspension concentrates (SC) may comprise aqueous or non-aqueous suspensions of finely divided insoluble solid particles of a compound of the invention. SCs may be prepared by ball or bead milling a solid compound of the invention in a suitable medium, optionally with one or more dispersing agents, to produce a fine particle suspension of the compound. One or more wetting agents may be included in the composition and a suspending agent may be included to reduce the rate at which the particles settle. Alternatively, a compound of the invention may be dry milled and added to water, containing agents hereinbefore described, to produce the desired end product.

Aerosol formulations comprise a compound of the invention and a suitable propellant (for example n-butane). A compound of the invention may also be dissolved or dispersed in a suitable medium (for example water or a water miscible liquid, such as n-propanol) to provide compositions for use in non-pressurized, hand-actuated spray pumps.

A compound of the invention may be mixed in the dry state with a pyrotechnic mixture to form a composition suitable for generating, in an enclosed space, a smoke containing the compound.

Capsule suspensions (CS) may be prepared in a manner similar to the preparation of EW formulations but with an additional polymerization stage such that an aqueous dispersion of oil droplets is obtained, in which each oil droplet is encapsulated by a polymeric shell and contains a compound of the invention and, optionally, a carrier or diluent therefor. The polymeric shell may be produced by either an interfacial polycondensation reaction or by a coacervation procedure. The compositions may provide for controlled release of the compound of the invention, and they may be used for seed treatment. A compound of the invention may also be formulated in a biodegradable polymeric matrix to provide a slow, controlled release of the compound.

A composition may include one or more additives to improve the biological performance of the composition (for example by improving wetting, retention, or distribution on surfaces; resistance to rain on treated surfaces; or uptake or mobility of a compound of the invention). Such additives include surface active agents, spray additives based on oils, for example certain mineral oils or natural plant oils (such as soybean and canola oil), and blends of these with other bio-enhancing adjuvants (ingredients which may aid or modify the action of a compound of the invention).

A compound of the invention may also be formulated for use as a seed treatment, for example as a powder composition, including a powder for dry seed treatment (DS), a water soluble powder (SS) or a water dispersible powder for slurry treatment (WS), or as a liquid composition, including a flowable concentrate (FS), a solution (LS) or a capsule suspension (CS). The preparations of DS, SS, WS, FS and LS compositions are very similar to those of, respectively, DP, SP, WP, SC, and DC compositions described above. Compositions for treating seed may include an agent for assisting the adhesion of the composition to the seed (for example a mineral oil or a film-forming barrier).

Wetting agents, dispersing agents, and emulsifying agents may be surface SFAs of the cationic, anionic, amphoteric, or non-ionic type.

Suitable SFAs of the cationic type include quaternary ammonium compounds (for example cetyltrimethyl ammonium bromide), imidazolines and amine salts.

Suitable anionic SFAs include alkali metals salts of fatty acids, salts of aliphatic monoesters of sulfuric acid (for example sodium lauryl sulfate), salts of sulfonated aromatic compounds (for example sodium dodecylbenzenesulfonate, calcium dodecylbenzenesulfonate, butylnaphthalene sulfonate and mixtures of sodium di-isopropyl- and tri-isopropyl-naphthalene sulfonates), ether sulfates, alcohol ether sulfates (for example sodium laureth-3-sulfate), ether carboxylates (for example sodium laureth-3-carboxylate), phosphate esters (products from the reaction between one or more fatty alcohols and phosphoric acid (predominately mono-esters) or phosphorus pentoxide (predominately di-esters), for example the reaction between lauryl alcohol and tetraphosphoric acid; additionally these products may be ethoxylated), sulfosuccinamates, paraffin or olefin sulfonates, taurates and lignosulfonates.

Suitable SFAs of the amphoteric type include betaines, propionates and glycinates.

Suitable SFAs of the non-ionic type include condensation products of alkylene oxides, such as ethylene oxide, propylene oxide, butylene oxide or mixtures thereof, with fatty alcohols (such as oleyl alcohol or cetyl alcohol) or with alkylphenols (such as octylphenol, nonylphenol or octylcresol); partial esters derived from long chain fatty acids or hexitol anhydrides; condensation products of said partial esters with ethylene oxide; block polymers (comprising ethylene oxide and propylene oxide); alkanolamides; simple esters (for example fatty acid polyethylene glycol esters); amine oxides (for example lauryl dimethyl amine oxide); and lecithins.

Suitable suspending agents include hydrophilic colloids (such as polysaccharides, polyvinylpyrrolidone or sodium carboxymethylcellulose) and swelling clays (such as bentonite or attapulgite).

A compound of the invention may be applied by any of the known means of applying pesticidal compounds. For example, it may be applied, formulated or unformulated, to the pests or to a locus of the pests (such as a habitat of the pests, or a growing plant liable to infestation by the pests) or to any part of the plant, including the foliage, stems, branches or roots, to the seed before it is planted or to other media in which plants are growing or are to be planted (such as soil surrounding the roots, the soil generally, paddy water or hydroponic culture systems), directly or it may be sprayed on, dusted on, applied by dipping, applied as a cream or paste formulation, applied as a vapor or applied through distribution or incorporation of a composition (such as a granular composition or a composition packed in a water-soluble bag) in soil or an aqueous environment. A compound of the invention can be applied topically to protect humans or animals, e.g., cattle, horses, dogs, cats, sheep, goats, etc., from biting insects or ticks.

A compound of the invention may also be injected into plants or sprayed onto vegetation using electrodynamic spraying techniques or other low volume methods, or applied by land or aerial irrigation systems.

Compositions for use as aqueous preparations (aqueous solutions or dispersions) are generally supplied in the form of a concentrate containing a high proportion of the active ingredient, the concentrate being added to water before use. These concentrates, which may include DCs, SCs, ECs, EWs, MEs, SGs, SPs, WPs, WGs and CSs, are often required to withstand storage for prolonged periods and, after such storage, to be capable of addition to water to form aqueous preparations which remain homogeneous for a sufficient time to enable them to be applied by conventional spray equipment. Such aqueous preparations may contain varying amounts of a compound of the invention (for example 0.0001 to 10%, by weight) depending upon the purpose for which they are to be used.

Analogs of VU041, VU937, and of other Kir channel inhibitors. Among the compounds that may be used in practicing the present invention are not only of VU041 and VU937, but also analogs of VU041 and VU937. Among those analogs are the several compounds listed in Appendices A and B of priority application 62/422,382, each of which has chemical similarity to VU041 or VU937. The complete disclosure of priority application 62/422,382, including its Appendices A and B, is hereby incorporated by reference in its entirety.

Among the compounds that may be used in practicing the present invention are the specific compounds listed in Appendix A or Appendix B of priority application 62/422, 382. Also among the compounds that may be used in practicing the present invention are compounds whose structure is the same as that of VU041 or VU937, or one of the compounds listed in Appendix A or Appendix B of priority application 62/422,382, or one of the Kir channel inhibitors otherwise described in the present specification; but with one, two, three, or four of the following types of substitutions or modifications made to the structure: replacing a fluorine atom with a hydrogen, bromine, chlorine, or iodine atom, or with a hydroxyl group, methoxy group, or ethoxy group; replacing a nitrogen atom with a phosphorus atom; replacing an oxygen atom with a sulfur atom; replacing a carbonyl group (C=O) with a carbon atom bonded to a hydroxyl group, thiol group, methoxy group, or ethoxy group (CH—OH or CH—SH or CH—OCH$_3$ or CH—OCH$_2$CH$_3$); replacing a single bond with a double bond; replacing a double bond with a single bond; replacing a hydrogen atom with a fluorine, bromine, chlorine, or iodine atom, or with a hydroxyl group, methoxy group, or ethoxy group; or replacing a hydrogen atom with a substituted or unsubstituted methyl, ethyl, propyl, or isopropyl group. In each case, hydrogen atoms may be added to or deleted from the structures where appropriate to satisfy ordinary valences and bonding properties.

Definitions. For purposes of interpreting the specification and Claims: (1) An "effective amount" of a particular compound or agent is an amount that will induce a particular, defined outcome (e.g., mortality, reduced salivary gland secretion, etc., as defined in context), within 12 hours, in at least 90% of individual arthropods of a particular species that have not acquired resistance to the agent. Through natural selection, populations that are exposed to an adverse agent will tend to acquire resistance to that agent over time. The "90%" figure in this definition is made in reference to populations that have not yet acquired resistance to the agent. The "90%" figure in the definition carries no implications about how prevalent resistance to the agent may have become at any given time.

(2) An "exogenous" agent is a compound or a composition to which a particular species (e.g., *Aedes aegypti*, *Amblyomma americanum*, etc.) is not exposed in a state of nature—whether because the agent is artificial, or because the species does not come into contact with the agent in a state of nature (even if the agent is naturally occurring). In other words, by this definition either the "exogenous" agent itself is not a "product of nature," or the process of contacting individuals of the particular species with the particular "exogenous" agent is not a process that occurs in a state of nature. By contrast, if the particular agent is naturally occurring, and if individuals of the particular species come into contact with that agent in a state of nature, then the agent is not considered "exogenous" within the scope of this definition.

Incorporations by reference. The complete disclosures of all references cited in this specification are hereby incorporated by reference. Also incorporated by reference are the complete disclosures of U.S. provisional application Ser. Nos. 62/421,621 and 62/422,382; and of international patent application PCT/US17/61247. In the event of an otherwise irreconcilable conflict, however, the present specification shall control over material that is incorporated by reference.

What is claimed:

1. A method for inducing an outcome in an arthropod;
   wherein said arthropod is a mosquito, a tick, or a horn fly;
       said method comprising:
administering to the arthropod an effective amount of an agent comprising one or more compounds selected from the group consisting of pinacidil, VU041, VU063, and VU730;
wherein the outcome comprises one or more outcomes selected from the group consisting of: (i) reducing or destroying salivary gland secretions; (ii) reducing or destroying feeding or digestion; (iii) reducing or destroying the ability to osmoregulate; (iv) reducing or destroying the ability to transmit pathogens; and (v) death of the arthropod; and
wherein an effective amount of the agent is an amount that will induce the outcome, within 12 hours, in at least 90% of individual arthropods of the same species that have not acquired resistance to the agent.

2. The method of claim 1, wherein the arthropod is a mosquito.

3. The method of claim 1, wherein the arthropod is a tick.

4. The method of claim 1, wherein the arthropod is a horn fly.

5. The method of claim 1, wherein the agent is pinacidil.

6. The method of claim 1, wherein the agent is VU041.

7. The method of claim 1, wherein the agent is VU063.

8. The method of claim 1, wherein the agent is VU730.

* * * * *